US011093902B2

(12) United States Patent
Smith

(10) Patent No.: US 11,093,902 B2
(45) Date of Patent: Aug. 17, 2021

(54) SYSTEMS AND METHODS FOR ABSENTEE MANAGEMENT

(71) Applicant: Matrix Absence Management, Inc., Santa Clara, CA (US)

(72) Inventor: Gordon Smith, Santa Clara, CA (US)

(73) Assignee: Matrix Absence Management, Inc., Santa Clara, CA (US)

( * ) Notice: Subject to any disclaimer, the term of this patent is extended or adjusted under 35 U.S.C. 154(b) by 0 days.

(21) Appl. No.: 16/858,462

(22) Filed: Apr. 24, 2020

(65) Prior Publication Data

US 2020/0342414 A1    Oct. 29, 2020

Related U.S. Application Data

(60) Provisional application No. 62/839,167, filed on Apr. 26, 2019.

(51) Int. Cl.
*G06Q 10/10*    (2012.01)
*G06Q 30/00*    (2012.01)

(52) U.S. Cl.
CPC ..... *G06Q 10/1091* (2013.01); *G06Q 10/1093* (2013.01); *G06Q 30/018* (2013.01)

(58) Field of Classification Search
CPC .. G06Q 10/00; G06Q 10/06; G06Q 10/06311; G06Q 10/105; G06Q 10/109; G06Q 10/1091; G06Q 10/1093; G06Q 10/063114; G06Q 10/1095; H04M 3/51; G06F 3/048; G06F 15/0266
See application file for complete search history.

(56) References Cited

U.S. PATENT DOCUMENTS

| 2006/0224478 A1* | 10/2006 | Harbison | G06Q 10/00 705/32 |
| 2013/0031184 A1* | 1/2013 | Avitabile | G06Q 10/10 709/206 |
| 2016/0217429 A1* | 7/2016 | Lau | G06Q 10/107 |

* cited by examiner

*Primary Examiner* — Robert D Rines

(57) ABSTRACT

Systems and methods are provided for absentee management. Absentee management includes obtaining a demographic feed of employee records, each corresponding to an employee for an entity. Each record includes names of the corresponding employee and a least one other employee which the corresponding employee shares a reporting relationship. Use the demographic feed to construct an organizational tree with nodes, each node representing an employee. Obtain an absentee status feed comprising absentee statuses. Each absentee status corresponds to an employee and includes an absentee status category. Determine from the organization tree and the demographic feed a set of supervisors at the entity. Each respective supervisor in the set of supervisors supervises at least one supervisee having an absentee status category. Communicate a different supervisor status notification to each supervisor. The different supervisor status notification provides a listing of each supervisee that reports to the respective supervisor having an absentee status category.

20 Claims, 38 Drawing Sheets

600

---

*(602)* A computer system comprises one or more processors, and a memory coupled to the one or more processors. The memory storing one or more programs configured to be executed by the one or more processors, the one or more programs singularly or collectively comprising instructions for preforming a method.

↓

*(604)* Obtain a demographic feed comprising a plurality of employee records. Each respective employee record in the plurality of employee records corresponds to an employee in a plurality of employees for an entity. Each respective record in the plurality of employee records includes a name of the corresponding employee and a name of a least one other employee in the plurality of employees to which the corresponding employee shares a reporting relationship.

*(606)* The reporting relationship is one in which the corresponding employee directly supervises the at least one other employee.

*(608)* The reporting relationship is one in which the corresponding employee is directly supervised by the at least one other employee.

*(610)* The reporting relationship is one in which the corresponding employee is directly supervised by the at least one other employee. Each respective employee record in the plurality of employee records further includes an e-mail address of the corresponding employee and an e-mail address of the at least one other employee in the plurality of employees to which the corresponding employee shares the reporting relationship.

*(612)* The plurality of employees comprises 1,000 employees.

*(614)* The plurality of employees comprises 500,000 employees.

*(616)* A supervisor to supervisee ratio at the entity is at least 1 to 5.

*(618)* A supervisor to supervisee ratio at the entity is at least 1 to 20.

*(620)* The entity is a business organization, a governmental agency, or a non-profit organization.

(622) Use the demographic feed to construct an organizational tree comprising a plurality of nodes. Each respective node in the plurality of nodes represents an employee in the plurality of employees.

(624) Obtain an absentee status feed comprising a plurality of absentee statuses. Each absentee status in the plurality of absentee statuses corresponds to an employee in a set of employees in the plurality of employees. Each respective absentee status includes an absentee status category that is in an enumerated list of absentee status categories.

(626) The absentee status feed is obtained on a recurring basis (628) The recurring basis is each day that the entity has a working day.

(630) The recurring basis is each month.

(632) The absentee status feed is subsumed by the demographic feed.

(634) The absentee status feed is obtained from a second computer system remote from the first computer system.

(636) The set of employees of the absentee status feed includes each employee in the plurality of employees for the entity.

(638) The set of employees of the absentee status feed includes a portion of the plurality of employees for the entity.

(640) The enumerated list of absentee status categories comprises a leave of absence for an accommodation, an absence to care for a child, a maternity leave, a paternity leave, an absence due to sickness of the supervisee, an absence to care for a parent, an absence related to pregnancy of the supervisee, or an absence to care for a spouse or significant other of the supervisee.

(642) The absentee status of the corresponding employee is a paid absence.

(644) The absentee status of the corresponding employee is an unpaid absence.

*(646)* The absentee status of the corresponding employee is a federal policy, a state policy, or an employer policy that permits an employee to be absent from work.

*(648)* Determining from the organization tree and the demographic feed a set of supervisors at the entity. Each respective supervisor in the set of supervisors directly or indirectly supervises at least one supervisee having an absentee status category that is in the enumerated list of absentee status categories.

*(650)* Communicating a different supervisor status notification to each respective supervisor in the set of supervisors without further human intervention by the respective supervisor. The different supervisor status notification provides a listing of each supervisee that directly or indirectly reports to the respective supervisor having an absentee status category that is in the enumerated list of absentee status categories together with a current absentee status of the supervisee.

*(652)* The listing in the supervisor notification provides, for each respective supervisee of the supervisor, a name of the respective supervisee, an absence start date, an absence end date, optionally an update to the absence start date, a reason for an absence, an approval status of an absence of the respective supervisee, and the absentee status category of the respective supervisee.

*(654)* The listing is bifurcated between a first listing portion that consists of supervisees that are absent or planning to be absent for one or more days, and a second listing portions that consists of supervisees that are absent or planning to be absent for less than a day. The first listing portion further provides for each respective supervisee of the supervisor that is absent or planning to be absent for more than one day, a return to work date and optionally an update to the return to work date. The second listing portion further provides for each respective supervisee of the supervisor that is absent or planning to be absent for less than one day an absence start time, optionally an update to the absence start time, an absence duration, optionally an update to the absence duration, and an indication as to whether the absence have been approved, denied, is pending or has been cancelled.

*(656)* The listing further comprises instructions from the entity to the respective supervisor on how to handle supervisee absences

*(657)* Receiev a supervisor selection of a first employee in the plurality of employees. Responsive to receiving the supervisor selection of the first employee in the plurality of employees, the different supervisor status notification is communicated to the first employee in the plurality of employees selected by the respective supervisor without further intervention by either the respective supervisor or the first employee.

*(658)* Evaluate, at each respective instance on a recurring basis, whether to communicate the different supervisor status notification to the respective supervisor. When there has been a change in the listing of each supervisee that directly or indirectly reports to the respective supervisor having an absentee status category that is in the enumerated list of absentee status categories, the notification is communicated to the respective supervisor at the respective instance. When there has been no change in the listing of each supervisee that directly or indirectly reports to the respective supervisor having an absentee status category that is in the enumerated list of absentee status categories, the notification is not communicated to the respective supervisor at the respective instance.

*(660)* The recurring basis is each day that the entity has a working day.

*(662)* The change in the listing is an addition of a supervisee or a removal of a supervisee from the listing

*(664)* The change in the listing comprises, for a supervisee in the listing, an update to an absence start date, a change in an approval status of an absence, a change in the absentee status category, a change in a return to work date, a change in an absence start time, a change in an absence duration, or a change in an indication as to whether an absence has been approved.

*(666)* The communicating the different supervisor status notification to the respective supervisor comprises sending the notification to the different supervisor by E-mail.

*(668)* Grant each respective supervisor in the set of supervisors a corresponding account. The corresponding account provides a portal for reviewing absentee information of each supervisee that directly or indirectly reports to the respective supervisor that presently has or is about to have an absentee status category that is in the enumerated list of absentee status categories.

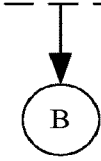

Figure 6D

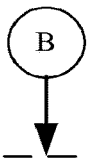

(670) Providing a different absentee calendar to each respective supervisor in the set of supervisors. The different absentee calendar provides, for each respective day depicted in the calendar, a representation of a number of supervisees that directly or indirectly report to the respective supervisor that are absent that day.

(672) The different absentee calendar further includes an indication of one or more events associated with the entity.

(674) The absentee calendar covers a rolling period that encompasses a contiguous past portion, a contiguous present portion, and a contiguous future portion.

(676) The rolling period is one month, six months, or a year.

(678) The rolling period is a one year rolling period that consists of the past six months, the present month and the next five months.

(680) The absentee calendar further provides instructions for receiving a supervisor selection of a first day depicted in the calendar. Responsive to supervisor selection of the first day, providing an accounting of the number of supervisees that directly or indirectly report to the respective supervisor that are absent on the first day. The accounting provides the names of supervisees that are absent on the first day and an indication that it is the first day they are absent, the names of supervisees whose absence on the first day is part of a continuation of an absence from prior days and an indication that it a continued absence, the names of the supervisees whose return to work day is on the first day, and the names of supervisees whose absence on the first day is a partial absence, and for each supervisee whose absence on the first day is a partial absence, a start time, duration, and reason for the partial absence.

(682) The different absentee calendar provides an option to allow the respective supervisor to select from among all direct reports of the respective supervisor, all employees of the entity or a reporting hierarchy of the respective supervisor.

(684) The different absentee calendar provides an option to allow the respective supervisor to filter the representation of the number of supervisees that directly or indirectly report to the respective supervisor that are absent that day by whether such absences are new for that day, whether such absences are partial for that day, whether the supervisee is returning to work on that day, or whether such absences are recurring for that day.

*(686)* The different absentee calendar provides one or more one click report options. When the respective supervisor selects a respective one click report from among the one or more one click reports, a corresponding report regarding absenteeism of the supervisees that directly or indirectly report to the respective supervisor is provided.

*(688)* The different absentee calendar includes a search prompt that allows the different supervisor to search for an employee within the entity. When the different supervisor runs a search for an employee within the entity and a matching employee is also a supervisor, the one or more programs further comprise instructions to prompt the different supervisor as to whether the different supervisor wants to review an absenteeism record of the matching employee or an absenteeism of the supervisees of the matching employee.

*(690)* The different absentee calendar includes a search prompt that allows the different supervisor to search for an employee within the entity. When the different supervisor runs a search for an employee within the entity, the one or more programs further comprise instructions to display an absentee calendar for the employee.

Figure 6F

Status Notification —— 702

Continuous Absences —— 704-1

| Name | Absence Start | Return to Work | Status | Reason | Claims Examiner |
|---|---|---|---|---|---|
| Reede John | 05/20/2018 ~~04/15/2018~~ | 05/30/2018 | Approved | Own | Jane.Doe@martixcos.com |
| Watson Jeremy | 04/06/2018 | Returned on 08/26/2018 | Approved | Own | Jane.Doe@martixcos.com |
| Swanson Tiffany | 04/21/2018 | 05/30/2018 | Pending | Family Member | Jane.Doe@martixcos.com |
| Jackson John | 05/20/2018 | 07/10/2018 ~~05/30/2018~~ | Approved ~~Pending~~ | Own  ~~720-1 | Jane.Doe@martixcos.com |
| Patterson Paula | 06/28/2018 | Confirmed Returning on 09/05/2018 | Approved | Pregnancy | Jane.Doe@martixcos.com |
| Riley Jasmine | 06/05/2018 | Unable to confirm 09/06/2018 RTW* | Approved | Own | Jane.Doe@martixcos.com |
| Abrams Laura ⊗ ⓘ | 02/17/2018 | 09/04/2018 | Approved | Family Member | Jane.Doe@martixcos.com |
| Franklin George | 04/20/2018 | Returned on 06/27/2018 | Approved ~~Pending~~ | Own | Jane.Doe@martixcos.com |

*During our return to work process, we were unable to reach your employee

ⓘ Restriction — 722

⊗ ⓘ Change in Restriction — 720-2

Figure 7A

Partial Absences —704-2

| Name | Absence Date | Absence Start | Absence Time | Status | Claims Examiner |
|---|---|---|---|---|---|
| Watson Jeremy | 09/17/2018 ~~09/16/2018~~ | 07:00 AM | 4 Hrs 0 Min | Approved | Jane.Doe@martixcos.com |
| Reede John | 09/17/2018 | 08:00 AM | 8 Hrs 0 Min | Denied | Jane.Doe@martixcos.com |
| Jones Karen | 07/02/2018 | 09:30 AM ~~06:00 AM~~ | 8 Hrs 0 Min | Cancelled | Jane.Doe@martixcos.com |
| Johnson Tiffany | 08/31/2018 | 08:00 AM | 04 Hrs 0 Min ~~8 Hrs 0 Min~~ | Pending | Jane.Doe@martixcos.com |

Figure 7B

Partial Absence Requests With No Missed Time (704-3)

| Name | Begin | End | Reason | Status | Claims Examiner |
|---|---|---|---|---|---|
| Jackson Janet | 08/19/2018 | 06/25/2019 | Parent | Approved | Jane.Doe@martixcos.com |
| Edison Thomas | 04/09/2018 | 02/18/2019 | Child | Approved | Jane.Doe@martixcos.com |
| Abraham Lincoln | 06/26/2018 | 03/19/2019 | Own | Pending | Jane.Doe@martixcos.com |

Figure 7C

Supervisor/Manager Instructions — 750

New Absences — 752

- The employee listed has applied for leave. Matrix Absence Management is responsible for managing this employee's leave of absence and will provide you with any necessary updates regarding this employee's leave, including any changes to this employee's return to work date.

- Absence Calendar: you should have already received an email with your User ID & temporary password. If you don't have the password, log into www.matrixabsence.com, enter your User ID (work email address) & click "Forgot Password".

Status Changes — 754

- These status notification emails are meant to inform you of any new or updated information regarding absences within your employee population.

Return to Work — 756

- Please reach out to Benefits regarding clarification of dates for activation/de-activation within the payroll system.

- If you have any questions or need additional guidance, please contact your assigned HR Representative and provide updated information.

- Employee is REQUIRED to submit Return-To-Work Form prior to returning to active duty. If the employee does not submit a Return-To-Work Form and attempts to return, please contact your Human Resources Rep.

View Absence Calendar — 760-1

| | | | | |
|---|---|---|---|---|
| Robertson, Enzo | 09/06/2018 | 09/14/2018 | Own | |
| Assandri, Najeeb | 08/11/2018 | 02/07/2019 | Own | |
| Battersby, Dyasia | 08/23/2018 | 09/11/2018 | Own | |
| Cardoo, Clementia | 07/19/2018 | 01/05/2019 | Pregnancy | |
| Elven, Alana | 06/12/2018 | 09/12/2018 | Own | |
| Espin, Rhianna | 08/11/2018 | 10/02/2018 | Own | |

704

710-1                                                                 710-5

| | | | | |
|---|---|---|---|---|
| Chazelle, Nasri | 08:00 AM | 08:00 | Own | |
| Gladden, Sherriale | 08:00 AM | 08:00 | Own | |
| Harrap, Dwain | 08:00 AM | 08:00 | Own | |
| Howerd, Shaira | 08:00 AM | 08:00 | Own | |
| Ledeker, Amerigo | 08:00 AM | 08:00 | Own | |

| | A | B | C | D | E | F | G | H | I | J | K | L | M | N | O |
|---|---|---|---|---|---|---|---|---|---|---|---|---|---|---|---|
| 1 | Your Company Name | | | | | | | | | | | | | | |
| 2 | ABSENCE REGULAR HR MANAGER STATUS NOTIFICATION | | | | | | | | | | | | | | |
| 3 | PERIOD | 09/20/2018 - 09/20/2018 | | | | | | | | | | | | | |
| 4 | RUN DATE | 09/20/2018 | | | | | | | | | | | | | |
| 5 | Employee Name | Employee ID | Job Title | Absence Start | Absence End | Frequency | Duration | Request Date Submitted | Request Date Approved | Start Time | End Time | Time Missed | Future Status | Status | Denial Reason | Leave Reason | Work Location |
| 6 | Abrams Lewis | 1122 | Sr. Administrative Assist. | 09/16/2018 | | | | | 09/16/2018 | 08:00 AM | 08 hrs 00 Min | | Pending | | Own | Dept 12 |
| 7 | Doe Jane | 1123 | Office Manager | 09/17/2018 | 03/17/2019 | As Needed | | | | | | Pending | Approved | | Own | Dept 13 |
| 8 | Jones Karen | 1156 | Support Technician | 08/16/2018 | 02/15/2019 | | | 09/10/2018 | 08:00 AM | 00 Hrs 30 Min | | Pending | | Own | Dept 14 |
| 9 | Jackson Jared | 1123 | Postman | 08/16/2018 | 02/15/2019 | | | 09/13/2018 | 08:00 AM | 00 Hrs 30 Min | | Pending | | Own | Dept 14 |
| 10 | Jackson Joseph | 1351 | Call Center Agent | 08/23/2018 | 11/23/2018 | 5 events per 1 Month(s) | 24 Hour(s) | 09/18/2018 | 09:00 AM | 00 Hrs 30 Min | | Approved | | Own | Dept 15 |

| | A | B | C | D | E | F | G | H | I |
|---|---|---|---|---|---|---|---|---|---|
| 1 | | | | | | | | | |
| 2 | Your Company Name | | | | | | | | |
| 3 | CONTINUOUS LEAVE | | | | | | | | |
| 4 | REPORT RUN: | 09/20/2018 | | | | | | | |
| 5 | | | | | | | | | |
| 6 | Employee Name | Employee ID | Reason | Policy Type | Policy Nickname | Policy Status | Start Date | End Date | Exhaustion Date |
| 7 | Reede Tiffany | 1234 | PREGNANCY | Federal | FMLA | Approved | 09/14/2018 | 10/25/2018 | |
| 8 | Abraham Ellis | 6629 | OWN | Federal | FMLA | Denied | | | |
| 9 | Smith Alison | 2119 | OWN | Federal | FMLA | Approved | 09/11/2018 | 12/03/2018 | 12/4/2018 |
| 10 | Jones Jackson | 7891 | CHILD | Federal | FMLA | Denied | | | |
| 11 | | | | | | | | | |

Figure 15F 1502-5

| | |
|---|---|
| CONTINUOUS – New & Changes | The data on this tab includes status notifications of all changes to existing employee absences, and when new absences are created. This tab includes continuous leaves only. |
| Employee Name | Last Name, First Name |
| Employee ID | Employee ID from HR data |
| Job Title | Position from HR data |
| Former Absence Type | Previous Absence Type (one of 'LOA', 'Leave Of Absence', 'WC', 'Workers Compensation', 'STD', 'Short Term Disability', 'PFL', 'Paid Family Leave', 'LTD', 'Long Term Disability') |
| Absence Type | Current Absence Type |
| What Changed | Displays the category that changed for the record |
| Radar Update | Claim update |
| Last Day Worked | Last date worked |
| Former Start | Previous Start Date |
| Start | Current Start Date |
| Disability Benefit Start Date | Disability Benefit Start Date |
| Disability Benefit End Date | Disability Benefit End Date |
| Former Return to Work | Previous RTW Date |
| Return to Work | Current RTW Date |
| Former Status | Previous Status |
| Status | Current Status |
| Former Reason | Previous Reason |
| Reason | Current Reason |
| Certification Status | Status from Cert Received field |
| Certification Received Date | Certification Received Date |
| Workers' Comp Y/N | WC Concurrency Flag |
| Dept or Location | Department name from HR data |
| Work State | Work State from HR data |
| Exempt | Exempt from HR data |
| Supervisor Email | Supervisor Email Address |
| Restriction Type | If exists, may be Physical or Cognitive |
| Former Restriction | Previous Restriction |
| Restriction Description | Restriction Description |
| Actual Modified Work Start | Actual Modified RTW Date |
| Expected Modified Work End | Expected Modified RTW End Date |
| Claims Examiner Email | Claims Examiner Email Address |
| New Claim | New Record Flag |
| Sub Group A | Subgroup A value from HR data |
| Sub Group B | Subgroup B value from HR data |
| Sub Group C | Subgroup C value from HR data |
| Sub Group D | Subgroup D value from HR data |
| Sub Group E | Subgroup E value from HR data |
| Sub Group F | Subgroup F value from HR data |
| Unable to confirm MM/DD/YYYY* | During our return to work process, we were unable to reach your employee |

Figure 15G 1502-5

| | |
|---|---|
| INTERMITTENT – New & Changes | The data on this tab includes status notifications of all changes to existing employee absences, and when new absences are created. This tab includes intermittent leaves only. |
| Employee Name | Last Name, First Name |
| Employee ID | Employee ID from HR data |
| Job Title | Position from HR data |
| Absence Start | MIN of Approved Start Date, if null MIN of Certificate Start Date, if null MIN of Request Start Date or Current Start Date |
| Absence End | MAX of Approved End Date, if null MAX of Certificate End Date, if null MAX of Request End Date or Current RTW Date |
| Frequency | Frequency from Certificate Detail |
| Duration | Duration from Certificate Detail |
| Former Date of Absence | Previous Start Date |
| Date of Absence | Current Start Date |
| Former Start Time | Previous Absence Start Time |
| Start Time | Current Absence Start Time |
| Former Time Missed | Previous Absence Time Missed |
| Time Missed | Current Absence Time Missed |
| Former Status | Previous Status |
| Status | Current Status |
| Denial Reason | Denial Reason from Leave Detail |
| Leave Reason | Current Reason |
| Dept/Location | Department name from HR data |
| Work State | Work State from HR data |
| Exempt/Non Exempt | Exempt from HR data |
| Supervisor Email | Supervisor Email Address |
| Claims Examiner Email | Claims Examiner Email Address |
| New Claim | New Record Flag |
| Sub Group A | Subgroup A value from HR data |
| Sub Group B | Subgroup B value from HR data |
| Sub Group C | Subgroup C value from HR data |
| Sub Group D | Subgroup D value from HR data |
| Sub Group E | Subgroup E value from HR data |
| Sub Group F | Subgroup F value from HR data |
| New Claim Notifications | The data on this tab includes all new claims/new records for the period |
| Employee Name | Last Name, First Name |
| Employee ID | Employee ID from HR data |
| Absence Type | Line of Business |
| Reason | Reason |
| Custom Questions/Reminders | Custom questions/reminders at intake |
| Answers/Acknowledged? | Answers/acknowledged flag at intake |
| Start | At intake, First date unable to perform (DIS) or First leave date (LOA) or Date of Injury (WC) or Accommodation requested date (ADA) |
| End | RTW Date |
| Intake Number | Intake Number |
| Workers' Comp Y/N | WC Concurrency Flag |
| Dept/Location | Department name from HR data |
| Work State | Work State from HR data |
| Exempt/Non Exempt | Exempt from HR data |
| Supervisor Email | Supervisor Email Address |
| Intermittent Leave Flag | Intermittent Indicator |
| Sub Group A | Subgroup A value from HR data |
| Sub Group B | Subgroup B value from HR data |
| Sub Group C | Subgroup C value from HR data |
| Sub Group D | Subgroup D value from HR data |
| Sub Group E | Subgroup E value from HR data |
| Sub Group F | Subgroup F value from HR data |
| Leave Policy Detail | The data on this tab includes leave policy for continuous leave |
| Employee Name | Last name, First name |
| Employee ID | Employee ID |
| Reason | Reason for leave |
| Policy Type | Policy Type |
| Policy Name | Policy nickname |
| Policy Status | Overall Policy status |
| Start Date | Approved start date |
| End Date | Approved end date |
| Exhaustion Date | Exhaustion date |

Figure 15H

SYSTEMS AND METHODS FOR ABSENTEE MANAGEMENT

CROSS-REFERENCE TO RELATED APPLICATION

This application claims priority to U.S. Provisional Application No. 62/839,167, entitled "Systems and Methods for Absentee Management," filed Apr. 26, 2019, which is hereby incorporated by reference in its entirety.

TECHNICAL FIELD

The disclosed embodiments relate generally to improved systems and methods for managing absentees.

BACKGROUND

The rights for employees to be absent from work have greatly improved over recent years due to changes in employment policies. These changes in employment policies include improved internal business practices as well as government mandated regulations, such as the signing of the Family and Medical Leave Act (FMLA) of 1993, which provides employees with job-protected and unpaid leave for qualified medical and family reasons. While these regulations and policies were created to improve workplace conditions for employees, compliance with these regulations and policies has proven difficult for businesses and organizations. For instance, approximately half of the workforce in the United States is covered by FMLA yet a majority of workers are unable to take advantage of the benefits provided by this regulation due to non-compliance from their employer (Armenia et al., 2014, "Workplace compliance with the law: The case of the family and medical leave act," Work and Occupations, (41.3), pg. 277). One source of non-compliance with these regulations and policies is an overload of information. This overload of information includes an inability to properly navigate the exact limitations and requirements for specific types of leave set forth by company policies and government regulations, which are particularly difficult for small business, ill-equipped human resource departments, and individual employees to adhere to and enforce in a cost effective manner (E. Kelly, 2010, "Failure to update: an institutional perspective on noncompliance with the Family and Medical Leave Act," Law and Society Review, (44.1), pg. 33). Further, this overload of information also stems from the sheer volume of reviewing and communicating absence claims within a respective company.

One approach to solve this issue of non-compliance and information overload is to create an online portal that is accessible to employees. Each employee is capable of requesting a claim for absence, which is then reviewable by a supervisor through the portal. While the portal provides a system to manage absences from a single point of access, the portal does not adequately address the above described issues, and particularly in consideration of the human aspect of managing absences. For instance, supervisors must log into the portal and actively seek desired information, such as navigating through the portal to find a listing of employees absent for a particular period of time. Supervisors quickly become flooded with absence claims and communications that are received from their numerous supervisees over prolonged periods of time, such as individual employees communicating their respective absence claims. Furthermore, if a hierarchy within a company shifts, such as termination or transfer of a supervisor, the portal does not account for this shift unless a human manually updates the system.

Thus, the difficulty of managing absenteeism within an evolving company, and in coordination with ensuring compliance to company policies and government mandate regulations, particularly at a level of an individual supervisor, presents many challenges for human resource departments.

The information disclosed in this Background section is only for enhancement of understanding of the general background of the invention and should not be taken as an acknowledgement or any form of suggestion that this information forms the prior art already known to a person skilled in the art.

SUMMARY

Given the above-background, what is needed in the art are improved systems and methods for managing absenteeism and claims for absences while maintaining compliance with various federal and state regulations as well as employer policies.

The present disclosure addresses, among others, the above-identified needs in the art by providing systems and methods for absentee management. A feed of demographic information of employees within a company is acquired on a recurring basis and parsed to determine a hierarchy within the company as well as other pertinent information. This recurring feed ensures that the hierarchy within the company is properly defined as the company continues to grow and evolve, while also providing the most up to date information related to each employee. Through this recurring feed, absentee information is determined for each employee, and, if an employee is determined to have relevant absentee information, this information is communicated to their respective supervisor. Supervisors are automatically provided a notification with the most recent information related to each of their supervisees that has relevant absentee information, as well as having an associated account created for the supervisor. Each notification and account are provided to the respective supervisor without further human interaction. To review the most recent information, each supervisor only needs to review the most recently received notification, since each notification is an up to date summary of all the current absences, future absence requests, and/or retrospective absences.

Accordingly, various aspects of the present disclosure provide systems and methods for absentee management. Providing absentee management includes obtaining a demographic feed of employee records, each corresponding to an employee for an entity. Each record includes the name of the corresponding employee and the name of a least one other employee which the corresponding employee shares a reporting relationship. The demographic feed is utilized to construct an organizational tree with various nodes, where each node in the organizational tree represents an employee. An absentee status feed is obtained that includes one or more absentee statuses. Each absentee status corresponds to an employee and includes an absentee status category. From the organization tree and the demographic feed, a set of supervisors is determined at the entity. Each respective supervisor in the set of supervisors supervises at least one supervisee having an absentee status category. Accordingly, a different supervisor status notification is communicated to each supervisor. The different supervisor status notification provides a listing of each supervisee that reports to the respective supervisor having an absentee status category. This is advantageous because the systems and methods account for the human aspect of being a supervisor by minimizing the amount of interaction the supervisor has with the systems and methods while providing highly relevant information and ensuring compliance with company policies and government regulations.

In more detail, one aspect of the present disclosure provides a system for absentee management. The system includes one or more processors and memory that is coupled to the one or more processors. The memory stores one or more programs that is configured to be executed by the one or more processors. Accordingly, the one or more programs singularly or collectively include instructions for obtaining a demographic feed. The demographic feed includes a plurality of employee records. Each respective employee record in the plurality of employee records corresponds to an employee in a plurality of employees for an entity. Further, each respective record includes a name of the corresponding employee and a name of a least one other employee in the plurality of employees to which the corresponding employee shares a reporting relationship. The one or more programs further include instructions for using the demographic feed to construct an organizational tree. The organizational tree includes a plurality of nodes, with each respective node in the plurality of nodes representing an employee in the plurality of employees. The one or more programs further include instructions for obtaining an absentee status feed. The absentee status feed includes a plurality of absentee statuses. Each absentee status in the plurality of absentee statuses corresponds to an employee in a set of employees in the plurality of employees. Furthermore, each respective absentee status includes an absentee status category that is in an enumerated list of absentee status categories. The one or more programs further include instructions for determining a set of supervisors at the entity from the organization tree and the demographic feed. Each respective supervisor in the set of supervisors directly or indirectly supervises at least one supervisee having an absentee status category that is in the enumerated list of absentee status categories. Additionally, the one or more programs further include instructions for communicating a different supervisor status notification to each respective supervisor in the set of supervisors. This communicating is without further human intervention by the respective supervisor. The different supervisor status notification provides a listing of each supervisee that directly or indirectly reports to the respective supervisor having an absentee status category that is in the enumerated list of absentee status categories together with a current absentee status of the supervisee.

In some embodiments, the reporting relationship is one in which the corresponding employee directly supervises the at least one other employee.

In some embodiments, the reporting relationship is one in which the corresponding employee is directly supervised by the at least one other employee.

In some embodiments, the reporting relationship is one in which the corresponding employee is directly supervised by the at least one other employee. Furthermore, each respective employee record further includes an e-mail address of the corresponding employee and an e-mail address of the at least one other employee to which the corresponding employee shares the reporting relationship.

In some embodiments, the plurality of employees includes 1,000 employees. In some embodiments, the plurality of employees includes 500,000 employees.

In some embodiments, a supervisor to supervisee ratio at the entity is at least 1 to 5. In some embodiments, a supervisor to supervisee ratio at the entity is at least 1 to 20.

In some embodiments, the entity is a business organization, a governmental agency, or a non-profit organization.

In some embodiments, the listing in the supervisor notification provides, for each respective supervisee of the supervisor, a name of the respective supervisee, an absence start date, an absence end date, optionally an update to the absence start date, a reason for an absence, an approval status of an absence of the respective supervisee, and the absentee status category of the respective supervisee.

In some embodiments, the listing is bifurcated between a first listing portion that consists of supervisees that are absent or planning to be absent for one or more days and a second listing portions that consists of supervisees that are absent or planning to be absent for less than a day. The first listing portion further provides for each respective supervisee of the supervisor that is absent or planning to be absent for more than one day, a return to work date and optionally an update to the return to work date. The second listing portion provides, for each respective supervisee of the supervisor that is absent or planning to be absent for less than one day, an absence start time, optionally an update to the absence start time, an absence duration, optionally an update to the absence duration, and an indication as to whether the absence have been approved, denied, is pending or has been cancelled.

In some embodiments, the absentee status feed is obtained on a recurring basis (e.g. each day that the entity has a working day, each month, etc.).

In some embodiments, the absentee status feed is subsumed by the demographic feed. In some embodiments, the absentee status feed is obtained from a second computer system remote from the first computer system.

In some embodiments, the set of employees of the absentee status feed includes each employee in the plurality of employees for the entity. In some embodiments, the set of employees of the absentee status feed includes a portion of the plurality of employees for the entity.

In some embodiments, the enumerated list of absentee status categories includes a leave of absence for an accommodation, an absence to care for a child, a maternity leave, a paternity leave, an absence due to sickness of the supervisee, an absence to care for a parent, an absence related to pregnancy of the supervisee, or an absence to care for a spouse or significant other of the supervisee.

In some embodiments, the one or more programs further include instructions for granting each respective supervisor in the set of supervisors a corresponding account. The corresponding account provides a portal for reviewing absentee information of each supervisee that directly or indirectly reports to the respective supervisor that presently has or is about to have an absentee status category that is in the enumerated list of absentee status categories.

In some embodiments, the one or more programs further include instructions to evaluate, at each respective instance on a recurring basis, whether to communicate the different supervisor status notification to the respective supervisor. When there has been a change in the listing of any supervisee that directly or indirectly reports to the respective supervisor having an absentee status category that is in the enumerated list of absentee status categories, the notification is communicated to the respective supervisor at the respective instance. Moreover, when there has been no change in the listing of each supervisee that directly or indirectly reports to the respective supervisor having an absentee status category that is in the enumerated list of absentee status categories, the notification is not communicated to the respective supervisor at the respective instance.

In some embodiments, the recurring basis is each day that the entity has a working day.

In some embodiments, the communicating the different supervisor status notification to the respective supervisor includes sending the notification to the different supervisor by E-mail.

In some embodiments, the change in the listing is an addition of a supervisee or a removal of a supervisee from the listing.

In some embodiments, the change in the listing includes, for a supervisee in the listing, an update to an absence start date, a change in an approval status of an absence, a change in the absentee status category, a change in a return to work date, a change in an absence start time, a change in an absence duration, or a change in an indication as to whether an absence has been approved.

In some embodiments, the listing further includes instructions from the entity to the respective supervisor on how to handle supervisee absences.

In some embodiments, the one or more programs singularly or collectively further include instructions for providing a different absentee calendar to each respective supervisor in the set of supervisors. Furthermore, the different absentee calendar provides, for each respective day depicted in the calendar, a representation of a number of supervisees that directly or indirectly report to the respective supervisor that are absent that day.

In some embodiments, the different absentee calendar further includes an indication of one or more events associated with the entity.

In some embodiments, the different absentee calendar further includes an indication of a total number of supervisees that report the respective supervisor.

In some embodiments, the absentee calendar covers a rolling period (e.g., one month, six months, or a year) that encompasses a contiguous past portion, a contiguous present portion, and a contiguous future portion. In some embodiments, the rolling period is a one year rolling period that consists of the past six months, the present month and the next five months.

In some embodiments, the absentee calendar further provides instructions for receiving a supervisor selection of a nominal (first) day depicted in the calendar. Responsive to supervisor selection of the first day, an accounting of the number of supervisees that directly or indirectly report to the respective supervisor that are absent on the first day is provided. The accounting provides the names of supervisees that are absent on the first day and an indication that it is the first day they are absent, the names of supervisees whose absence on the first day is part of a continuation of an absence from prior days and an indication that it a continued absence, the names of the supervisees whose return to work day is on the first day, and the names of supervisees whose absence on the first day is a partial absence, and for each supervisee whose absence on the first day is a partial absence, a start time, duration, and reason for the partial absence.

In some embodiments, the different absentee calendar provides an option to allow the respective supervisor to select from among all direct reports of the respective supervisor, all employees of the entity, or a reporting hierarchy of the respective supervisor.

In some embodiments, the different absentee calendar provides an option to allow the respective supervisor to filter the representation of the number of supervisees that directly or indirectly report to the respective supervisor that are absent that day by whether such absences are new for that day, whether such absences are partial for that day, whether the supervisee is returning to work on that day, or whether such absences are recurring for that day.

In some embodiments, the different absentee calendar provides one or more one click report options. When the respective supervisor selects a respective one click report from among the one or more one click reports, a corresponding report regarding absenteeism of the supervisees that directly or indirectly report to the respective supervisor is provided.

In some embodiments, the different absentee calendar includes a search prompt that allows the different supervisor to search for an employee within the entity. When the different supervisor runs a search for an employee within the entity and a matching employee is also a supervisor, the one or more programs further includes instructions to prompt the different supervisor as to whether the different supervisor wants to review an absenteeism record of the matching employee or an absenteeism of the supervisees of the matching employee.

In some embodiments, the different absentee calendar includes a search prompt that allows the different supervisor to search for an employee within the entity. When the different supervisor runs a search for an employee within the entity, the one or more programs further includes instructions to display an absentee calendar for the employee.

In some embodiments, the absentee status of the corresponding employee is a paid absence, an unpaid absence, and/or is governed by a federal policy, a state policy, or an employer policy that permits an employee to be absent from work.

In some embodiments, the one or more programs further include instructions for receiving a supervisor selection a first employee in the plurality of employees. Responsive to receiving the supervisor selection of the first employee in the plurality of employees, the different supervisor status notification is communicated to the first employee in the plurality of employees selected by the respective supervisor without further intervention by either the respective supervisor or the first employee.

In some embodiments, the first employee is a supervisor in the set of supervisors at the entity. In some embodiments, the first employee is a supervisee at the entity.

In some embodiments, responsive to receiving the supervisor selection of the first employee in the plurality of employees, the different supervisor status notification is communicated to the first employee in the plurality of employees selected by the respective supervisor and the respective supervisor without further intervention by either the respective supervisor or the first employee.

In another aspect of the present disclosure, some embodiments include a method for providing absentee management according to any of the systems described herein.

In yet another aspect of the present disclosure, some embodiments include a non-transitory computer-readable storage medium storing one or more programs in a computing device. The computing device includes one or more processors and memory storing the one or more programs for execution by the one or more processors. The one or more programs singularly or collectively include instructions for running an application on the computing device that executes any of the methods described herein.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings.

FIGS. 6A, 6B, 6C, 6D, 6E, and 6F collectively illustrate a flowchart of processes and features of systems and methods for absentee management, in accordance with an embodiment of the present disclosure, in which elements in dashed boxes or dashed lines are optional;

FIG. 7A is a screen image showing an aspect of an absentee calendar system in which a supervisor views a continuous absence portion listing of a status notification, in accordance with an embodiment of the present disclosure;

FIG. 7B is a screen image showing an aspect of an absentee calendar system in which a supervisor views a first partial absence portion listing of a status notification, in accordance with an embodiment of the present disclosure;

FIG. 7C is a screen image showing an aspect of an absentee calendar system in which a supervisor views a first partial absence portion listing of a status notification, in accordance with an embodiment of the present disclosure;

FIG. 7D is a screen image showing an aspect of an absentee calendar system in which a supervisor views a set of instructions, in accordance with an embodiment of the present disclosure;

FIG. 8B is a screen image showing an aspect of an absentee calendar system in which a supervisor views a sub-report, in accordance with an embodiment of the present disclosure;

FIG. 13B is a screen image showing yet another aspect of an absentee calendar system in which one supervisor views an absentee calendar related to supervisees of another supervisor, in accordance with an embodiment of the present disclosure;

FIG. 14B is a screen image showing yet another aspect of an absentee calendar system in which a supervisor views an absentee calendar for a particular supervisee, in accordance with an embodiment of the present disclosure;

FIG. 14C is a screen image showing yet another aspect of an absentee calendar system in which a supervisor views an absentee calendar for a particular supervisee, in accordance with an embodiment of the present disclosure;

FIG. 15A is a screen image showing yet another aspect of an absentee calendar system in which a supervisor views a status notification that includes information related to continuous absences, in accordance with an embodiment of the present disclosure;

FIG. 15B is a screen image showing yet another aspect of an absentee calendar system in which a supervisor views a status notification that includes additional information related to continuous absences, in accordance with an embodiment of the present disclosure;

FIG. 15C is a screen image showing yet another aspect of an absentee calendar system in which a supervisor views a status notification that includes information related to intermittent absences, in accordance with an embodiment of the present disclosure;

FIG. 15D is a screen image showing yet another aspect of an absentee calendar system in which a supervisor views a status notification that includes information related to new absence claims, in accordance with an embodiment of the present disclosure;

FIG. 15E is a screen image showing yet another aspect of an absentee calendar system in which a supervisor views a status notification that includes information related to continuous leave absences, in accordance with an embodiment of the present disclosure;

FIG. 15F is a screen image showing yet another aspect of an absentee calendar system in which a supervisor views a status notification that includes information related to continuous leave absences, in accordance with an embodiment of the present disclosure;

FIG. 15G is a screen image showing yet another aspect of an absentee calendar system in which a supervisor views a status notification that includes information related to continuous leave absences, in accordance with an embodiment of the present disclosure;

FIG. 15H is a screen image showing yet another aspect of an absentee calendar system in which a supervisor views a status notification that includes information related to continuous leave absences, in accordance with an embodiment of the present disclosure;

Like reference numerals refer to corresponding parts throughout the several views of the drawings.

DETAILED DESCRIPTION

Figure 1:
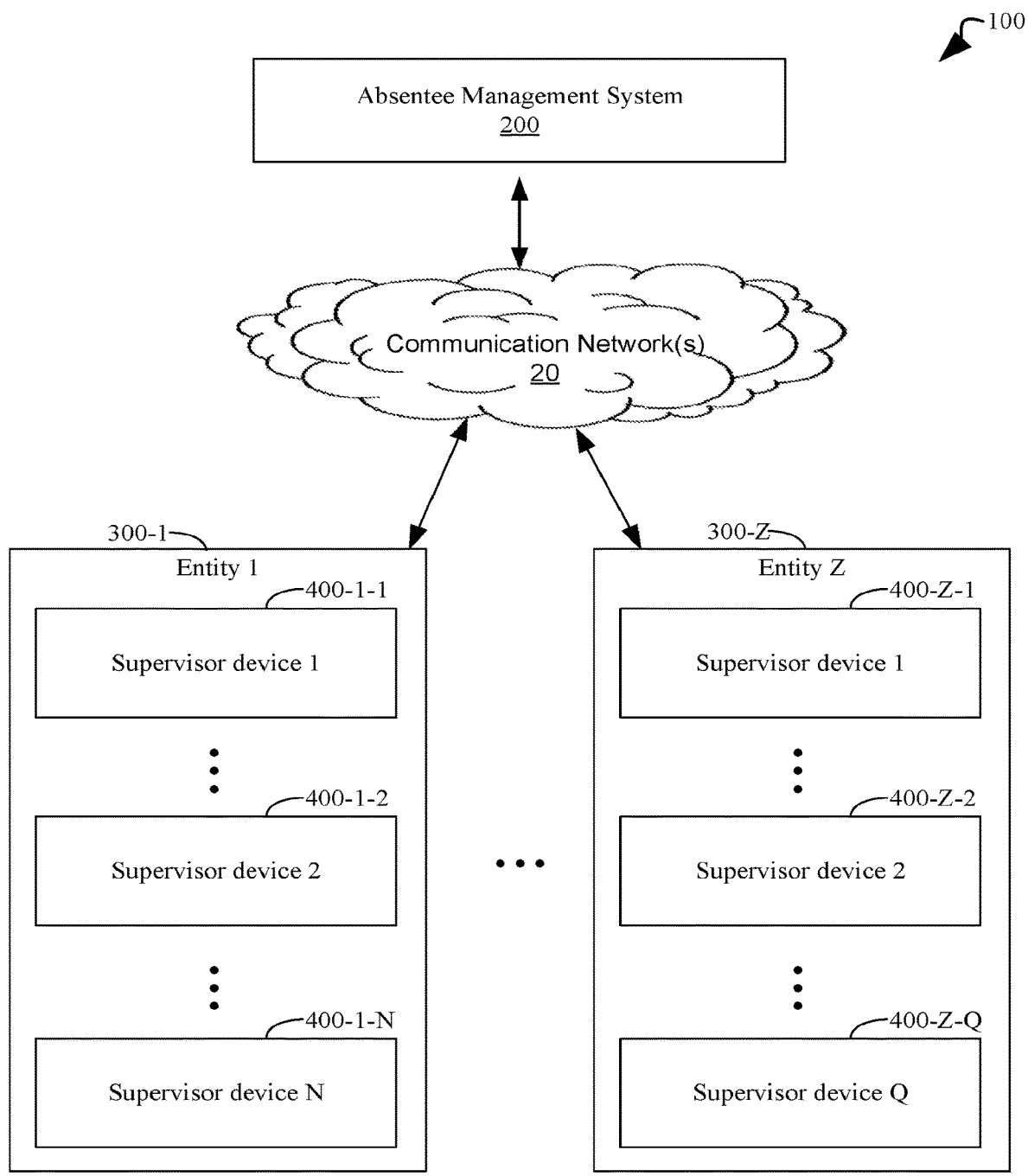
FIG. 1 illustrates an exemplary system topology for providing absentee management that includes an absentee management system, in accordance with an embodiment of the present disclosure.

The present disclosure provides systems and methods for managing absenteeism in one or more entities. Management of absenteeism is essential in order for a respective entity to comply with various government regulations and company policies, such as federal regulations and insurance policies. In particular, the present disclosure provides clarity regarding absenteeism of employees each supervisor is responsible for through succinct communications provided to certain supervisors of a respective entity. Communications are self-standing, in that a supervisor only needs to view a most recently received communication to view absentee information, and is only provided to supervisors that are responsible for absent, or soon to be absent, employees. These limitations in terms of who receives notification communications, and what these notification communications contain, reduces the amount of information processed by each respective supervisor, while also preventing the supervisor from having to review and/or extract information from multiple sources (e.g., multiple emails, spreadsheets, and/or web pages) to receive the most relevant and recent information. Furthermore, these communications provide a view of absenteeism that is based on a security model provided by each entity, which prevents supervisors from accessing information related to employees for which they are not directly or indirectly responsible.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, and components have not been described in detail so as not to unnecessarily obscure aspects of the embodiments.

Plural instances may be provided for components, operations or structures described herein as a single instance. Finally, boundaries between various components, operations, and data stores are somewhat arbitrary, and particular operations are illustrated in the context of specific illustrative configurations. Other forms of functionality are envisioned and may fall within the scope of the embodiment(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the embodiment(s).

It will also be understood that, although the terms "first," "second," etc. may be used herein to describe various elements, these elements should not be limited by these terms. These terms are only used to distinguish one element from another. For example, a first entity could be termed a second entity, and, similarly, a second entity could be termed a first entity, without changing the meaning of the description, so long as all occurrences of the "first entity" are renamed consistently and all occurrences of the "second entity" are renamed consistently. The first entity, and the second entity are both entities, but they are not the same entity.

The terminology used herein is for the purpose of describing particular embodiments only and is not intended to be limiting of the claims. As used in the description of the embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative embodiments. For purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

The foregoing description, for purpose of explanation, has been described with reference to specific embodiments. However, the illustrative discussions below are not intended to be exhaustive or to limit the embodiments to the precise forms disclosed. Many modifications and variations are possible in view of the above teachings. The embodiments are chosen and described in order to best explain the principles and their practical applications, to thereby enable others skilled in the art to best utilize the embodiments and various embodiments with various modifications as are suited to the particular use contemplated.

In the interest of clarity, not all of the routine features of the embodiments described herein are shown and described. It will be appreciated that, in the development of any such actual embodiment, numerous embodiment-specific decisions are made in order to achieve the designer's specific goals, such as compliance with use case- and business-related constraints, and that these specific goals will vary from one embodiment to another and from one designer to another. Moreover, it will be appreciated that such a design effort might be complex and time-consuming, but nevertheless be a routine undertaking of engineering for those of ordering skill in the art having the benefit of the present disclosure.

Furthermore, when a reference number is given an "$i^{th}$" denotation, the reference number refers to a generic component, set, or embodiment. For instance, a graphical icon termed "entity i" refers to the $i^{th}$ entity in a plurality of entities (e.g., an entity system 300-$i$ in a plurality of entity systems 300).

Providing absentee management includes obtaining a demographic feed of employee records, with each record corresponding to an employee of an entity. Each record includes a name of the corresponding employee and a name of a least one other employee which the corresponding employee shares a reporting relationship. The demographic feed is utilized to construct a hierarchy of the respective entity, which is represented through an organizational tree with various nodes, each node representing an employee of the entity. Furthermore, an absentee status feed is obtained that includes absentee statuses. Each absentee status corresponds to an employee of the entity and includes an absentee status category. From the organization tree and the demographic feed, a set of supervisors is determined at the entity (e.g., the hierarchy is determined). Each respective supervisor in the set of supervisors supervises at least one supervisee having an absentee status category. Accordingly, a different supervisor status notification is communicated to each supervisor that has supervisees that are presently absent or are planning to be absent. The supervisor status notification provides a listing of each supervisee that reports to the respective supervisor having an absentee status that falls within an enumerated absentee status category.

Now that an overview of improved systems and methods for absentee management has been provided, additional details of systems, devices, and/or computers in accordance with the present disclosure are now described in relation to at least FIGS. 1 through 5.

FIG. 1 is a block diagram illustrating a distributed computing system 100, in accordance with some embodiments of the present disclosure. The system 100 includes an absentee management system 200 that facilitates management of one or more absentees for various entities of the system, through at least providing absence claim compliance and status notifications of absenteeism. The system also, optionally, provides a calendar to each supervisor of the respective entity, which accounts for the absences of supervisees of each supervisor. Furthermore, the system facilitates various actions, tasks, and communications between a variety of intermediary entities (e.g., a first entity system 300-1, a $Z^{th}$ entity system 300-Z, etc.), the supervisors of these entities (e.g., supervisor device 400-1-1, supervisor device 400-1-2, . . . , supervisor device 400-1-N, . . . , supervisor device 400-Z-1, supervisor device 400-Z-2, . . . , supervisor device 400-Z-Q, etc.), and optionally one or more external servers and/or devices, such as a server and/or device associated with an insurance provider or a medical provider.

Of course, other topologies of the computer system 100 are possible. For instance, in some embodiments, any of the illustrated devices and systems can in fact constitute several computer systems that are linked together in a network, or be a virtual machine or a container in a cloud computing environment. Moreover, rather than relying on a physical communications network 20, the illustrated devices and systems may wirelessly transmit information between each other. As such, the exemplary topology shown in FIG. 1 merely serves to describe the features of an embodiment of the present disclosure in a manner that will be readily understood to one of skill in the art.

Referring to FIG. 1, in some embodiments, a computer system 100 includes an absentee management system 200, hereinafter "absentee system," that is associated with one or more entities 300.

In some embodiments, the communications network 20 interconnects the absentee system 200 and the various entities 300 including their corresponding supervisor devices 400 with each other, as well as optional external systems and devices. In some embodiments, the communication network 20 optionally includes the Internet, one or more local area networks (LANs), one or more wide area networks (WANs), other types of networks, or a combination of such networks.

Examples of networks 20 include the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Now that the distributed system 100 has generally been described, an exemplary absentee system 200 for management employees for one or more entities will be described with reference to FIG. 1 and FIG. 2. In various embodiments, the absentee system 200 includes one or more processing units (CPUs) 276, a network or other communications interface 286, a memory 202 (e.g., a random access memory), one or more magnetic disk storage and/or persistent device 290 optionally accessed by one or more controllers 288, one or more communication busses 213 for interconnecting the aforementioned components, and a power supply 278 for powering the aforementioned components. Furthermore, in some embodiments, the absentee system 200 includes a user interface 280 that enables a user to manipulate the absentee system. In some embodiments, the user interface 280 includes a display 282 and an input device 284 (e.g., a keyboard, a mouse, etc.) for use by the user. In some embodiments, data in memory 202 is seamlessly shared with non-volatile memory 290 using known computing techniques such as caching. In some embodiments, memory 202 and/or memory 290 may in fact be hosted on computers that are external to the absentee system 200 but that can be electronically accessed by the absentee system 200 over an Internet, intranet, or other form of network or electronic cable (illustrated as element 20 in FIG. 2) using network interface 284.

In some embodiments, the memory 202 of the absentee system 200 for absentee management stores:

an operating system 204 (e.g., ANDROID, iOS, DARWIN, RTXC, LINUX, UNIX, OS X, WINDOWS, or an embedded operating system such as VxWorks) that includes procedures for handling various basic system services;

an entity data store 210 that stores data and information related to one or more entities 220 (e.g., entity 300 of FIG. 1), each entity 220 having associated data and information that includes:

an organization tree 230 that represents a hierarchy of the corresponding entity 220, a supervisor data store 240 that stores data and information related to each supervisor 242 associated with the corresponding entity 220, each respective supervisor 242 having associated data and information that includes:

identifying information 244 that stores data and information related to identify information the respective supervisor, such as a name, an address, account information, etc., and a supervisee data store 246 that stores data and information related to each respective supervisee 248 of the corresponding supervisor 242, the data and information related to each supervisee 248 including at least a supervisee absence status 250, a compliance information store 260 that stores data and information related to various entity, government, and regional compliance protocols and practices, and a human resources information store 262 that stores data and information related to human resources (HR) and various benefits of the corresponding entity 220;

a notification generation module 270 that facilitates generating one or more notifications to provide to the entities 300 and/or supervisors 400 of the respective entity; and a calendar generation module 272 that facilitates generating one or more calendars to provide to the entities 300 and/or supervisors 400 of the respective entity.

As described above, the entity data store 210 includes data and information related to each respective entity 220. In some embodiments, each entity 220 corresponds to an entity system 300 of FIG. 1 for (e.g., entity 220-1 of FIG. 2 corresponds to entity 300-1 of FIG. 1, entity 220-Z of FIG. 2 corresponds to entity 300-Z of FIG. 1, etc.). However, the present disclosure is not limited thereto. For instance, in some embodiments, each entity 220 includes one or more entities that have one or more shared aspects, such as a shared insurance policy (e.g., compliance information 260 and/or human resources (HR) information 262), and/or are each subsidiaries of a same parent entity (e.g., a shared board of directors). Entities 300 of the present disclosure include business organizations such as small business and international corporations, government agencies such regional government departments and/or educational institutions, and/or non-profit organizations such as charities in some embodiments.

Each entity 220 stored by the absence system 200 includes an organization tree 230. The organizational tree 230 assists in determining a hierarchy of the employees and supervisors of the corresponding entity 300. This organizational tree 230 is continuously updated as the hierarchy changes within the corresponding entity 300. In some embodiments, the organizational tree 230 is generated from data and information supplied by each entity 300. This data and information may be supplied from a demographic feed that is communicated by each entity 300. For instance, in some embodiments, the demographic feed is provided by an entity 300 through an application (e.g., human resource management software) associated with the entity 300. These applications include PeopleSoft, Automated Data Processing (ADP), Systems Applications and Products in Data Processing: Human Capital Management (SAP: HCM), Workday, and the like. However, the present disclosure is not limited thereto. For instance, in some embodiments, the organizational tree 230 is generated by analyzing employee records provided by the entity 300 (e.g., supervisor identifying information 244, supervisee information 248, and/or employee records 308 of FIG. 3). In some embodiments, data and information received from each entity 300 through the demographic feed includes one or more incomplete, or deficient, employee records. Incomplete employee records include records that do not include and/or indicate supervisor information (e.g., a missing supervisor name and/or address data field), which creates one or more gaps or voids in the organizational tree 230 (e.g., a node uncoupled from another node). For instance, in accordance with a determination that an entity 300 communicates 10,000 employee records in a demographic feed yet only 9998 records are recognized by the absentee system 200, the absentee system 200 will provide the results of this determination in a future notification. Additional details and information related to notifications of the present disclosure will be described infra, with particular reference to at least block 650 of FIG. 6C through block 666 of FIG. 6D, as well as FIG. 7A through FIG. 7D.

Nevertheless, each organizational tree 230 includes one or more nodes that is interconnected to other nodes through linking branches. Each linking branch represents a reporting relationship within the hierarchy of the entity 300. For instance, in some embodiments, an organizational tree 230 includes a corresponding node for each supervisor of the corresponding entity 300, and these nodes of the supervisor may include one or more respective daughter nodes that represent each supervisee the corresponding supervisor is responsible for (e.g., daughter supervisee nodes are linked to corresponding parent supervisor nodes). Moreover, each parent supervisor node may be a daughter node to a higher parent node in the hierarchy of the entity 300. For instance, a chief technical officer (CTO) may represent a first parent node with project managers representing daughter nodes linked to the first parent node of the CTO. Accordingly, each of these project manager daughter nodes may also act as parent nodes to various employee daughter nodes that are assigned to the corresponding project of the project manager. This parent-daughter to parent-daughter relation may propagate throughout the organizational tree 230 depending on a structure and a number of employees of each entity 300. Furthermore, in some embodiments, a top node of the organizational tree 230 (e.g., a node that represents a CEO of the respective entity 300) is excluded from the organizational tree, and optionally stored in a separate organization tree or configuration table. Excluding the top node (e.g., CEO) from the organization tree reduces a reliability on the CEO to have a blank supervisor or be set to their own email address within the demographic feed (e.g., the CEO only reports to themselves). Moreover, in some embodiments, the CEO top node is included in the organization tree 230 and includes supervisee information related to a board of the respective entity 300, which supervises the CEO. The organizational tree 230 associated with each entity 300 (e.g., entity 220 of FIG. 2) provides a representation of which employee reports to which supervisor, which supervisor reports to which manager, which manager reports to which director, etc. upwards to the CEO level. Additional details and information related to the organization tree and determining a hierarchy of each entity of the present disclosure will be described infra, with particular reference to at least block 604 of FIG. 6A through block 646 of FIG. 6C.

Accordingly, the supervisor data 240 associated with each entity 220 stores information related to one or more supervisors (e.g., a first supervisor 242-1, a second supervisor 242-2, ..., a $N^{th}$ supervisor 242-N, etc.) of the respective entity. This information includes identifying information 244 of the corresponding supervisor 242. For instance, in some embodiments, the identifying information 244 that is stored includes a name of the supervisor 242, an email address associated with the supervisor, a name of at least one other employee that shares a reporting relationship with the supervisee (e.g., the at least one other employee is a supervisor, the at least one other employee is a supervisee), an email address of the at least one other employee that shares the reporting relation, account information of the respective supervisor such as a username and/or a password, absentee status information, or a combination thereof. Furthermore, in some embodiments, the identifying information 244 includes an account creation date of the respective supervisor, an account deletion date of the respective supervisor, a hire date of the respective supervisor, a termination date of the respective supervisor, or a combination thereof. Additional details and information related to accounts of supervisors of an entity will be described in more detail infra, with particular reference to at least block 668 of FIG. 6D.

In some embodiments, the information related to the at least one other employee that shares the reporting relationship may be stored in, or determined from, each supervisee information 248. This supervisee information 248 provides identifying information of the corresponding employee that is a supervisee to the respective supervisor 242. In some embodiments, the supervisee information 248 includes the information as described above in relation to the identifying information 244 of the supervisor 242. For instance, in some embodiments, the identifying information 244 of each supervisor 242 includes identical data fields as each supervisee information 248 (e.g., the identifying information 244 of each supervisor and each supervisee information 248 are employee records 308 of FIG. 3 that are communicated through the demographic feed). To this point, in some embodiments, each employee record may include contact information (e.g., a name, an email address, etc.) associated with an HR representative of the corresponding entity 300 instead of a supervisor. Moreover, in some embodiments, an HR representative is included in combination with the supervisor information. This combination allows for an HR representative of the respective entity 300 to oversee various aspects of the present disclosure, such as reviewing a corresponding calendar for a respective supervisor, since the HR representative will also be provided a notification for each employee record that the HR representative is included in.

In some embodiments, one or more of the supervisee information 248 for a particular supervisor 242 includes an absence status 250. This absence status 250 includes information related to a past absence, a current (e.g., ongoing) absence, a future (e.g., scheduled and/or requested) absence, or a combination thereof. Furthermore, in some embodiments, the absence status 250 includes various information pertaining to one or more absentee status categories that are associated with a respective employee. For instance, in some embodiments, the absentee status categories include a leave of absence for an accommodation (e.g., a medical appointment, a funeral, a personal day, a vacation, a wedding, etc.), an absence to care for a child of the supervisee, a maternity leave, a paternity leave, an absence related to a pregnancy of the supervisee, or an absence to care for a spouse and/or significant other of the supervisee. One skilled in the art will appreciate that other absentee status categories may be included that are not described in the present disclosure, but are within the scope of the present disclosure. These other absentee status categories may relate to regional practices and laws (e.g., a required jury duty, a regional holiday, etc.), as well as a type of each entity. For instance, in some embodiments, an absentee status category is included for required military and/or civil service, such as an entity 300 located in Singapore.

Furthermore, in some embodiments, each employee associated with an entity 300 has an employee record (e.g., employee records 308 of FIG. 3) communicated in the demographic feed. However, the present disclosure is not limited thereto. For instance, in some embodiments, only employee records that include an absentee status associated with the employee (e.g., includes the absence status 250) are communicated through the demographic feed. This selective communication yields a lightweight system (e.g., less time and/or resources required to process data and information of the demographic feed) that is not bogged by unnecessary information that is not pertinent to each supervisor 242. For instance, if a supervisor 242 has a team of 275 associated supervisees but only one of these has an absence status, then the supervisor does not need information pertaining to the other 274 supervisees who are presently at work when managing absenteeism of their respective team.

In some embodiments, a compliance information store 260 is associated with each entity 220 of the absentee system 200. In some embodiments, the absentee system 200 stores a single compliance information store 260 that is utilized by each respective entity 220. The compliance information store 260 facilitates storing data and information related to various compliance protocols and guidelines associated with the entity 300. For instance, if the entity 220 has an insurance policy that must be adhered to, this policy is incorporated within the compliance information store 260. Similarly, in some embodiments, local and/or regional laws and guidelines are stored in the compliance information store 260. To this point, in some embodiments, the compliance information store 260 includes, and optionally updates on a recurring basis, guidelines for managing employees with disabilities or workplace restrictions, such as the Americans with Disabilities Act "Americans with Disabilities Act Title II Regulations—Nondiscrimination on the Basis of Disability in State and Local Government Services," 28 Code of Federal Regulations Part 35, as well as the Americans with Disabilities Act "Americans with Disabilities Act Title III Regulations—Nondiscrimination on the Basis of Disability by Public Accommodations and in Commercial Facilities," 28 Code of Federal Regulations Part 36, each of which is hereby incorporated by reference in its entirety. Moreover, in some embodiments, the compliance information store 260 includes, and optionally updates on a recurring basis, guidelines for family and medical leave, such as the Wage and Hour Division of the United States Department of Labor, "The Employer's Guide to the Family and Medical Leave Act," WH 1421, print, which is hereby incorporated by reference in its entirety. The compliance information store 260 allows for entities to adhere to local guidelines without having to actively police these guidelines since they are automatically enforced through the absentee system 200. The absentee system 200 enforces these guidelines by reviewing claim past, present, and future absence claims of each respective employee and comparing this information to, at least, the various eligibility required for the respective claim. In some embodiments, a large national entity 300 includes compliance information 260 that pertains to each state and/or territory the entity operates in order to simplify compliance with these states and/or territories. Likewise, in some embodiments, a smaller local entity 300 includes compliance information 260 that pertains to a local area, since the entity may not be an expert at compliance with local practices. Furthermore, in some embodiments, when an employee is returning to work from an absence, the employee is required to adhere to one or more workplace restrictions related to their absence. For instance, in some embodiments, an employee is returning from work after a head injury, and requires an hour break for every three hours of work. Accordingly, this hour break compliance information is stored in the compliance information store 260 and/or in the employee record (e.g., supervisor 242 and/or supervisee 248).

Furthermore, in some embodiments, a human resources (HR) information store 262, hereinafter "HR store," is associated with each entity 220 of the absentee system 200. The HR store 262 facilitates storing data and information related to various HR protocols and practices, as well as any benefits that are associated with the respective entity 220. Accordingly, the absentee system 200 utilizes this information of the HR store 262 in order to ensure that each absence claim of a respective employee adheres to HR policies of the respective entity 300.

In some embodiments, the absentee system 200 includes a notification generation module 270 that facilitates generating notifications for one or more supervisors 242, and communicating these notifications to their respective recipients. As described above, in some embodiments, a notification is generated for each supervisor 242 that has a supervisee 248 having an absence status 250 associated with the supervisee. Accordingly, the notification includes information pertaining to each supervisee 248 which has an absence status 250 associated with the supervisee, and excludes supervisee 248 that do not have an absence status 250. This excluding allows the respective supervisor 242 to receive a notification in accordance with a determination that a supervisee is and/or going to be absent without diluting the notification with information related to supervises who are currently working, since this information is not pertinent for managing absentees. For instance, in some embodiments, the notification generation module 270 provides a listing (e.g., a listing of FIG. 7A through 7D) that includes each supervisee 248 that directly, or indirectly, reports to the respective supervisor 242 and has an absentee status category.

Furthermore, in some embodiments, the absentee system 200 includes a calendar generation module 280 that facilitates generating various calendars (e.g., a calendar of FIG. 8A) for viewing by respective supervisors 242. Additional details and information regarding calendars will be described in more detail infra, with particular reference to block 670 of FIG. 6E through block 690 of FIG. 6F.

In some embodiments, one or more of the above identified data elements or modules of the absentee system 200 are stored in one or more of the previously described memory devices (e.g., memory 202 and/or memory 290) and correspond to a set of instructions for performing a function as described above. The above-identified data, modules, and programs (e.g., sets of instructions) need not be implemented as separate software programs, procedures, or modules, and thus various subsets of these modules may be combined or otherwise re-arranged in various embodiments. In some embodiments, the memory 202 and/or memory 290 optionally stores a subset of modules and data structures identified above. Furthermore, in some embodiments, the memory 202 and/or memory 290 stores additional modules and data structures not described above. For instance, in some embodiments, the compliance information store 260 and the HR store 262 are subsumed as one data store. Similarly, in some embodiments, the notification generation module 270 and the calendar generation module 270 are subsumed as one module.

Figure 3:
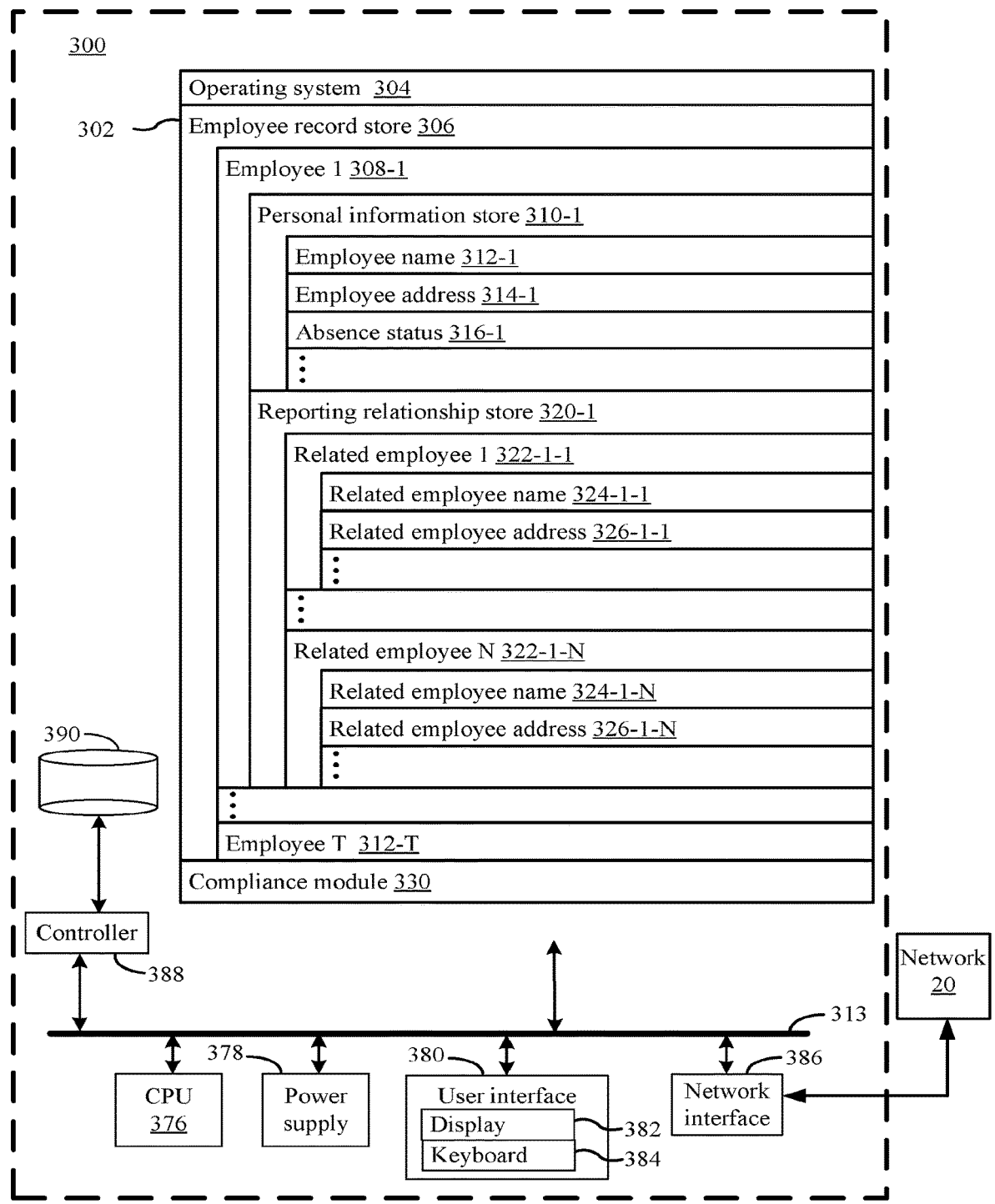
FIG. 3 illustrates an entity system for providing information regarding absentees, in accordance with an embodiment of the present disclosure.

Referring to FIG. 3, an exemplary entity system 300 for providing data and information related to employees of the entity, compliance information of the entity, and/or HR information of the entity to the absentee system 200 will be described with reference to FIGS. 1 and 3. In various embodiments, the entity system 300 includes one or more processing units (CPUs) 376, a network or other communications interface 386, a memory 302 (e.g., a random access memory), one or more magnetic disk storage and/or persistent device 390 optionally accessed by one or more controllers 388, one or more communication busses 313 for interconnecting the aforementioned components, and a power supply 378 for powering the aforementioned components. Furthermore, in some embodiments, the entity system 300 includes a user interface 380 that enables a user to manipulate the entity system. In some embodiments, the user interface 380 includes a display 382 and an input device 384 (e.g., a keyboard, a mouse, etc.) for use by the user. In some embodiments, data in memory 302 is seamlessly shared with non-volatile memory 390 using known computing techniques such as caching. In some embodiments, memory 302 and/or memory 390 may in fact be hosted on computers that are external to the entity system 300 but that can be electronically accessed by the entity system 300 over an Internet, intranet, or other form of network or electronic cable (illustrated as element 20 in FIG. 3) using network interface 384.

In some embodiments, the memory 302 of the entity system 300 for providing employee and compliance information stores:

an operating system 304 (e.g., ANDROID, iOS, DARWIN, RTXC, LINUX, UNIX, OS X, WINDOWS, or an embedded operating system such as VxWorks) that includes procedures for handling various basic system services;

an employee record store 306 that stores a corresponding record 308 of each employee of the entity, each employee record storing:

a personal information store 310 that stores personal information related to the respective employee such as an employee name 312, an employee addresses 314, and an absence status 316, and a reporting relationship store 320 that stores a record 322 related to other employees of the entity 300 that have a reporting relationship with the corresponding employee 308, each related employee record 322 including a name of the related employee 324 and an address of the related employee 326; and a compliance module 330 that stores information related to company compliance protocols and procedures.

As described above, each entity 300 stores a corresponding employee record 308 for each employee that works for the entity. Each employee record 308 includes personal information 310 that stores information related to the respective employee, such as an employee name 312 that includes a first name and a last name of the respective employee, and optionally a middle name and/or middle initial of the respective employee. Further personal information 310 associated with each employee record 308 includes the employee address 314. In some embodiments, the employee address 314 is one or more physical addresses associated with the respective employee, such as a home address and/or a mailing address of the respective employee. In some embodiments, the employee address includes a state of the respective employee such as a two-digit state code (e.g., AK, CA, NY, UT), a zip code of the respective employee, and/or a country code of the respective employee. In accordance with a determination that an employee resides outside of the United States, such as a Canadian employee, the above described fields are configured to accept international formats (e.g., a Canadian province code instead of state code, a Canadian zip code format such as A9A9A9, etc.). However, the present disclosure is not limited thereto. For instance, in some embodiments, the employee address 314 includes an email address that is associated with the respective employee, such as a personal email address and/or a workplace email address. In some embodiments, the personal information 310 of a respective employee record 308 includes a date of birth of the respective employee, a date of a most recent hire of the respective employee (e.g., for contracted employees), a date of original hire of the respective employee, a social security number of the respective employee, a phone number associated with the respective employee (e.g., a personal phone number such as a home phone and/or cell phone, and/or a workplace phone number such as an office phone and/or work cell phone), a marital status of the respective employee, a gender of the respective employee, or a combination thereof. Moreover, in some embodiments, the personal information 310 of a respective employee record 308 includes a workplace indicator (e.g., a telecommuter indicator, a remote worker indicator, a worksite indicator, etc.), which may include a distance from nearest office value (e.g., the respective employee is within 50 miles of a nearest office). In some embodiments, the personal information 310 of a respective employee record 308 includes various workplace information such as a department identifier (e.g., HR for an employee in the Human Recourses department, R&D for an employee in the research and development department, etc.), a workplace location (e.g., a department location, an office location, a cubical number, etc.), an employee position (e.g., analyst, senior vice president, administrative assistant, etc.), a working schedule (e.g., a listing of expected work shifts and/or previously worked shifts by the respective employee), an active indicator (e.g., a terminated employee is marked inactive, an employee on prolonged excused leave is marked active, etc.), a termination date of the respective employee, a workload identifier (e.g., part-time, full-time, contracted, etc.), an exemption indicator (e.g., an indicator to identify the employee as except from types of work and/or days of work), a wage of the respective employee (e.g., an annual salary of the respective employee, an hourly wage of the respective employee, etc.), or a combination thereof. In some embodiments, the active indicator and the termination date of the respective employee are subsumed. For instance, in some embodiments, the active indicator is a binary indicator (e.g., 0=active; 1=inactive) that is attached to a termination date, which is either blank, a previous date, a current date, or a future date. Accordingly, information pertaining to the respective employee may be purged from the absentee system 200 according to the listed termination date and active indicator (e.g., an inactive indicator with a blank date is purged, an active indicator with a blank date is not acted upon, an active indicator with a termination date in the past is purged, etc.) Nevertheless, in some embodiments, the personal information 310 of a respective employee record 308 includes various policy compliance information including a Federal Insurance Contributions Act (FICA) information (e.g., FICA year to date withheld of the respective employee), a short term disability (STD) eligibility identifier, an effective STD plan date, an STD supplemental eligibility identified (e.g., a buy-up plan, a supplemental plan, etc.), an effective STD supplemental plan date, a state and/or province plan eligibility identifier (e.g., a California voluntary plan), an effective state and/or province plan date, a long term disability (LTD) eligibility identifier, an effective LTD plan date, an LTD supplemental eligibility identified (e.g., a buy-up plan, a supplemental plan, etc.), an effective LTD supplemental plan date, or a combination thereof. In some embodiments, the personal information 310 of a respective employee record 308 includes miscellaneous information including a domestic partner identifier (e.g., an indicator for on-file affidavits of a domestic partnership), an identifier to indicate if a spouse of the respective employee is working at the same entity 300, a key employee identifier (e.g., an identifier to indicate the respective employee has a decision making role, an identifier to indicate the respective employee has an ownership in the entity, an identifier to indicate the respective employee is in a particular percentile of paid employees working for the entity (e.g., an identifier to indicate the respective employee is among the highest paid 10% of employees within 75 miles of the entity), or a combination thereof.

Each employee record 308 includes the reporting relationship store 320 that stores information pertaining to other employees at the respective entity 300 that share a reporting relationship with the respective employee. As previously described, the reporting relationship with the respective employee includes a supervisee relationship (e.g., the respective employee is a supervisee of another supervisor employee) and a supervisor relationship (e.g., the respective employee is a supervisor to another supervisee employee). In some embodiments, the related employees 322 that are included in the reporting relationship store 320 for a respective employee record 308 include direct reporting relationships (e.g., a parent node to daughter node relationship as determined through the organization tree 230 of FIG. 2) and/or an indirect reporting relationship (e.g., the respective employee does not share a direct parent node to daughter node relationship as determined through the organization tree such as a boss of the supervisor of the respective employee, an HR rep associated with the respective employee, etc.). In some embodiments, the information associated with each related employee includes a respective employee record 308 including a name 324 of the related employee and an address 326 of the related employee. The name 324 and address 326 of the related employee includes information that is stored in the employee record 308 associated with related employee, such as information as described above with respect to the employee name 312 and employee address 314.

Furthermore, each entity 300 includes the compliance module 330 that stores information related to various compliance protocols and procedures. In some embodiments, the protocols and procedures that are stored in the compliance module 330 include protocols and procedures related to internal entity policies (e.g., HR policies, payroll policies, etc.), entity insurance compliance policies (e.g., entity insurance plan policies such as mal-practice prevention, health insurance compliance, etc.), or a combination thereof. In some embodiments, the compliance module 330 is as described above with respect to the compliance module 260 of FIG. 2. Ensuring that each employee adheres to HR policies of the respective entity is of the upmost importance, and is accomplished by comparing each absence claim to information stored in the compliance module 330.

In some embodiments, one or more of the above identified data elements or modules of the entity system 300 are stored in one or more of the previously described memory devices (e.g., memory 302 and/or memory 390) and correspond to a set of instructions for performing a function as described above. The above-identified data, modules, and programs (e.g., sets of instructions) need not be implemented as separate software programs, procedures, or modules, and thus various subsets of these modules may be combined or otherwise re-arranged in various embodiments. In some embodiments, the memory 302 and/or memory 390 optionally stores a subset of modules and data structures identified above. Furthermore, in some embodiments, the memory 302 and/or memory 390 stores additional modules and data structures not described above.

Figure 4:
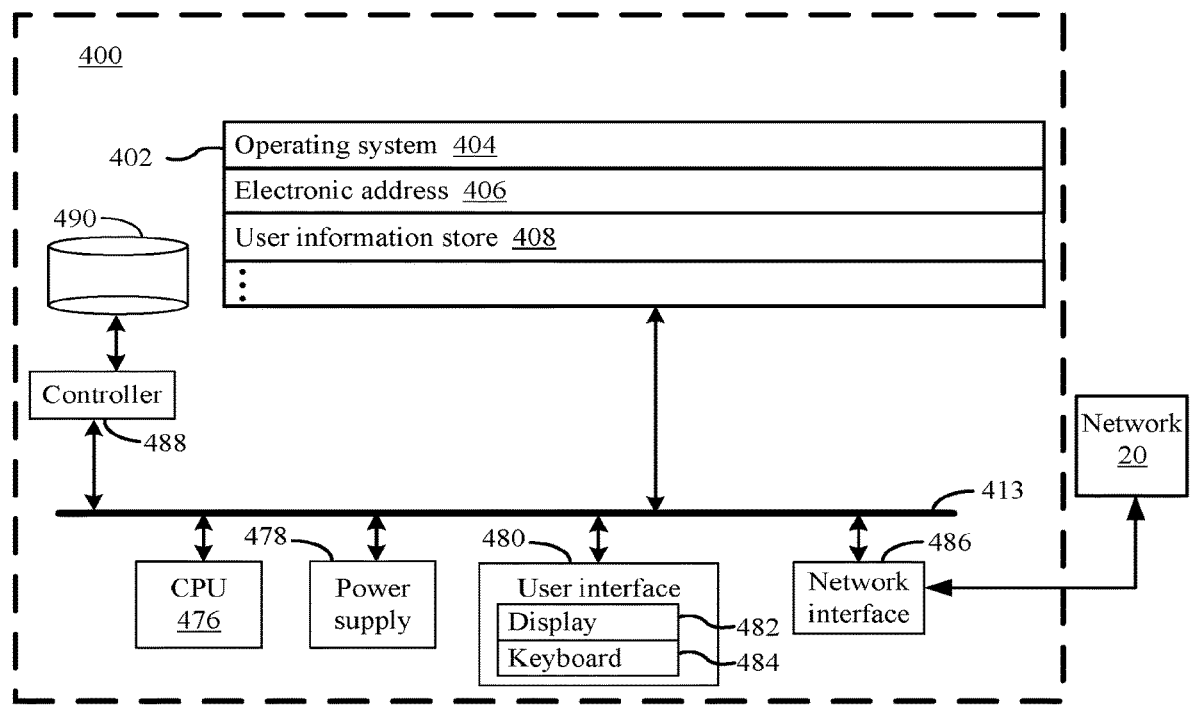
FIG. 4 illustrates a supervisor device for receiving absentee information and managing absentees, in accordance with an embodiment of the present disclosure.

An exemplary supervisor device 400 for receiving, reviewing, and/or managing absence information for a particular entity will be described with reference to FIGS. 1 and 4. In various embodiments, the supervisor device 400 includes one or more processing units (CPUs) 476, a network or other communications interface 486, a memory 402 (e.g., a random access memory), one or more magnetic disk storage and/or persistent device 490 optionally accessed by one or more controllers 488, one or more communication busses 413 for interconnecting the aforementioned components, and a power supply 478 for powering the aforementioned components. Furthermore, in some embodiments, the supervisor device 400 includes a user interface 480 that enables a user to manipulate the supervisor device. In some embodiments, the user interface 480 includes a display 482 and an input device 484 (e.g., a keyboard, a mouse, etc.) for use by the user. In some embodiments, data in memory 402 is seamlessly shared with non-volatile memory 490 using known computing techniques such as caching. In some embodiments, memory 402 and/or memory 490 may in fact be hosted on computers that are external to the supervisor device 400 but that can be electronically accessed by the supervisor device 400 over an Internet, intranet, or other form of network or electronic cable (illustrated as element 20 in FIG. 4) using network interface 484.

In some embodiments, the memory 402 of the supervisor device 400 for managing employee absences stores:

an operating system 404 (e.g., ANDROID, iOS, DARWIN, RTXC, LINUX, UNIX, OS X, WINDOWS, or an embedded operating system such as VxWorks) that includes procedures for handling various basic system services;

an electronic address 406 that is used to identify a particular supervisor device during communications with the system 100; and a user information store 408 that stores pertaining information related to the respective supervisor associated with the corresponding supervisor device 400, such as user access information including usernames, user password, access tokens, etc.

In some embodiments, one or more of the above identified data elements or modules of the supervisor device 400 are stored in one or more of the previously described memory devices (e.g., memory 402 and/or memory 490) and correspond to a set of instructions for performing a function as described above. The above-identified data, modules, and programs (e.g., sets of instructions) need not be implemented as separate software programs, procedures, or modules, and thus various subsets of these modules may be combined or otherwise re-arranged in various embodiments. In some embodiments, the memory 402 and/or memory 490 optionally stores a subset of modules and data structures identified above. Furthermore, in some embodiments, the memory 402 and/or memory 490 stores additional modules and data structures not described above.

Figure 5:
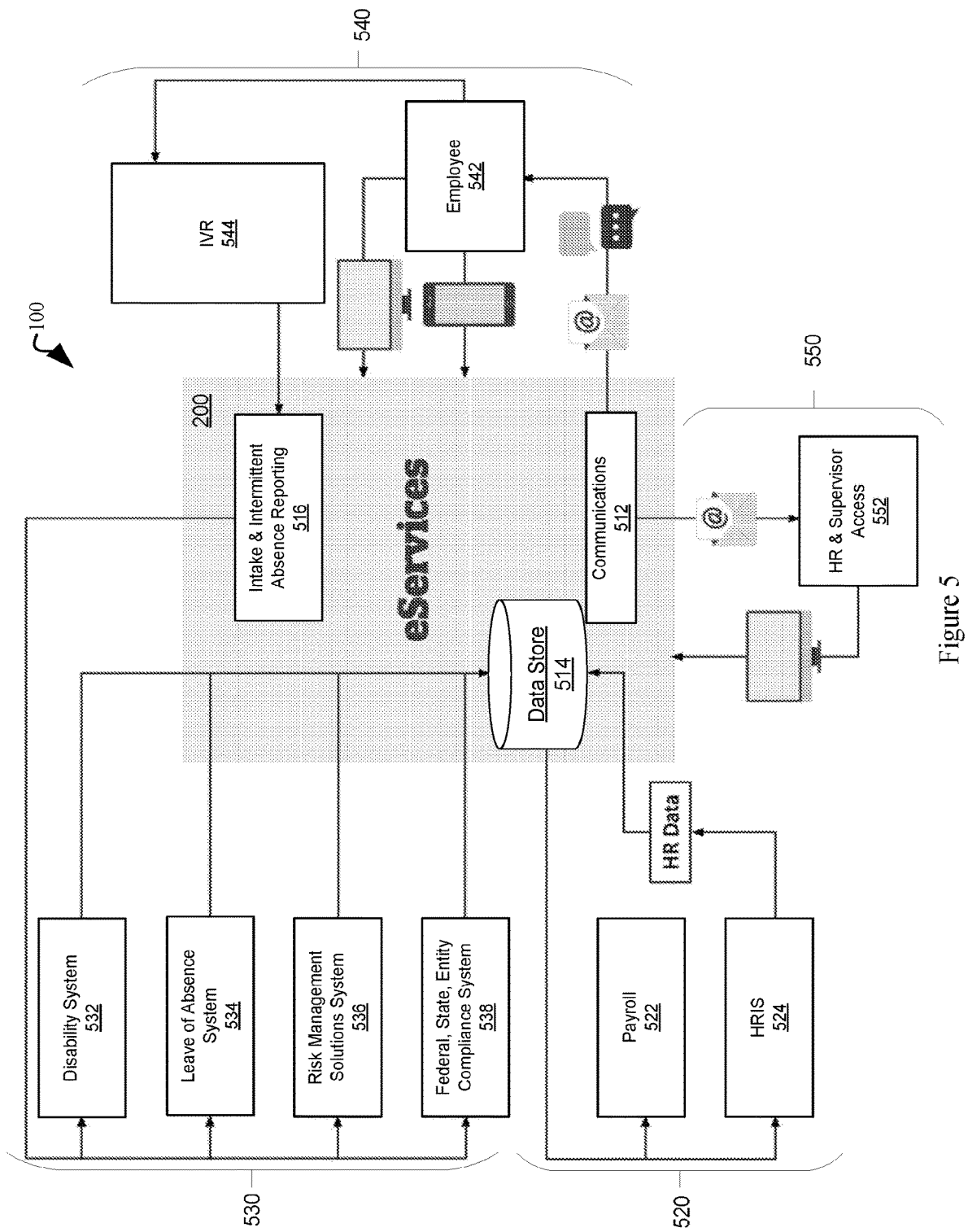
FIG. 5 illustrates an exemplary system overview for providing absentee management that includes an absentee management system, in accordance with an embodiment of the present disclosure.

Referring to FIG. 5, an overview of communications within the computer system 100 will be described in detail from a point of view of various communications with the absentee system 200. As depicted in FIG. 5, the absentee system 200 includes a communications platform 512 (e.g., network interface 286 of FIG. 2), that provides various services, such as status notifications and calendars (e.g., the notification generation module 270 and/or the calendar generation module 272 of FIG. 2), for respective employees of each entity 300 (e.g., a supervisor platform 540 and/or an employee platform 550) through a communications network (e.g., network 20 of FIGS. 1 through 4). Furthermore, the absentee system 200 includes a data store platform 514 (e.g., memory 202 and/or memory 290 of FIG. 2) for storing data received from each entity 300, each supervisor device 400, and/or an external server and/or device (e.g., data communicated through an absentee status feed and/or a demographic feed).

Each entity 300 communicates various information 520 to the absentee system 200 through the above described communication network 20. In some embodiments, the information 520 is communicated through a feed of information that is provided on a recurring basis, which will be described in more detail infra, with particular reference to at least blocks 626 through 634 of FIG. 6B. This information 520 includes payroll information 522 and/or human resource information system 524 (HRIS), which constitute the demographic feed and/or the absentee status feed. For instance, in some embodiments, the HRIS 524 stores each employee record 308 associated with each respective employee of the entity 300. Accordingly, data and information is communicated by the HRIS 524 for each employee record 308 that has an absence status 316 associated with the respective employee. Communicating data and information related only to employees that have an associated absence status 316, instead of all employee records, reduces an amount of data and information that is parsed by the absentee system 200 which assists in reducing the overload of information presented to each supervisor.

From the information 520 provided by to the absentee system 200, various services 530 are provided to each entity 300 through the intake and intermittent absence reporting platform 516, hereinafter "absence reporting platform 516." For instance, in some embodiments, the services 530 provided by the absentee system 200 for a respective entity 300 include a disability system 532. The disability system 532 ensures that each respective entity 300 complies with various disability regulations and requirements, such as the Americans with Disabilities Act with sets forth exact design requirements to suite persons with disabilities. For instance, in accordance with a determination that an absence claim is associated with a disability, this claim subjected to the disability system 532 in order to ensure that the claim adheres to proper compliance regulations. In some embodiments, the services 530 provided by the absentee system 200 for a respective entity 300 include a leave of absence system 534. The leave of absence system 534 ensure that each respective entity 300 complies with various absence regulations and requirements, such as FLMA. For instance, in accordance with a determination that an absence claim is associated with a leave specified by FLMA, this absence claim is subjected to the leave of absence system 534 in order to ensure that the claim adheres to proper compliance regulations. In some embodiments, the services 530 provided by the absentee system 200 for a respective entity 300 include a risk management solutions system 536. The risk management solutions system 536 ensures that each respective entity 300 is taking appropriate risks with respect to human resource policy and employee management. In some embodiments, the services 530 provided by the absentee system 200 for a respective entity 300 include a federal, state, and/or entity compliance system 538, hereinafter "compliance system," (e.g., compliance information store 260 of FIG. 2) which is ensures that an employee and/or entity 300 follows various regulation procedures and protocols. For instance, in some embodiments, the compliance system 538 processes each absence claim in order to either approve, deny, or cancel the claim depending on if the claim complies with various regulations, such as FLMA.

In some embodiments, the above identified services 530 provided by the absentee system 200 need not be implemented as separate services, and thus various subsets of these services may be combined or otherwise decoupled from one another in various embodiments. For instance, in some embodiments, the risk management solution system 536 and the compliance system 538 are subsumed as one system. Similarly, in some embodiments, the disability system 532, the leave of absence system 534, the risk management solutions system 536, the compliance system 538, or a combination thereof are subsumed as one service.

In some embodiments, an employee 542 communicates pertinent information related to an absence request and/or claim, such as an employee calling in sick for a day or an employee reporting an intermittent absence for a temporary migraine. In some embodiments, the employee 542 communicates directly to their respective entity 300, their respective supervisor (e.g., supervisor device 400 of FIG. 1 and FIG. 4, HR & supervisor access platform 552, etc.) and/or, as depicted in FIG. 5, commutates directly to the absentee system 200. In some embodiments, (e.g., wherein the employee 542 communicates directly to the absentee system 200) an interactive voice response (IVR) system 544 is utilized to facilitate communication between the employee 542 and the absentee system 200 without further human interaction aside from the employee 542. This IVR system 544 allows each respective employee to communicate pertinent information without interaction with another human, and without consuming valuable time of a supervisor or HR representative.

In some embodiments, in accordance with a determination that information (e.g., a status notification) needs to be communicated to and accessed 552 by a respective employee of an entity 300 (e.g., a supervisor and/or HR representative), the communication platform 512 provides such information to a respective application and/or supervisor device 400. In some embodiments, the information is provided through an application accessible through the Internet. This application includes, but is not limited to, a mobile phone application and/or a web portal application. However, the present disclosure is not limited thereto. For instance, in some embodiments, the information is provided through an email communicated to respective supervisors. Moreover, in some embodiments, the information is provided through a push notification communicated to a respective supervisor device 400.

Now that a general topology of the distributed system 100 has been described, methods for providing absentee management services for an entity 300 will be described with reference to, at least, FIG. 1 through FIG. 6F.

Block 602.

Referring to block 602 of FIG. 6A, a computer system (e.g., absence system 200 of FIG. 1 and FIG. 2) includes one or more processors (e.g., CPU 276 of FIG. 2), and a memory (e.g., memory 202 and/or memory 290 of FIG. 2) coupled to the one or more processors. The memory stores one or more programs that is configured to be executed by the one or more processors, the one or more programs singularly or collectively comprising instructions for preforming a method of the present disclosure.

Block 604.

Referring to block 604 of FIG. 6A, in some embodiments, the method includes obtaining a demographic feed (e.g., payroll information 522 and/or HRIS 524 of FIG. 5) from a second computer system (e.g., a respective entity 300 and/or an external server or service provider). The demographic feed includes a plurality of employee records (e.g., employee records 308 of FIG. 3). Each respective employee record 308 in the plurality of employee records corresponds to an employee in a plurality of employees for an entity 300. In other words, each employee record 308 represents a single employee of the respective entity 300. Moreover, each respective employee record 308 in the plurality of employee records includes at least a name of the corresponding employee (e.g., employee name 312) and a name of a least one other employee in the plurality of employees to which the corresponding employee shares a reporting relationship (e.g., related employee name 324). In some embodiments, information stored in, and communicated through, each employee record 308 is as described above in regards to the employee record 308 of FIG. 3. Additional details and information regarding the obtaining of the demographic feed with be described in more detail infra, with particular reference to at least blocks 624 through 630 of FIG. 6B.

Blocks 606 Through 610.

Referring to block 606 of FIG. 6A, in some embodiments, the reporting relation between the corresponding employee and the at least one other employee is one in which the corresponding employee directly supervises the at least one other employee. Accordingly, the corresponding employee is a supervisor to at least one other employee, and the at least one other employee is listed as a related employee 322. Moreover, referring to block 608 of FIG. 6A, in some embodiments, the reporting relationship is one in which the corresponding employee is directly supervised by the at least one other employee. Accordingly, the corresponding employee is a supervisee to the at least one other employee. Referring to block 610 of FIG. 6A, in some embodiments, the reporting relationship between the corresponding employee and the at least one other employee is one in which the corresponding employee is directly supervised by the at least one other employee. Accordingly, the corresponding employee is a supervisor to the at least one other employee. Each respective employee record in the plurality of employee records further includes at least an e-mail address of the corresponding employee (e.g., employee address 314 of FIG. 3) and an e-mail address of the at least one other employee in the plurality of employees to which the corresponding employee shares the reporting relationship (e.g., related employee address 326).

Blocks 612 Through 618.

The systems and methods of the present disclosure are capable of being utilized by a variety of entities 300. For instance, and as previously described, in some embodiments, an entity 300 of the present disclosure is a small business that includes less than 500 employees. Accordingly, for a particular period of time a plurality of employees that are absent for this small business entity includes at least 1 employee. Moreover, in some embodiments, an entity 300 of the present disclosure is a multi-national company that includes 2,000,000 employees. Accordingly, for a particular period of time a plurality of employees that are absent for this multi-national company entity includes at least 250,000 employees. To this point, in some embodiments, for a particular entity 300 the plurality of employees includes at least 100 employees. In some embodiments, the plurality of employees includes at least 500 employees. Referring block 612 of FIG. 6A, in some embodiments, the plurality of employees includes at least 1,000 employees, at least 5,000 employees, at least 10,000 employees, at least 50,000 employees, or at least 100,000 employees. Referring to block 614 of FIG. 6A, in some embodiments, the plurality of employees includes at least 500,000 employees or at least 1,000,000 employees.

Moreover, as a size (e.g., a number of employees) of entity 300 varies from one entity to another entity, so does a ratio of supervisors to supervisees. Not only does this ratio of supervisors to supervisees vary from entity to entity, but, in some embodiments, may also vary within according to each supervisor within each entity. For instance, in some embodiments, a first supervisor for an entity 300 has three supervisees (e.g., a ratio of supervisors to supervisees of 1 to 3), whereas a second supervisor for the entity 300 has eight supervises (e.g., a ratio of supervisors to supervisees of 1 to 8). Referring to block 616 of FIG. 6A, in some embodiments, a supervisor to supervisee ratio at a respective entity 300 is at least 1 to 5 (e.g., an employee record 308 that represents the supervisor will include at least five related employee records 322 that are the supervisees). In some embodiments, a supervisor to supervisee ratio at a respective entity 300 is at least 1 to 10 or at least 1 to 15. Referring to block 618 of FIG. 6A, in some embodiments, a supervisor to supervisee ratio at a respective entity 300 is at least 1 to 20, at least 1 to 25, at least 1 to 30, at least 1 to 40, at least 1 to 50, at least 1 to 75, at least 1 to 100, at least 1 to 150, or at least 1 to 200. As described above, the plurality of employees includes employees that are associated with an absence status (e.g., absence status 316 of FIG. 3), and does not particularly include every employee associated with an entity.

Block 620.

Referring to block 620 of FIG. 6A, in some embodiments, an entity 300 of the present disclosure is a business organization. For instance, in some embodiments, an entity represents a company or a small business. Furthermore, in some embodiments, an entity 300 of the present disclosure is a governmental agency, such as a federal and/or state department (e.g., the Department of Energy, a local government such as mayoral and/or council government agency, etc.). Furthermore, in some embodiments, an entity 300 of the present disclosure is a non-profit organization, such as a religious organization or a charity. In some embodiments, an entity 300 is a parent entity that includes a plurality of subsidiary entities. Further, in some embodiments, an entity is a plurality of sub-entities that have at least one common aspect shared there between. For instance, in some embodiments, a common aspect is a common insurance plan and/or a common board of directors. Grouping of an entity by a parent company is useful if the subsidiary companies share a common insurance policy or if one or more business organizations consolidate their respective HR departments in some embodiments. For instance, hospitals often work as independent organizations, but collectively share an insurance policy, thus grouping the hospitals as a single entity is beneficial in some embodiments. In some embodiments, an entity is a division in a larger entity. For instance, a division includes a functional division within one or more departments such as a finance division, an HR division, a marketing division, etc. Moreover, in some embodiments, a division includes a project division such as a first project group and a second project group (e.g., a Microsoft Excel project group and a Microsoft Azure project group are considered two separating entities). Furthermore, in some embodiments, an entity 300 of the present disclosure is an organization that satisfies one or more federal and/or state regulations (e.g., a business with 50 or more employees satisfies FMLA regulations).

Block 622.

Figure 2:
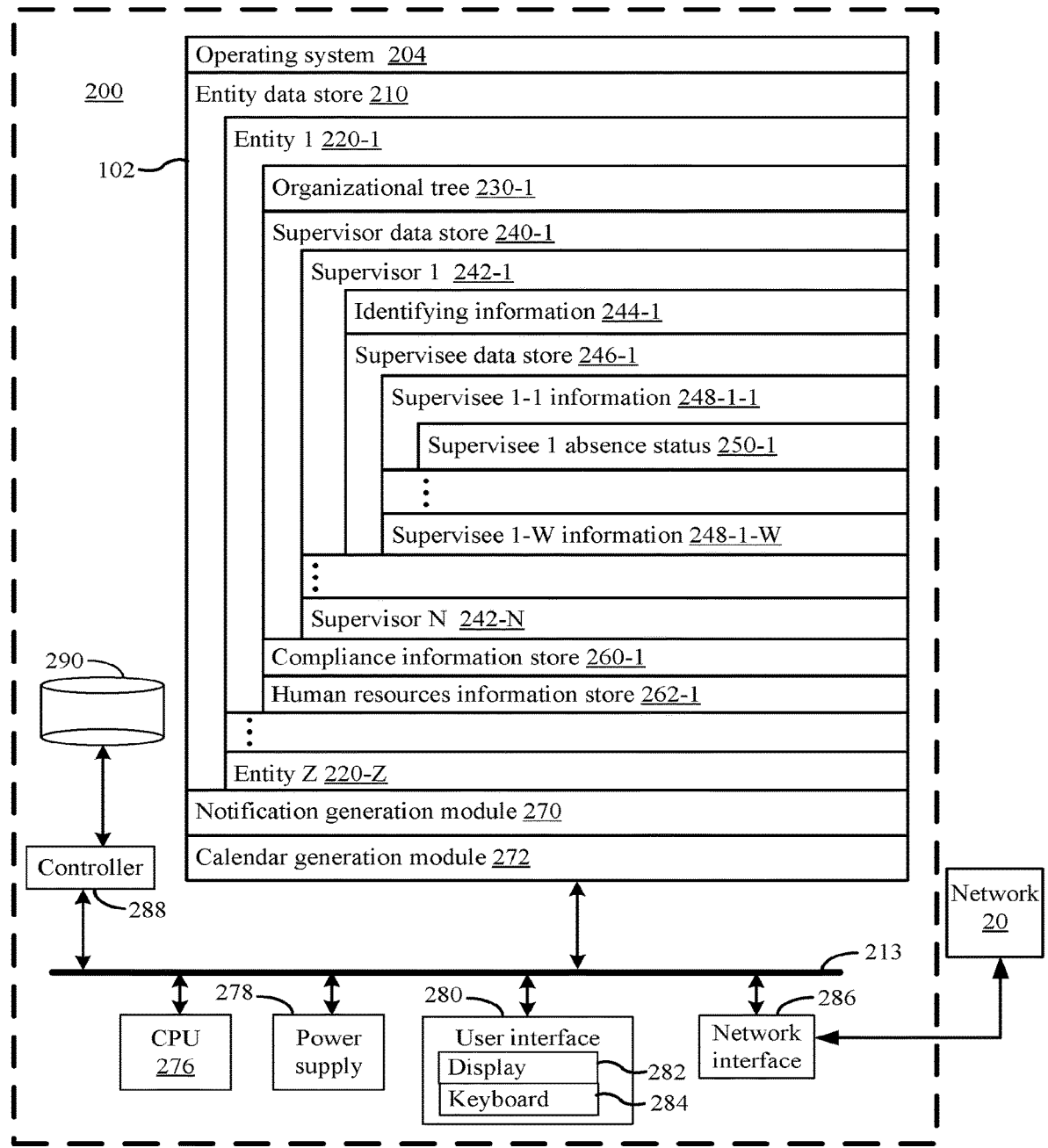
FIG. 2 illustrates an absentee system for providing management of absentee, in accordance with an embodiment of the present disclosure.

Referring to block 622 of FIG. 6B, the method includes using the demographic feed (e.g., employee records 308 of FIG. 3, payroll information 522 and/or HRIS 524 of FIG. 5, etc.) to construct an organizational tree (e.g., organizational tree 230 of FIG. 2). As previously described, each organization tree 230 includes a plurality of nodes, with each respective representing an employee in the plurality of employees of the entity 300. Nodes that are connected to each other through branches of the organizational tree 230 represent a reporting relationship between the connected nodes. In some embodiments, the organization tree 230 is an unbalanced tree, such that at least two nodes of the organizational tree differ in height by more than one. Moreover, in some embodiments, through an analysis of the various nodes of the organizational tree 230, a hierarchy of a respective entity 300 is automatically constructed without human intervention. This automated construction allows for the hierarchy of the respectively entity 300 to be continuously updated with each iteration of acquiring the demographic feed without further human intervention. For instance, if a new employee is hired at the respective entity 300, the reporting relationships of the new employee are automatically determined through the information communicated through the demographic feed (e.g., employee records 308 of FIG. 3). This new employee is seamlessly placed within the organizational tree 230, without requiring a supervisor or HR representative to manually update this information. Additional details and information regarding the organization tree 330 and the nodes thereof will be described in more detail infra, with particular reference to at least block 648 of FIG. 6C.

Block 624.

Referring to block 624 of FIG. 6B, in some embodiments, the method includes obtaining an absentee status feed (e.g., HRIS 524 of FIG. 5) from a respective entity 300. The absentee status feed includes one or more absentee statuses (e.g., absence status 316 of FIG. 3), which corresponds to an employee in a set of employees in the plurality of employees. Further, each respective absentee status includes an absentee status category that is in an enumerated list of absentee status categories. Additional details and information regarding the absentee status categories will be described in more detail infra, with particular reference to at least block 640 of FIG. 6B.

Blocks 626 Through 630.

Referring to block 626 of FIG. 6B, in some embodiments, the demographic feed and/or the absentee status feed are obtained on a recurring basis. In some embodiments, the demographic feed is obtained on a first recurring basis (e.g., each week), and the absentee status feed is obtained on a second recurring basis (e.g., each day). However, the present disclosure is not limited thereto. For instance, in some embodiments, the demographic feed and the absentee status feed are obtained on a similar recurring basis (e.g., each obtained on a daily basis). Referring to block 628 of FIG. 6B, in some embodiments, the recurring basis is each day that the entity 300 has a working day. In other words, the demographic feed and/or the absentee status feed is obtained when a work day is scheduled for a particular entity 300 (e.g., the demographic feed and/or the absentee status feed are not obtained on holidays and/or non-working days such as weekends). In some embodiments, the recurring basis is each day. In some embodiments, the recurring basis is a predetermined time each day (e.g., 11:59 PM and/or 12:01 AM). In some embodiments, the recurring basis is each week. In some embodiments, the recurring basis is each fortnight. Referring to block 630 of FIG. 6B, in some embodiments, the recurring basis is each month or each quarter of a year. In some embodiments, the recurring basis is determined by each entity that provides a respective feed. For instance, in some embodiments, a first entity 300-1 determines the recurring basis to be each day while a second entity 300-2 determines the recurring basis to be each week. Moreover, in some embodiments, the recurring basis is determined by each supervisor of a respective entity 300. Obtaining the demographic feed and/or the absentee status feed on a recurring basis ensures that the absentee system 200 is provided with the most up-to-date information related to a corresponding entity 300 in order to account for recent changes, such as a new inputted absence request by an employee.

Blocks 632 and 634.

Referring to block 632 of FIG. 6B, in some embodiments, the demographic feed and the absentee status feed are subsumed as a collective feed of information. To this point, referring to block 634 of FIG. 6B, in some embodiments, the absentee status feed and/or the demographic feed are obtained from a second computer system that is remote from the first computer system (e.g., obtained from a source remote to the absence system 200 of FIG. 1 such as an external service provider). For instance, in some embodiments, the second computer system is a third party server system. Moreover, in some embodiments, the second computer system is the entity 300. In other words, the demographic feed and/or the absentee status feed are communicated to the absence system 200 from either a respective entity 300 and/or a third party service (e.g., an external service provider).

Block 636 and 638.

Referring to block 636 of FIG. 6B, in some embodiments, the set of employees includes each employee in the plurality of employees for the respective entity 300. Accordingly, the absentee status feed communicates each employee that has an absence status category 316 associated with the respective employee (e.g., the entire plurality of employees). Moreover, referring to block 638 of FIG. 6B, in some embodiments, the set of employees includes a portion of the plurality of employees for the respective entity 300. Accordingly, in some embodiments, the portion of the plurality of employees is a portion of employees in the plurality of employees that share a common absence status category (e.g., each employee with an absence status 316 that is in a same category such as maternity leave absence category). In some embodiments, the portion of the plurality of employees is a portion of employees that is associated with a respective supervisor (e.g., supervisees of the supervisor that have an absence status 316 associated with each supervisee).

Blocks 640 Through 646.

Referring to block 640 of FIG. 6B, in some embodiments, the enumerated list of absentee status categories includes a leave of absence for an accommodation. In some embodiments, the accommodation is a corporate event, a paid time off (PTO). In some embodiments, the enumerated list of absentee status categories includes an absence to care for a child, a maternity leave, and/or a paternity leave. In some embodiments, the enumerated list of absentee status categories includes an absence due to sickness of the supervisee or an absence to care for a parent. In some embodiments, the enumerated list of absentee status categories includes an absence related to pregnancy of the supervisee. In some embodiments, the enumerated list of absentee status categories includes an absence to care for a spouse or significant other of the supervisee. In some embodiments, the enumerated list of absentee status categories includes a custom category as defined by the respective entity 300. One of skill in the art may know of other absentee status categories that are not expressly set forth in the present disclosure but are still of use to the systems and methods disclosed herein. Referring to block 642 of FIG. 6B, in some embodiments, the absentee status of the corresponding employee is a paid absence (e.g., PTO). Furthermore, referring to block 644 of FIG. 6B, in some embodiments, the absentee status of the corresponding employee is an unpaid absence. Moreover, referring to block 646 of FIG. 6C, in some embodiments, the absentee status of the corresponding employee is a federal policy, a state policy, or an employer policy that permits an employee to be absent from work (e.g., as warranted by the Family and Medical Leave Act).

Block 648.

Referring to block 648 of FIG. 6C, in some embodiments, the method includes determining from the organization tree and the demographic feed a set of supervisors at the entity 300. In some embodiments, the set of supervisors is determined from information and/or data provided directly by the demographic feed. For instance, in some embodiments, an employee record 308 that is communicated through the demographic feed includes an identifier that indicates this particular employee is a supervisor (e.g., identified through the supervisor data store 240 of FIG. 2). Further, in some embodiments, the set of supervisors at the entity 300 is determined by analyzing the nodes of the organizational tree 230. For instance, a supervisor may be identified through the organization tree 230 as any node that includes at least one daughter node (e.g., is a parent node). Regardless of how the set of supervisors is determined, each respective supervisor in the set of supervisors directly or indirectly supervises at least one supervisee having an absentee status category that is in the enumerated list of absentee status categories.

In some embodiments, placement of a particular employee within the organization tree 230 of a respective entity 300 is undeterminable (e.g., is undeterminable due to missing information in the respective employee record 308). Accordingly, a void is present in the organization tree 230, which represents the particular employee. The particular employee will not appear in a respective calendar of a respective supervisor, but will be communicated through the status notification (e.g., a notification of "The following employees were not loaded into the system from the previously received demographic feed: . . . ,").

Block 650.

Referring to block 650 of FIG. 6C, in some embodiments, the method includes communicating a different supervisor status notification (e.g., status notification 702 of FIG. 7A) to each respective supervisor in the set of supervisors. In some embodiments, the different supervisor status notifications are communicated without further human intervention by the respective supervisor (e.g., the respective supervisor does not have to query for and/or request the corresponding notification). Each different supervisor status notification provides a listing (e.g., listing 704 of FIG. 7A) of each supervisee that directly or indirectly reports to the respective supervisor having an absentee status category that is in the enumerated list of absentee status categories together with a current absentee status of the supervisee. In some embodiments, the status notification includes a first notification of each supervisee that directly reports to the respective supervisor and a second notification of each supervisee that indirectly reports to the respective supervisor. Accordingly, in some embodiments, this first notification and second notification are included in the status notification, and optionally separated into different notifications. For instance, referring briefly to FIG. 9, a respectively supervisor is provided an option to select from one or more reports 824 (e.g., direct report 824-1, all employees report 824-2, my hierarchy report 824-3, my HR employees report 824-4), which will be described in more detail infra, with particular reference to at least block 686 of FIG. 6E.

Block 652.

Referring to block 652 of FIG. 6C, in some embodiments, the listing in the supervisor notification provides, for each respective supervisee of the supervisor, a name of the respective supervisee (e.g., column 710-1 of FIG. 7A and FIG. 7B that provide employee names 312 of FIG. 3). In some embodiments, the listing in the supervisor notification provides, for each respective supervisee of the supervisor, an absence start date (e.g., column 710-2 of FIG. 7A and FIG. 7B that provides information derived from absence status 316 of FIG. 3), an absence end date (e.g., column 710-3 of FIG. 7A and FIG. 7B that provides information derived from absence status 316 of FIG. 3), and/or optionally an update to the absence start date. In some embodiments, the listing in the supervisor notification provides, for each respective supervisee of the supervisor, a reason for an absence (e.g., column 710-5 of FIG. 7A and FIG. 7B that provides information derived from absence status 316 of FIG. 3). In some embodiments, the listing in the supervisor notification provides, for each respective supervisee of the supervisor, an approval status of an absence of the respective supervisee (e.g., column 710-4 of FIG. 7A and FIG. 7B that provides information derived from absence status 316 of FIG. 3). Moreover, in some embodiments, the listing in the supervisor notification provides, for each respective supervisee of the supervisor, the absentee status category of the respective supervisee. One of skill in the art may know of other information to be provided through the listing that is not expressly set forth in the present disclosure but is still of use to the systems and methods disclosed herein. Providing the above described information through the listing in the supervisor notification allows for the respective supervisor to digest absentee information in a readily consumable form.

Block 654.

Referring to block 654 of FIG. 6C, in some embodiments, the listing 704 is bifurcated between a first listing portion and a second listing portion (e.g., a first listing 704-1 of FIG. 7A and a second listing 704-2 of FIG. 7B). The first listing portion includes supervisees that are absent and/or planning to be absent for one or more days, such as the first listing 704-1 of FIG. 7A providing a list of supervisees having continuous absences. The second listing portion includes supervisees that are absent and/or planning to be absent for less than a day (e.g., a partial absence such as an intermittent absence), such as the second listing 704-2 of FIG. 7B and/or a third listing 704-3 of FIG. 7C providing a list of supervisees having partial absences. In some embodiments, the first listing portion provides a return to work date and/or optionally an update to the return to work date for each respective supervisee of the supervisor that is absent or planning to be absent for more than one day (e.g., column 710-3 of FIG. 7A). Moreover, in some embodiments, the second listing portion provides an absence start time (e.g., column 710-3 of FIG. 7B), optionally an update to the absence start time, an absence duration (e.g., column 710-4 of FIG. 7B), optionally an update to the absence duration, and an indication as to whether the absence have been approved, denied, is pending or has been cancelled (e.g., column 710-5 of FIG. 7B), or a combination thereof for each respective supervisee of the supervisor that is absent or planning to be absent for less than one day.

Figure 15A:
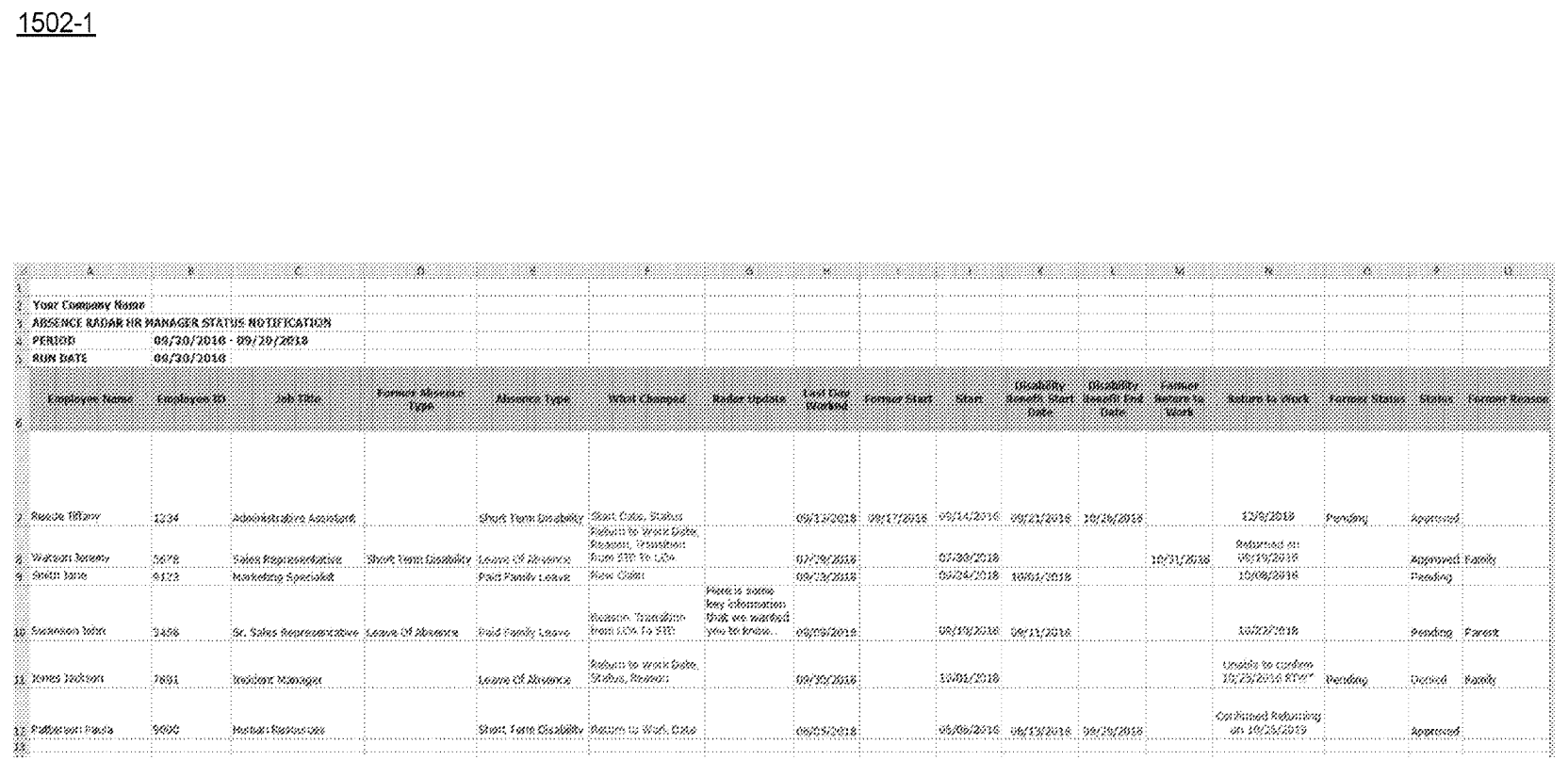
Figure 15B:
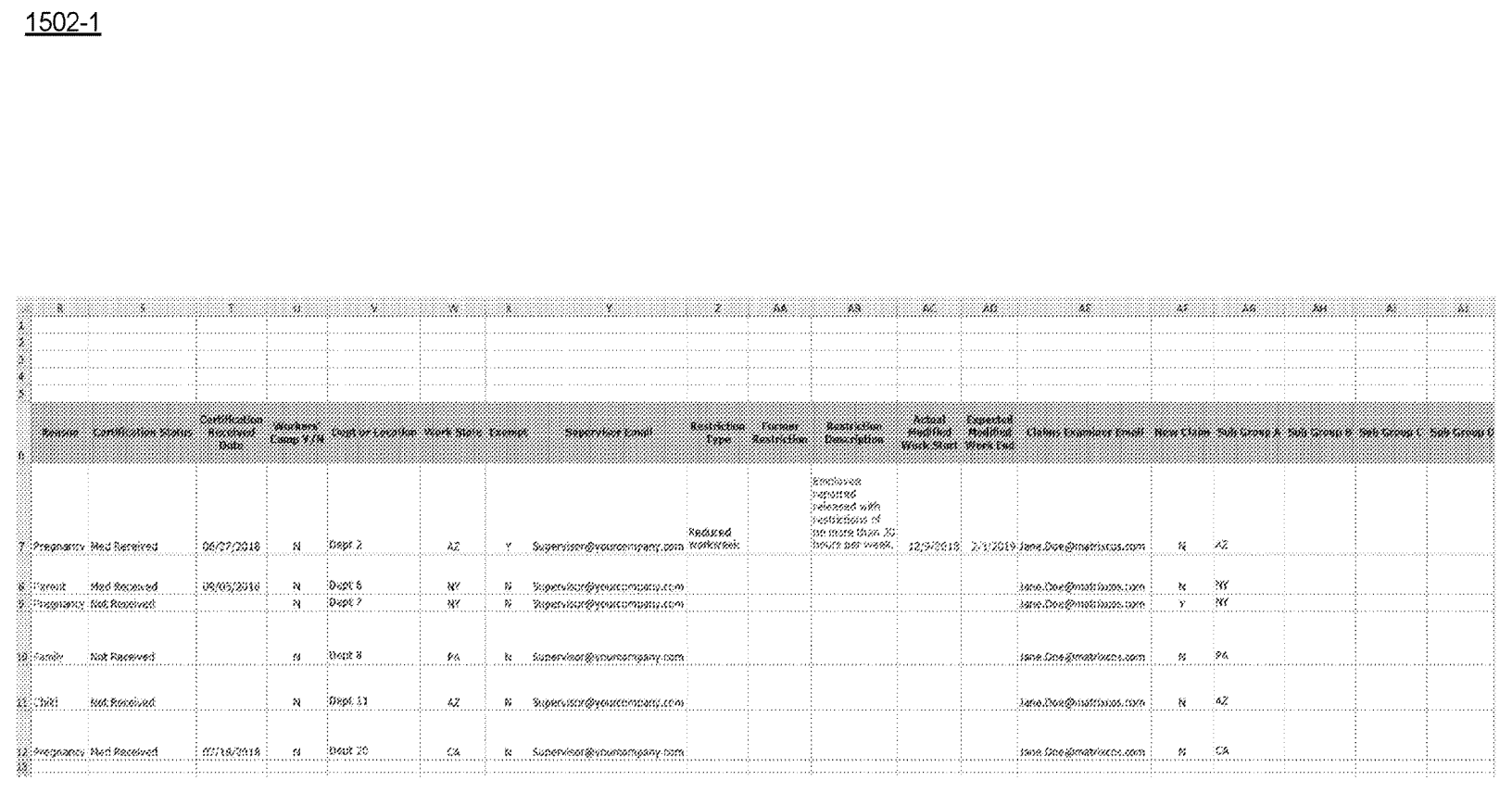
Figure 15D:
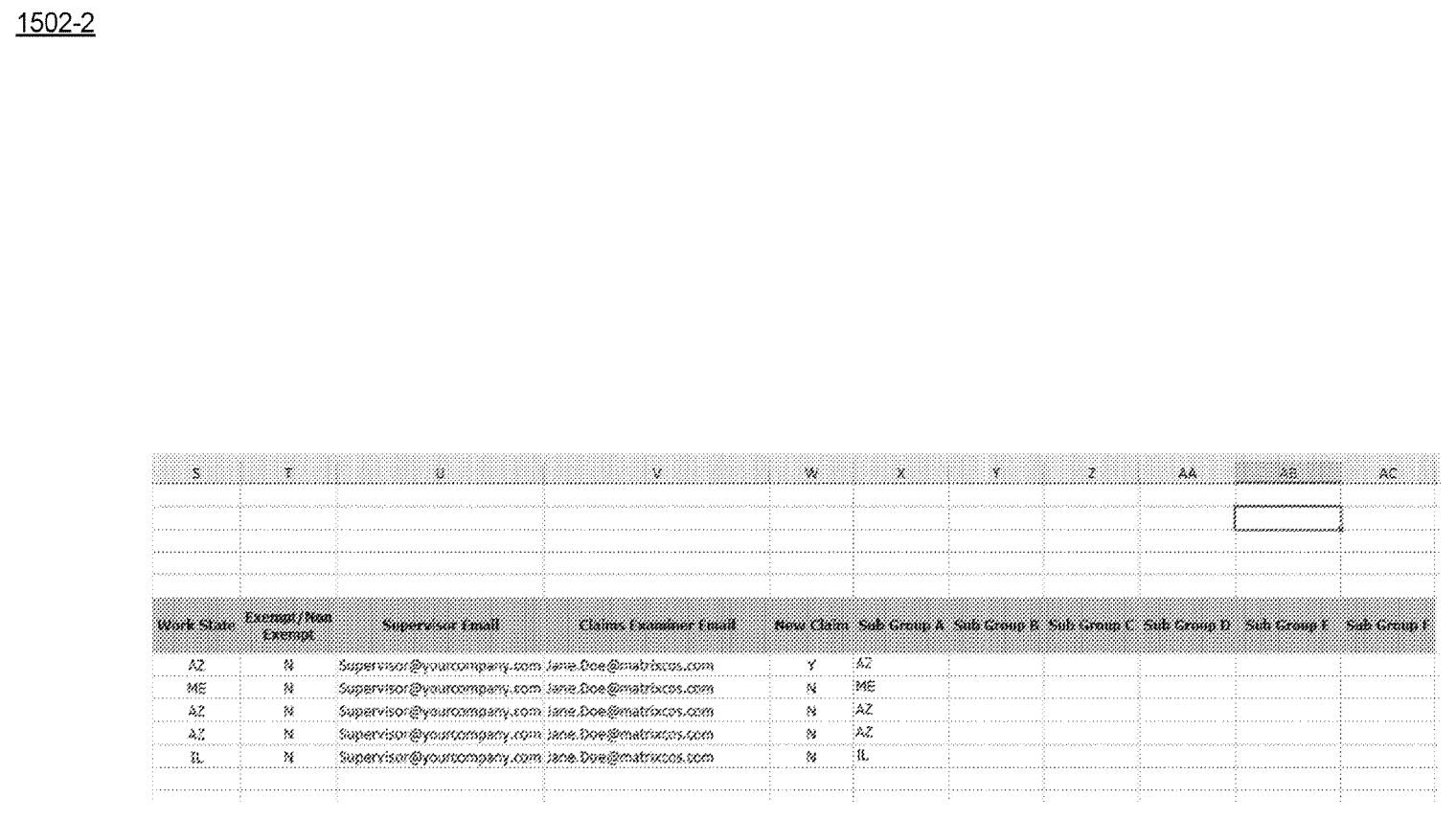
Figure 15E:
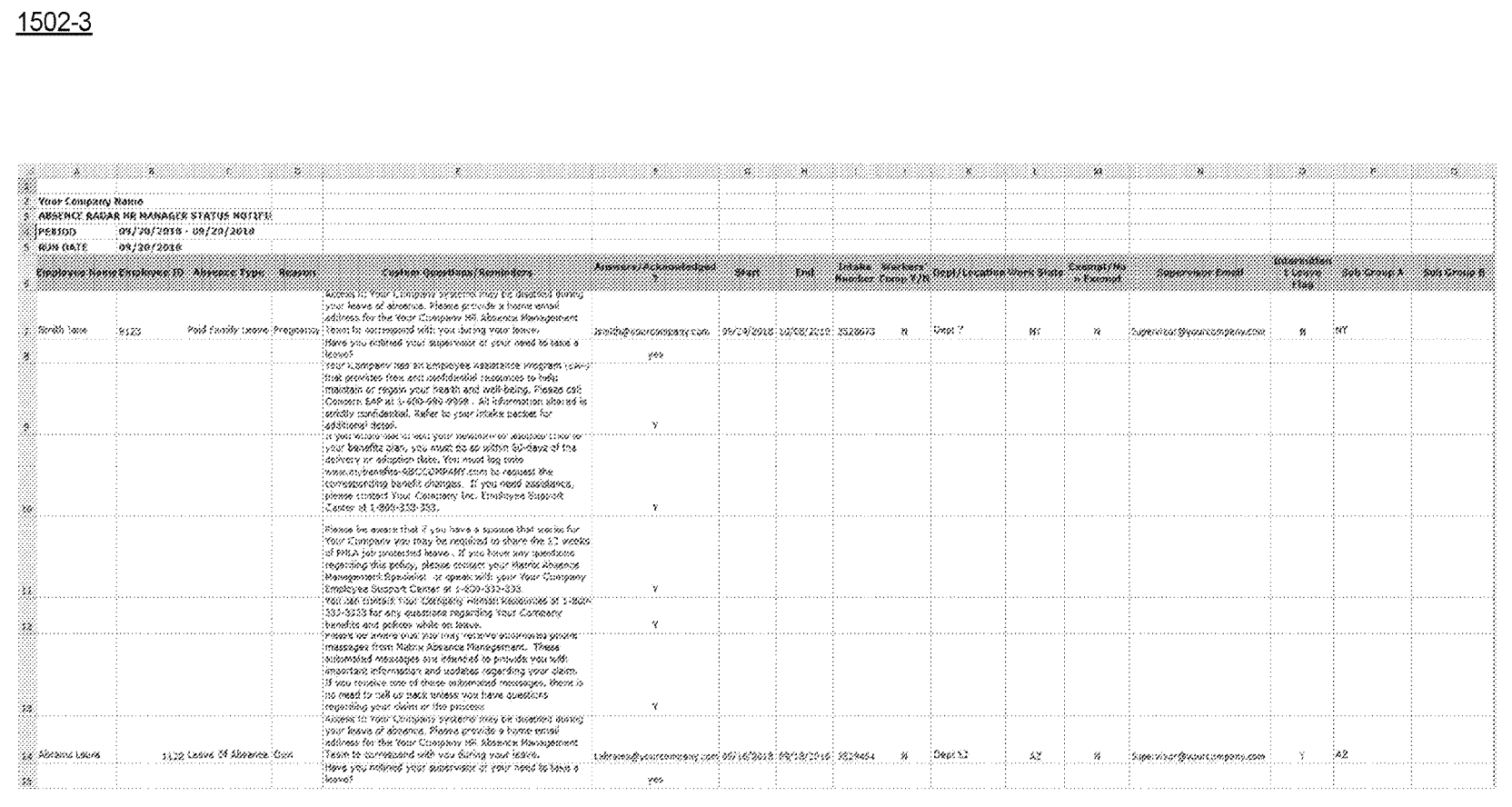

Referring briefly to FIG. 15A through FIG. 15H, in some embodiments, the notification 702 and/or listing(s) 704 are provided through a matrix (e.g., a spreadsheet 1502 of FIG. 15A through FIG. 15H) of information. For instance, referring to FIG. 15A and FIG. 15B, in some embodiments, a first portion 1502-1 of the notification 702 includes a listing of employees with continuous absences, including all new continuous absences and/or changes to previously presented continuous absences. Referring to FIG. 15C and FIG. 15D, in some embodiments, a second portion 1502-2 of the notification 702 includes a listing of employees with intermittent absences, including all new intermittent absences and/or changes to previously presented intermittent absences. Referring to FIG. 15E, in some embodiments, a third portion 1502-3 of the notification 702 includes a listing of employees with new absence claims (e.g., pending claims, partially processed claims, unprocessed claims, claims inputted at a previous date, etc.). Referring to FIG. 15F, in some embodiments, a fourth portion 1502-4 of the notification 702 includes a listing of employees with a continuous leave of absence (e.g., prolonged absences). Referring to FIG. 15G and FIG. 15H, in some embodiments, a fifth portion 1502-5 of the notification 702 includes an appendix or legend of terminology used by the notification 702. In some embodiments, the notification 702 illustrated by FIG. 15A through FIG. 15H is provided to HR representatives only.

Block 656.

Referring to block 656 of FIG. 6C, in some embodiments, the listing 704 further includes instructions from the respective entity 300 to the respective supervisor on how to handle supervisee absences. For instance, referring briefly to FIG. 7D, a set of supervisor and/or manager instructions 750 is provided through the listing 704. These instructions 750 include instructions on how to handle new absences 752, instructions to handle status changes 754, instructions on how to handle a return to work 756 (RTW), or a combination thereof. In some embodiments, the new absences instructions 752 provide instructions for approving, denying, and/or cancelling an absence request. In some embodiments, the status change instructions 754 include instructions for handling various absence status changes (e.g., a change in date for an expected return to work). In some embodiments, the return to work instruction 756 include an instruction that an employee is required to fill a RTW form before resuming work, an instruction related to a working limitation of an employee (e.g., an instruction of "John cannot lift over 30 pounds and cannot walk up more than 2 flights of stairs."), and/or a similar instruction for complying with a return to work for a respective employee.

Block 657.

Figure 16A:
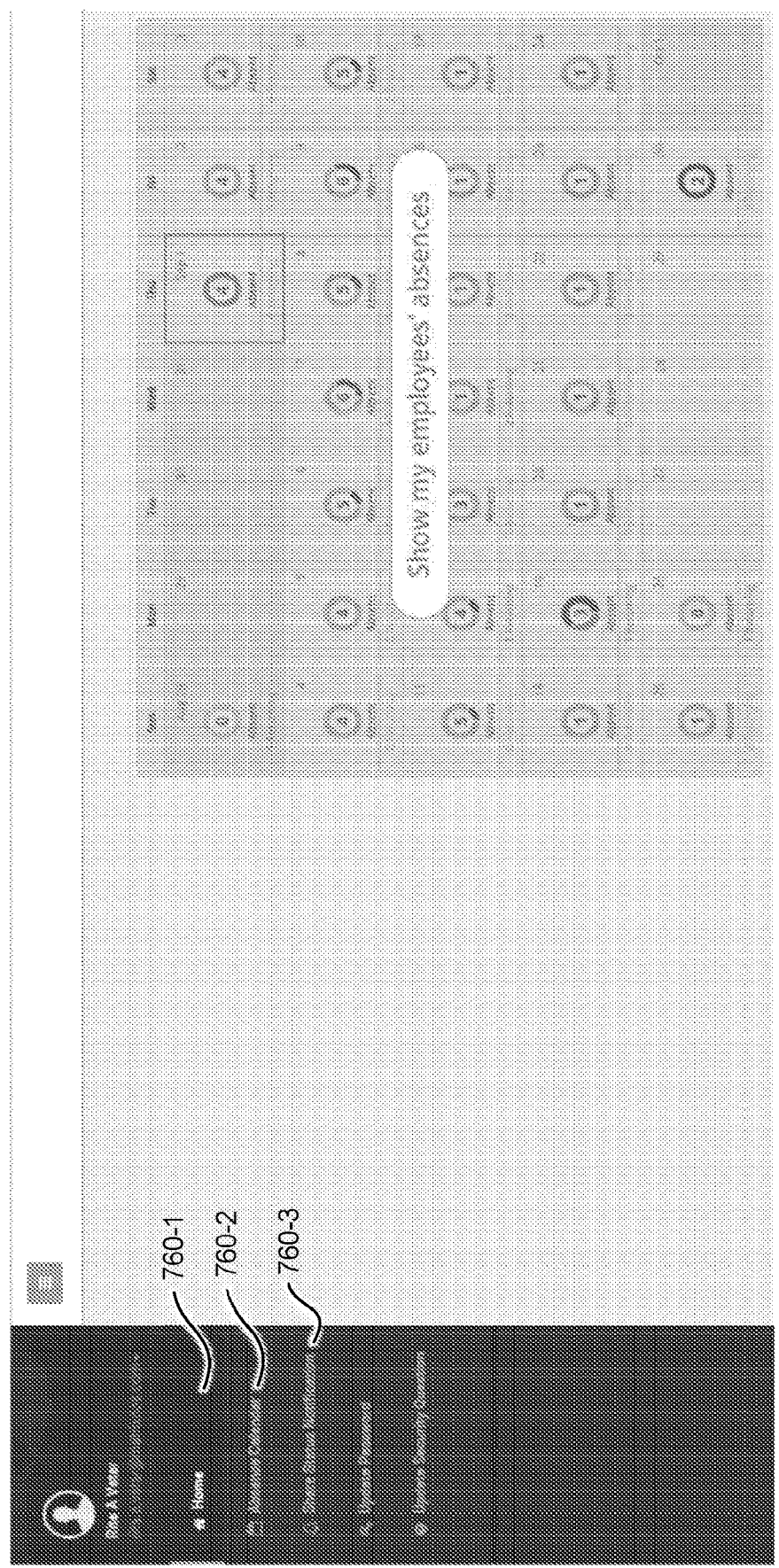
FIG. 16A is a screen image showing an aspect of an absentee calendar system in which a supervisor shares a status notification with a first employee, in accordance with an embodiment of the present disclosure.
Figure 16B:
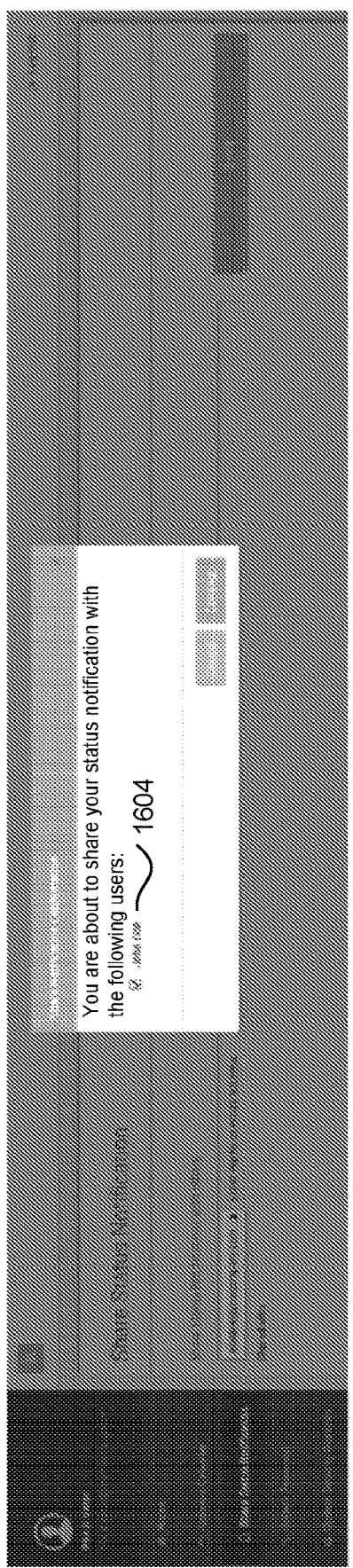
FIG. 16B is a screen image showing another aspect of an absentee calendar system in which a supervisor shares a status notification with a first employee, in accordance with an embodiment of the present disclosure.

Referring to block 657 of FIG. 6C, in some embodiments, a respective supervisor has knowledge of a future or present absence that requires the respective supervisor to be way from work. Accordingly, each respective supervisor is provided an option to share their corresponding notifications 702 with at least one other employee at the entity (e.g., option 760-3 of FIG. 16A to share a status notification). Accordingly, the respective supervisor selects at least a first employee in the plurality of employees (e.g., selection 1604 of FIG. 16B) at the entity for sharing the notification 702. The supervisor may select the first employee from a listing of employees or by entering personal information 310 of the first employee, such as an employee address 314. Responsive to receiving the supervisor selection of the first employee in the plurality of employees, the different supervisor status notification for the respective supervisor is communicated to the first employee in the plurality of employees selected by the respective supervisor without further intervention by either the respective supervisor or the first employee. In some embodiments, the first employee is a supervisor in the set of supervisors at the entity, allowing the first employee to cover for the supervisor during the supervisor's absence. In some embodiments, a supervisor is restricted to selected other supervisors at the entity as the first employee, ensuring that the duties of the supervisor are properly handled by the other supervisors while absent. In some embodiments, the first employee is a supervisee at the entity. For instance, in some embodiments, the first employee is responsible for scheduling within the entity but does not have supervisory responsibility. In some embodiments, responsive to receiving the supervisor selection of the first employee in the plurality of employees, the different supervisor status notification is communicated to the first employee in the plurality of employees selected by the respective supervisor and the respective supervisor without further intervention by either the respective supervisor or the first employee. Accordingly, the first employee is then provided the different status notification of the respective supervisor. In some embodiments, the first employee views the the different status notification of the respective supervisor as if viewing the different status notification from the perspective for the respective supervisor (e.g., views calendar 800 of FIG. 8A) or views a limited shared view (e.g., views a calendar of FIG. 13A and FIG. 13B).

Block 658.

Referring to block 658 of FIG. 6D, in some embodiments, the method includes evaluating, at each respective instance on a recurring basis, whether to communicate the different supervisor status notification 702 to the respective supervisor. In accordance with a determination that there has been a change in the listing of each supervisee that directly or indirectly reports to the respective supervisor having an absentee status category that is in the enumerated list of absentee status categories, the notification 702 is communicated to the respective supervisor at the respective instance. Moreover, in accordance with a determination that there has been no change in the listing of each supervisee that directly or indirectly reports to the respective supervisor having an absentee status category that is in the enumerated list of absentee status categories, the notification 702 is not communicated to the respective supervisor at the respective instance. In other words, each supervisor receives a notification 702 only in accordance with determination that at least one supervisee has a recent absent status change (e.g., a new absence request, a status change such as a change in RTW, etc.). For instance, referring to FIG. 7A, an absence status change 720-1 occurs changing a previously pending status to a current approved status for a corresponding employee absense. This determination prevents each supervisor from receiving unnecessary notifications with duplicative information. Thus, each supervisor is enabled to review the most recent information by viewing the most recently received notification, which is provided by a single source of information. This reviewing of only the most recently received notification further enables each respective supervisor to view pertinent information from a single point of contact (e.g., the absentee system 200 of FIG. 2), instead of combing through individual communications provided by each supervisee.

In some embodiments, the change includes a new absence request. In some embodiments, the change includes an absence start date changes. In some embodiments, the change includes RTW date changes. In some embodiments, the change includes a status change of a claim such as pending, approved, denied, cancelled, closed, etc. In some embodiments, a change from any status to a status of closed will not be included on the respective status notification. In some embodiments, a status change on a retrospectively filed intermittent absence will not be regarded as a change that is included in the status notification. In some embodiments, a status change on a continuous and/or intermittent absences for future dates will be regarded as changes that will be reflected on the status notification. In some embodiments, the change includes a claim status of closed changing to any other status is included on the status notification (e.g., if a claim is reopened). In some embodiments, the change includes if an employee reported a retroactive absence that began and ended prior to a current date. In some embodiments, the change includes an employee reported a retroactive absence that began prior to a current date and the estimated RTW date is the current date or a future date. In some embodiments, the change includes an employee reporting a future absence. In some embodiments, a future absence filed more than a particular period of time in the future will be shown on the status notification but not on the calendar until the absence start date falls within the rolling period covered by the calendar. In some embodiments, the change includes an employee reporting an intermittent time away from work on the previous day that is for a date in the past (e.g., if beyond the time period covered by the calendar then this would appear on the Status Notification but not on the calendar), for a current date, and/or for a future date. In some embodiments, an intake for an intermittent leave will not appear on the status notification (e.g., only the time missed from work will be shown in the partial absence section of the status notification). In some embodiments, the change includes an approval of an intermittent time away work. In some embodiments, the change includes a denial of the intermittent time away from work. In some embodiments, the change includes a cancelled intermittent time away from work. In some embodiments, the change includes a change to a number of hours that will be missed on an intermittent absence. In some embodiments, if there are restrictions that are added to the absence this will be indicated in the status notification and/or calendar. In some embodiments, the change includes a change to the restriction.

If the ERTW date is =Today+8 calendar days—On the status notification this will be indicated by the following text in the return to work column "Returning On"—This only applies to the Supervisor/Manager Notification Furthermore, in some embodiments, (e.g., in accordance with a determination that a supervisor is an HR representative), the status notification 702 includes all modifications to supervisees the respective supervisor is responsible for. These modifications include a change in supervisees which the respective supervisor has a reporting relationship with and/or changes in supervisees which the respective supervisor is responsible for (e.g., direct and/or indirect supervisees).

Block 660.

Referring to block 660 of FIG. 6D, in some embodiments, the recurring basis is each day that the respective entity 300 has a working day. In some embodiments, the recurring basis is a predetermined time each day (e.g., 11:59 PM and/or 12:01 AM). In some embodiments, the recurring basis is each week, each fortnight (e.g., every two weeks, each month, or the like. In some embodiments, this recurring basis is the same recurring basis as described above in regards to the obtaining of the demographic feed and/or the absentee status feed.

Blocks 662 and 664.

Referring to block 662 of FIG. 6D, in some embodiments, the change in listing is an addition of a supervisee or a removal of a supervisee from the listing. For instance, in accordance with a determination that a set of supervisees associated with a respective supervisor has changed (e.g., a supervisee joined a project team, a supervisee left the entity 300, a supervisee transferred to a different project team, etc.), the supervisor is notified of this change. Referring to block 664 of FIG. 6D, in some embodiments, the change in the listing includes, for a supervisee in the listing, an update to an absence start date, a change in an approval status of an absence (e.g., a change from denied to pending if the decision is appealed), a change in the absentee status category (e.g., a change from pregnancy leave to maternity leave), a change in a return to work date, a change in an absence start time, a change in an absence duration, a change in an indication as to whether an absence has been approved, or a combination thereof. In some embodiments, a partial absence is not approved (e.g., pending) since a frequency of the absence is too high. For instance, if a supervisee suffers from intermittent headaches and is approved by a medical provider (e.g., a medical practitioner) to have a predicted three episodes of headaches a month (e.g., three intermittent absences), but the supervisee has already experienced four headaches within the first fortnight of the month then the fourth absence is not approved. Accordingly, the medical provided is communicated with to determine a reason for the unexpected episodes (e.g., a worsening of condition). Moreover, denial of the fourth absence of the respective employee does not guarantee the respective employee will be at work, thus the denied absence is communicated on the status notification and/or calendar provided to the corresponding supervisor. In some embodiments, the above described changes are communicated in the listings 704 such that the listing 704 includes an initial portion and a changed portion, such as change 720-1 that provides the change as a redline edit.

Block 666.

Referring to block 666 of FIG. 6D, in some embodiments, the communicating the different supervisor status notification to the respective supervisor comprises sending the notification to the different supervisor by E-mail. However, and as previously described, the present disclosure is not limited thereto. For instance, in some embodiments, the different supervisor status notifications are communicated through a push notification on a mobile application. As used herein, a "push notification" is a communication provided to a supervisor device 400, or similar device, that grabs the attention of a user of the respective device (e.g., the respective supervisor). These grabs of attention include, but are not limited to, vibration of the device, activation of the display (e.g., display 482 of FIG. 4), an increased brightness of the display, an audible sound, and other similar mechanism to grab the attention of a user of the device. In some embodiments, the different supervisor status notifications are communicated through a notification in a web application (e.g., a portal accessed through the Internet).

Block 668.

Referring to block 668 of FIG. 6D, in some embodiments, the method includes granting each respective supervisor in the set of supervisors a corresponding account, such as an account to access a portal. The corresponding account provides (e.g., allows access to) access for reviewing absentee information of each supervisee that directly or indirectly reports to the respective supervisor that presently has or is about to have an absentee status category that is in the enumerated list of absentee status categories. In some embodiments, the access for reviewing absentee information is provided through a portal 800 (e.g., a web application). In some embodiments, the granting of a corresponding account is conducted without human interaction (e.g., without input by the respective supervisor). In some embodiments, granting of the corresponding account for each respective supervisor in the set of supervisors includes obtaining a desired username and/or password for the respective supervisor. Accordingly, the present disclosure automatically (e.g., without human interaction) creates accounts for supervisors who have absent employees in accordance with a determination that the respective supervisor does not already have an account. For instance, if a supervisee reports an absence and this absence is a first absence interaction with a respective supervisor, this will trigger an account to be created for the respective supervisor. Accordingly, the respective supervisor will automatic receive status notifications without human interaction by the respective supervisor. In some embodiments, a respective supervisor does not have to activate and/or login to their account to receive status notifications. Moreover, in some embodiments, an account is not created for a respective supervisor if a level of the respective supervisor (e.g., tier in entity hierarchy) satisfies a threshold level (e.g., an account is not created for a supervisor if the supervisor is a chief in the entity such as a chief operating officer or a chief technology officer). In some embodiments, a log (e.g., audit record) of account creation dates is stored in by the absentee system 200. The log may include login and logout times of each respective account. Furthermore, in some embodiments, an account of a respective supervisor is deleted after a satisfying one or more predetermined threshold criteria. For instance, in some embodiments, the predetermined threshold criteria is a period of time since a previous reported absence of a supervisee (e.g., the account is terminated if the supervisor does not have an absent supervisee for 60 days).

Block 670.

Figure 8A:
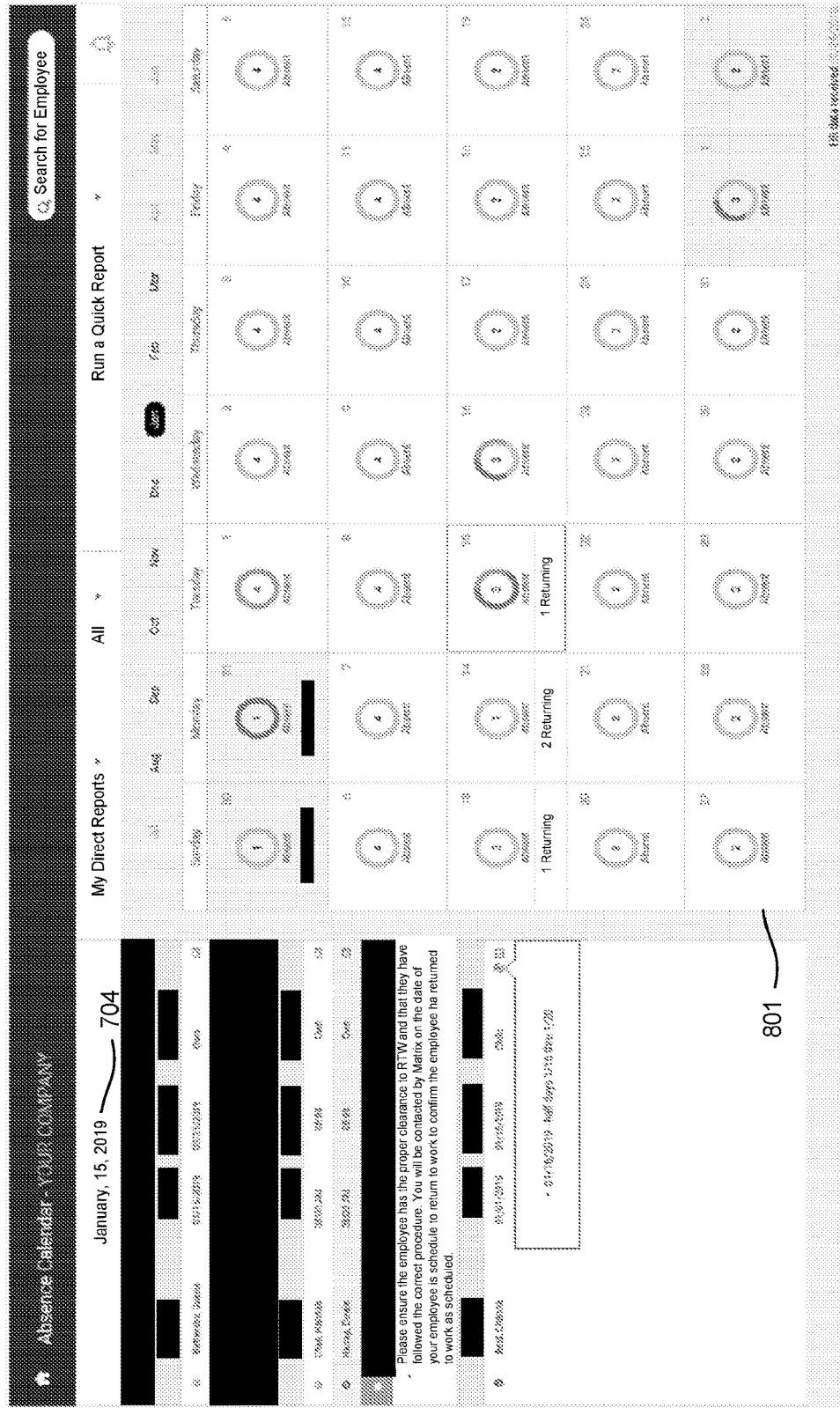
FIG. 8A is a screen image showing an aspect of an absentee calendar system in which a supervisor views a report, in accordance with an embodiment of the present disclosure.

Referring to block 670 of FIG. 6E, in some embodiments, the method includes providing a different absentee calendar to each respective supervisor in the set of supervisors, such as an absentee calendar 800 of FIG. 8A. The different absentee calendar 800 provides, for each respective day depicted in the calendar, a representation of a number of supervisees that directly or indirectly report to the respective supervisor that are absent that day. In some embodiments, the representation provided by the difference absentee calendar includes a listing portion (e.g., listing 704 of FIG. 8A) and a calendar portion (e.g., calendar 801 of FIG. 8A). Unless two or more respective supervisors share identical supervisees, no two absentee calendars 800 will be the same. Moreover, in some embodiments, each supervisor is provided an option to share their respective absentee calendar with another supervisor of the respective entity 300 (e.g., option 760-3 of FIG. 16A).

Figure 8C:
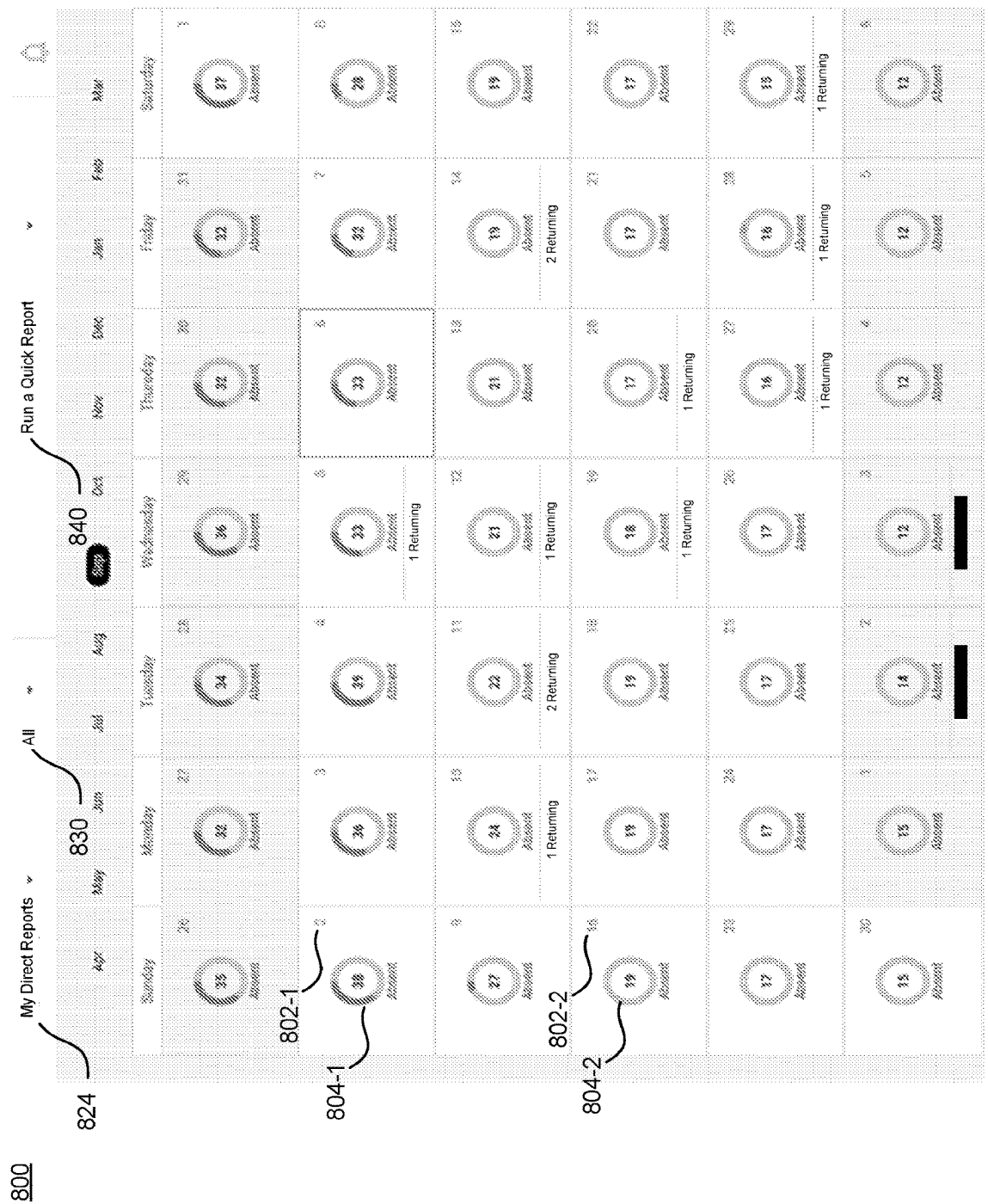
FIG. 8C is a screen image showing an aspect of an absentee calendar system in which a supervisor selects different sub-reports, in accordance with an embodiment of the present disclosure.

Referring briefly to FIG. 8C, an absentee calendar 800 is depicted for a respective supervisor. The absentee calendar includes each day 802 of the given period of time (e.g., day 802-1 for month September of FIG. 8C). In some embodiments, each respective day 802 includes a graphic 804 that illustrates ratios of absence categories for the respective day 802. For instance, referring to FIG. 8C, a first graphic 804-1 for a first day 802-1 includes a first portion for continuous absences and a second portion for partial absences that is less than the first portion, while a second graphic 804-2 for a second day 802-2 includes only a first portion for continuous absences, indicating there are no partial absences for the second day. Thus, the supervisor can readily digest information related to types of absences and number of employees for each type of absence from the graphic 804 associated with a respective day 802.

Figure 13A:
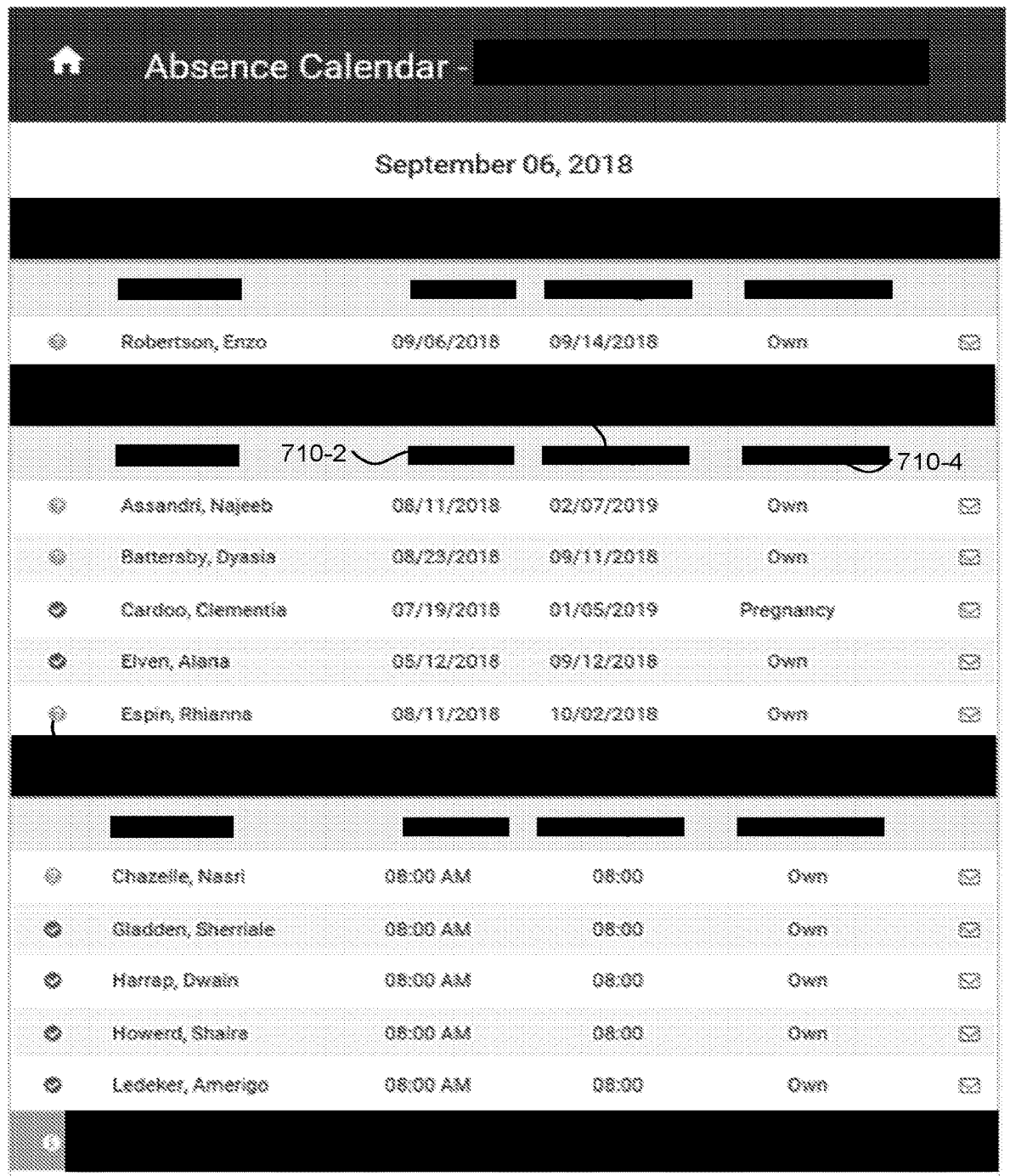
FIG. 13A is a screen image showing yet another aspect of an absentee calendar system in which one supervisor views a listing of information related to supervisees of another supervisor, in accordance with an embodiment of the present disclosure.
Figure 13B:
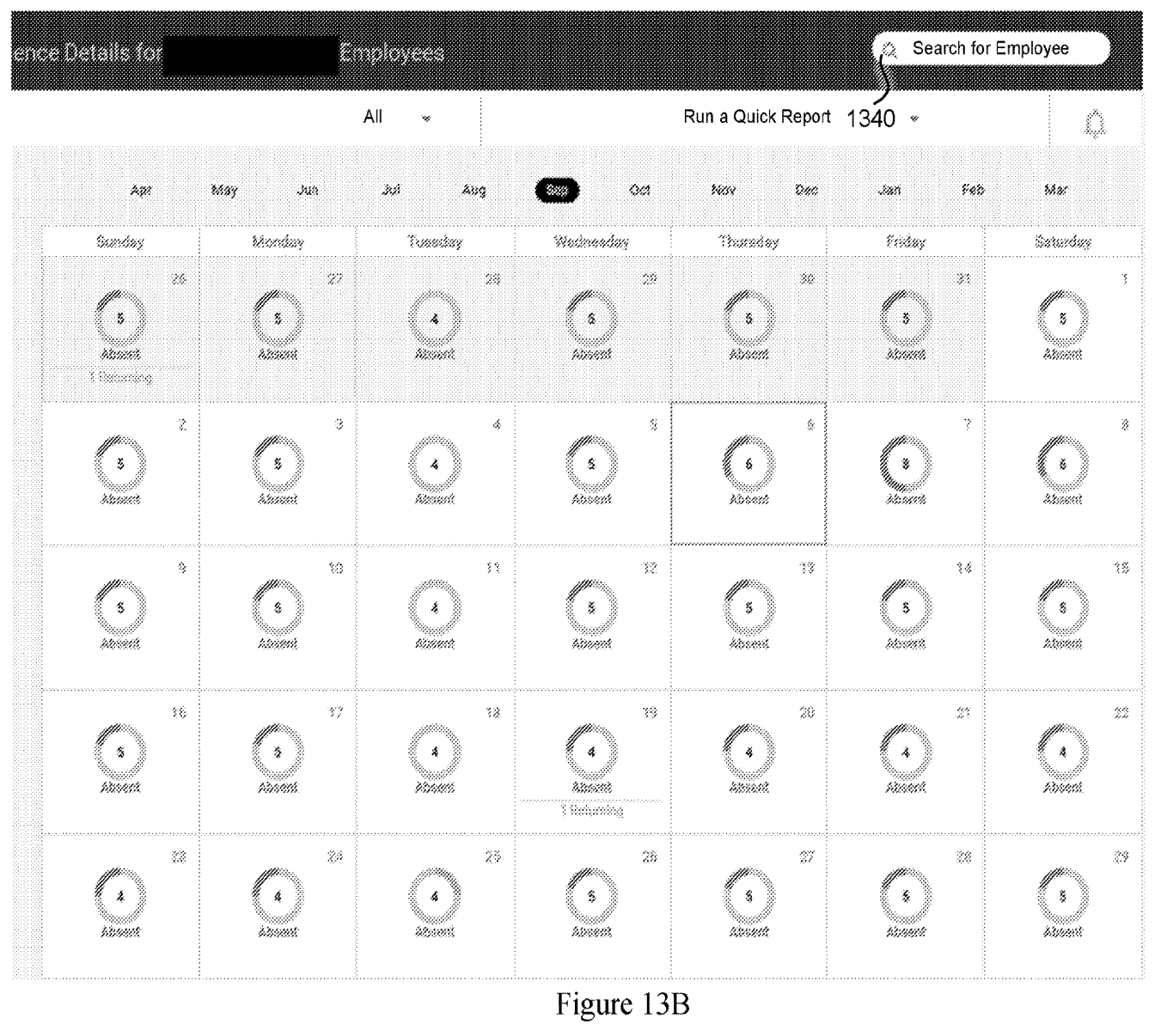

Referring briefly to FIG. 13A, a status notification listing of an absence calendar of a second supervisor is depicted from a view of a first supervisor. The listing of FIG. 13A includes information related to supervisees of the second supervisor, enabling the first supervisor to review pertinent information related to the second supervisor and/or the supervisees of the second supervisor, which may be useful for HR representatives. Referring briefly to FIG. 13B, an absentee calendar of the supervisees of the second supervisor is depicted from the view of the first supervisor. As previously describes, in some embodiments, the status notification listing of FIG. 13A and/or the absentee calendar of FIG. 13B are shared with a supervisor, are searched for by the supervisor, or a combination thereof Block 672.

Referring to block 672 of FIG. 6E, in some embodiments, the different absentee calendar further includes an indication of one or more events associated with the entity. For instance, in some embodiments, one or more events associated with the entity include public holidays such as a federal holiday of Christmas. Accordingly, a respective supervisor does not need to receive information that every employee is absent on the day of the event, and instead receives information pertaining to the event.

Blocks 674 Through 678.

Referring to block 674 of FIG. 6E, in some embodiments, the absentee calendar covers a rolling period that encompasses a contiguous past portion, a contiguous present portion, and a contiguous future portion. In other words, the absentee calendar provided to each supervisor details absence information for a current period of time plus and minus a second period of time (e.g., a calendar shows a current period of April while providing absentee information for the months of January through March as well as May through December). In some embodiments, the continuous past portion and the continuous future portion are a same period of time (e.g., three months). However, the present disclosure is not limited thereto. Referring to block 676 of FIG. 6E, in some embodiments, the rolling period is one month (e.g., thirty calendar days or a calendar month). In some embodiments, the rolling period is three months (e.g., a fiscal quarter). In some embodiments, the rolling period is six months. In some embodiments, the rolling period is a year. Moreover, in some embodiments, the rolling period is a year and a half. Moreover, in some embodiments, the rolling period is defined by each entity 300. Furthermore, in some embodiments, the rolling period is defined by each respective supervisor. Referring to block 678 of FIG. 6E, in some embodiments, the rolling period is a one year rolling period that consists of the past six months, the present month and the next five months. In some embodiments, the rolling period is an approximate one year rolling period that consists of the past six months, the present month and the next six months.

Block 680.

Figure 8D:
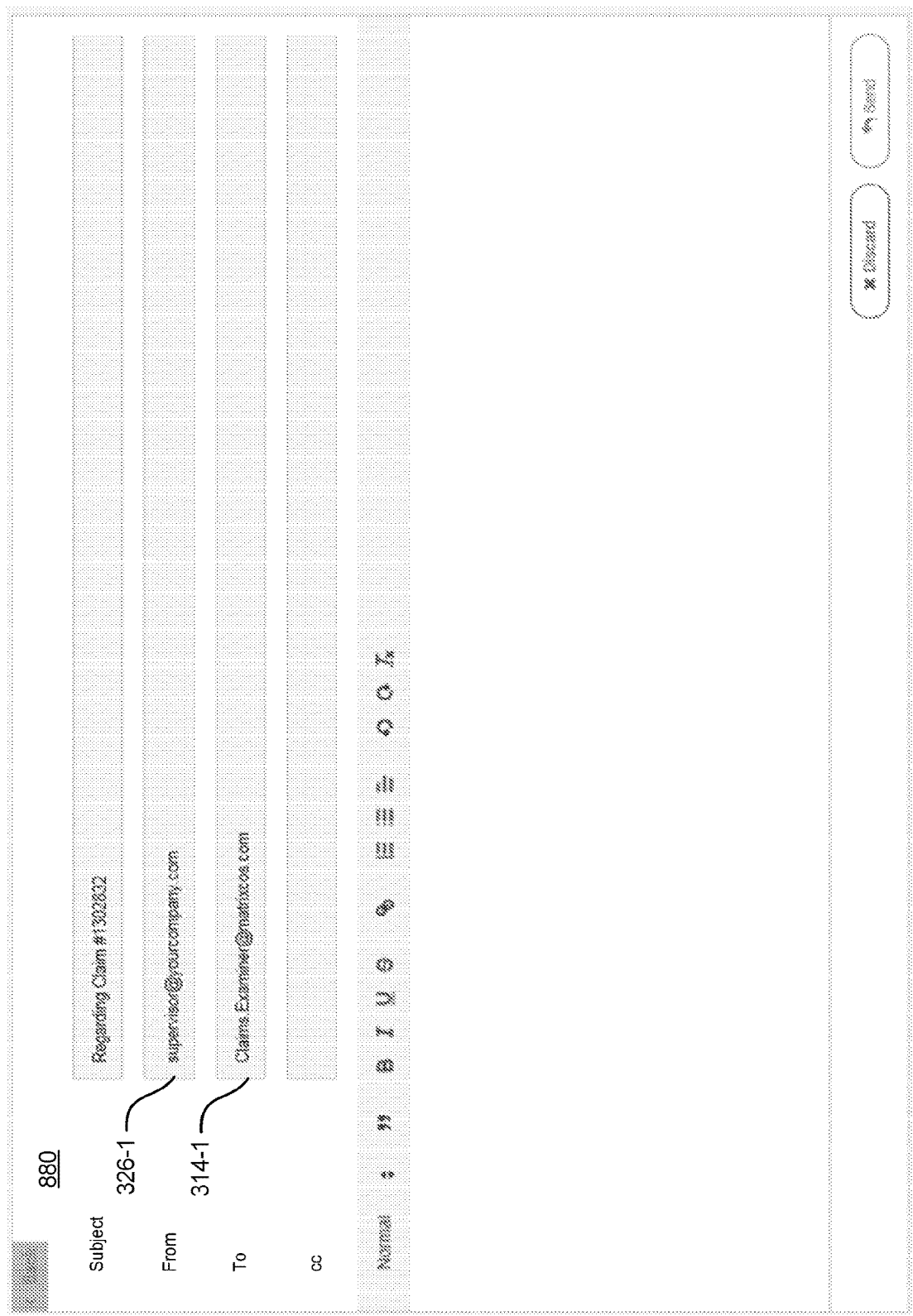
FIG. 8D is a screen image showing an aspect of an absentee calendar system in which a supervisor selects to draft a correspondence, in accordance with an embodiment of the present disclosure.

Referring to block 680 of FIG. 6E, in some embodiments, the absentee calendar further provides instructions for receiving a supervisor selection of a first day (e.g., day 802 of FIG. 8B and FIG. 8C) depicted in the calendar. For instance, referring briefly to FIG. 8B, a supervisor has made a selection of a first day 802 of Sep. 6, 2018. Responsive to supervisor selection of the first day 802, providing an accounting (e.g., a listing 704) of the number of supervisees that directly or indirectly report to the respective supervisor that are absent on the first day. In some embodiments, the accounting provides the names (e.g., column 710-1 of FIG. 8B), a start date of the absence (e.g., column 710-2 of FIG. 8B), a returning date of the absence (e.g., column 710-3 of FIG. 8B, a reason (e.g., category) of the absence (e.g., column 710-4 of FIG. 8B), or a combination thereof. As depicted in FIG. 8B, in some embodiments, the accounting provides a listing 704 of supervisees that are absent on the first day and an indication that it is the first day they are absent (e.g., a listing of new absences 704-1 of FIG. 8B). In some embodiments, the accounting provides a listing of supervisees whose absence on the first day is part of a continuation of an absence from prior days and an indication that it a continued absence (e.g., a listing of continuous absences 704-2 of FIG. 8B). Moreover, in some embodiments, the accounting provides a listing of the supervisees whose return to work day is on the first day (e.g., a listing of returning to work 704-4 of FIG. 8B). Furthermore, in some embodiments, the accounting provides a listing of supervisees whose absence on the first day is a partial absence (e.g., a listing of partial absences 704-3 of FIG. 8B). For each supervisee whose absence on the first day is a partial absence, the accounting also provides a start time, duration, and reason for the partial absence. Moreover, as illustrated in FIG. 8B, each supervisee listed under at least one of the above described indications includes a flag 820 that enables the respective supervisor to remove and/or add the respective supervisee from the respective indication whose flag is being modified by the user. To this point, in some embodiments, the supervisor may select at least a second day which is included in the above described accounting (e.g., a supervisor selects days of from September 5th to September 7th). In some embodiments, the accounting provides an option to communicate with an employee referenced in the accounting (e.g., option 710-5 of FIG. 8B). According, referring to FIG. 8D, upon selection of the option, the supervisor is provided with a mechanism 880 to conduct such communication.

Block 682.

Figure 9:
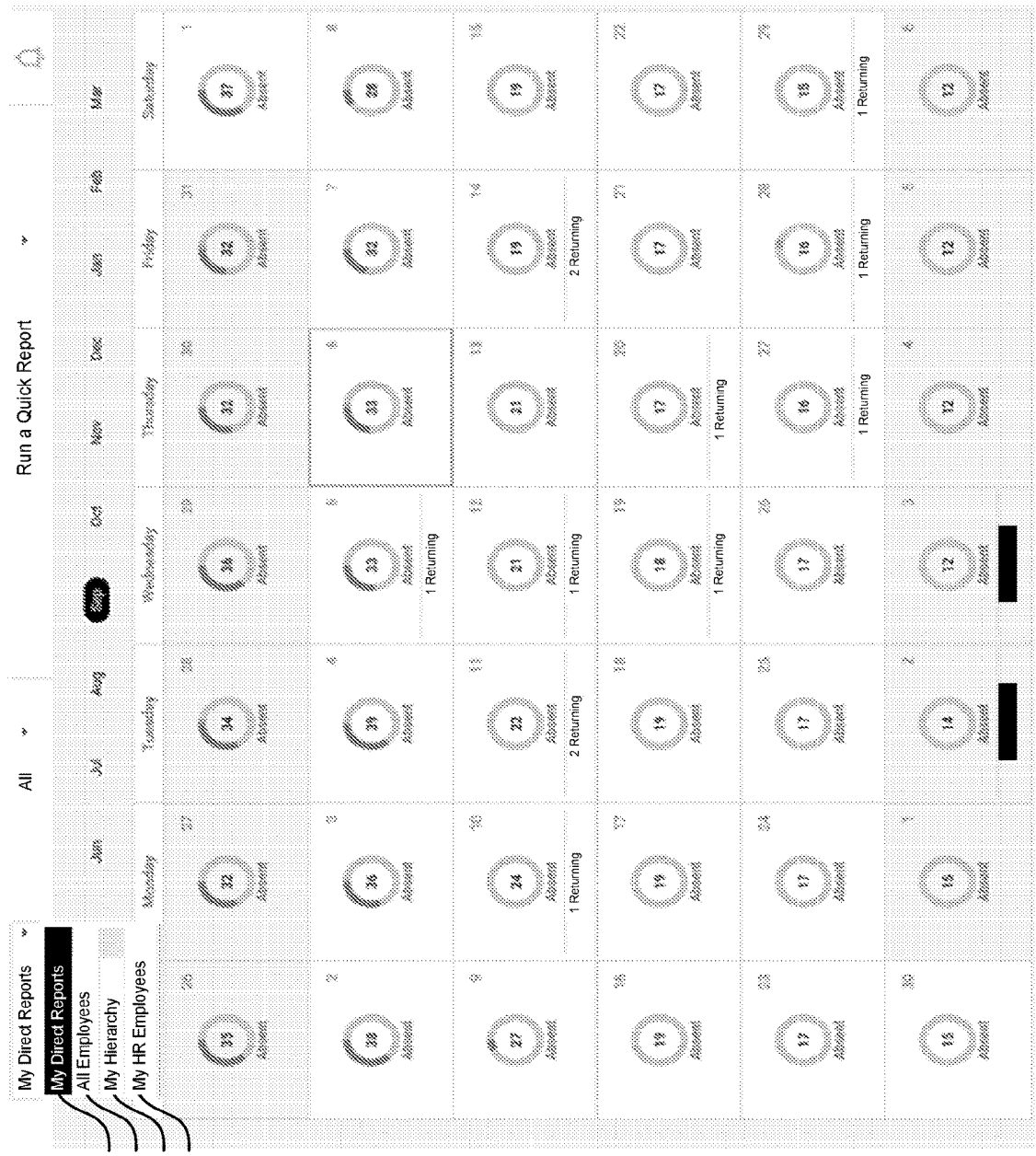
FIG. 9 is a screen image showing another aspect of an absentee calendar system in which a supervisor selects different employees to view, in accordance with an embodiment of the present disclosure.

Referring to block 682 of FIG. 6E, in some embodiments, the different absentee calendar provides an option to allow the respective supervisor to select from among all direct reports of the respective supervisor (e.g., select report 824-1 of FIG. 9). In some embodiments, the different absentee calendar provides an option to allow the respective supervisor to select from all employees of the entity (e.g., select report 824-2 of FIG. 9). Moreover, in some embodiments, the different absentee calendar provides an option to allow the respective supervisor to select from a reporting hierarchy of the respective supervisor (e.g., select report 824-3 of FIG. 9). For instance, referring briefly to FIG. 8C and FIG. 9, in some embodiments, the absentee calendar provided to each respective supervisor displays a default report (e.g., a default direct reports 824 view). In some embodiments, the default report is selected by each respective supervisor or the respective entity 300. Nevertheless, as illustrated in FIG. 9, each supervisor is provided with an option to view different reports from the default report. For instance, in some embodiments, each supervisor is provided with an option to select a calendar view of direct reports 824-1 (e.g., a report that includes supervisees that directly report to the respective supervisor). In some embodiments, each supervisor is provided with an option to select a calendar view of all employees 824-2 (e.g., a report that includes all employees and a respective entity 300 and/or all absent employees at the respective entity). In some embodiments, each supervisor is provided with an option to select a calendar view of a hierarchy 824-3 associated with the respective supervisor. For instance, in some embodiments, the hierarchy 824-3 depicts each supervisee that directly and/or indirectly reports to the respective supervisor. Moreover, in some embodiments, the hierarchy 824-3 depicts each supervisee that directly and/or indirectly reports to the respective supervisor as well as the corresponding supervisor of the respective supervisor for which the report is being generated (e.g., the report includes the boss of the respective supervisor). Furthermore, in some embodiments, each supervisor is provided with an option to select a calendar view of employees of a particular work group 824-4 (e.g., HR employees). In some embodiments, each supervisor is provided with an option to select a predetermined subset of employees of the respective entity 300. This predetermined subset of employees includes a selection of employees by the respective supervisor, a selection of employees by the respective entity 300, or a combination thereof Block 684.

Figure 10:
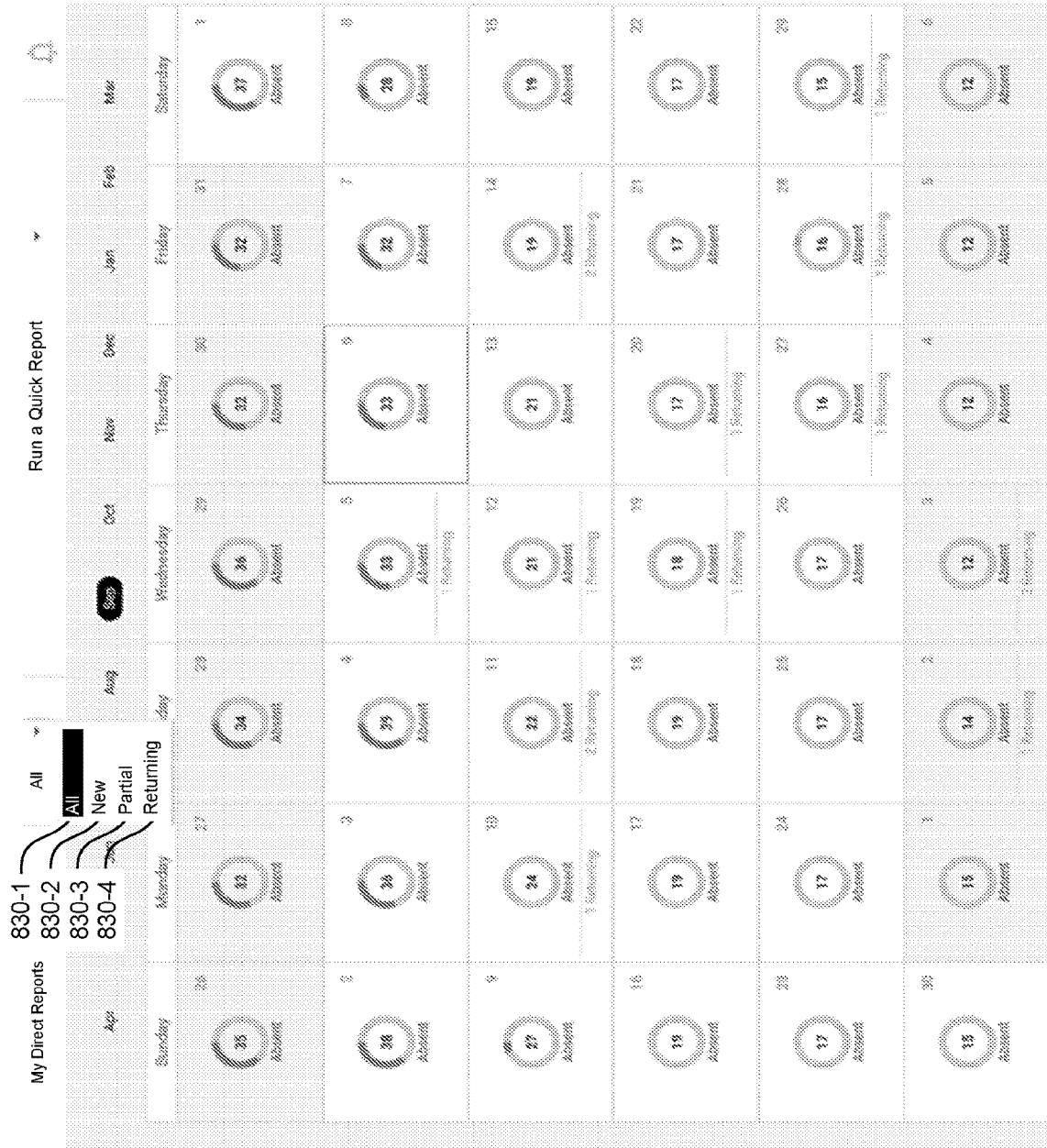
FIG. 10 is a screen image showing another aspect of an absentee calendar system in which a supervisor selects different absence status categories to view, in accordance with an embodiment of the present disclosure.

Referring to block 684 of FIG. 6E, in some embodiments, the different absentee calendar provides an option to allow the respective supervisor to filter the representation of the number of supervisees that directly or indirectly report to the respective supervisor that are absent that day by whether such absences are new for that day (e.g., new calendar view 830-2 of FIG. 10). In some embodiments, the different absentee calendar provides an option to allow the respective supervisor to filter the representation of the number of supervisees that directly or indirectly report to the respective supervisor that are absent that day by whether such absences are partial for that day (e.g., partial calendar view 830-3 of FIG. 10). In some embodiments, the different absentee calendar provides an option to allow the respective supervisor to filter the representation of the number of supervisees that directly or indirectly report to the respective supervisor that are absent that day by whether the supervisee is returning to work on that day (e.g., returning calendar view 830-4 of FIG. 10). Moreover, in some embodiments, the different absentee calendar provides an option to allow the respective supervisor to filter the representation of the number of supervisees that directly or indirectly report to the respective supervisor that are absent that day by whether such absences are recurring for that day. In some embodiments, the different absentee calendar provides an option to allow the respective supervisor to filter the representation of the number of supervisees that directly or indirectly report to the respective supervisor that are absent that day by whether such absences are in a particular absence status category (e.g., a calendar view that filters out all absences except for the particular absence calendar, such as providing a view of only pregnancy absences).

Block 686.

Figure 11A:
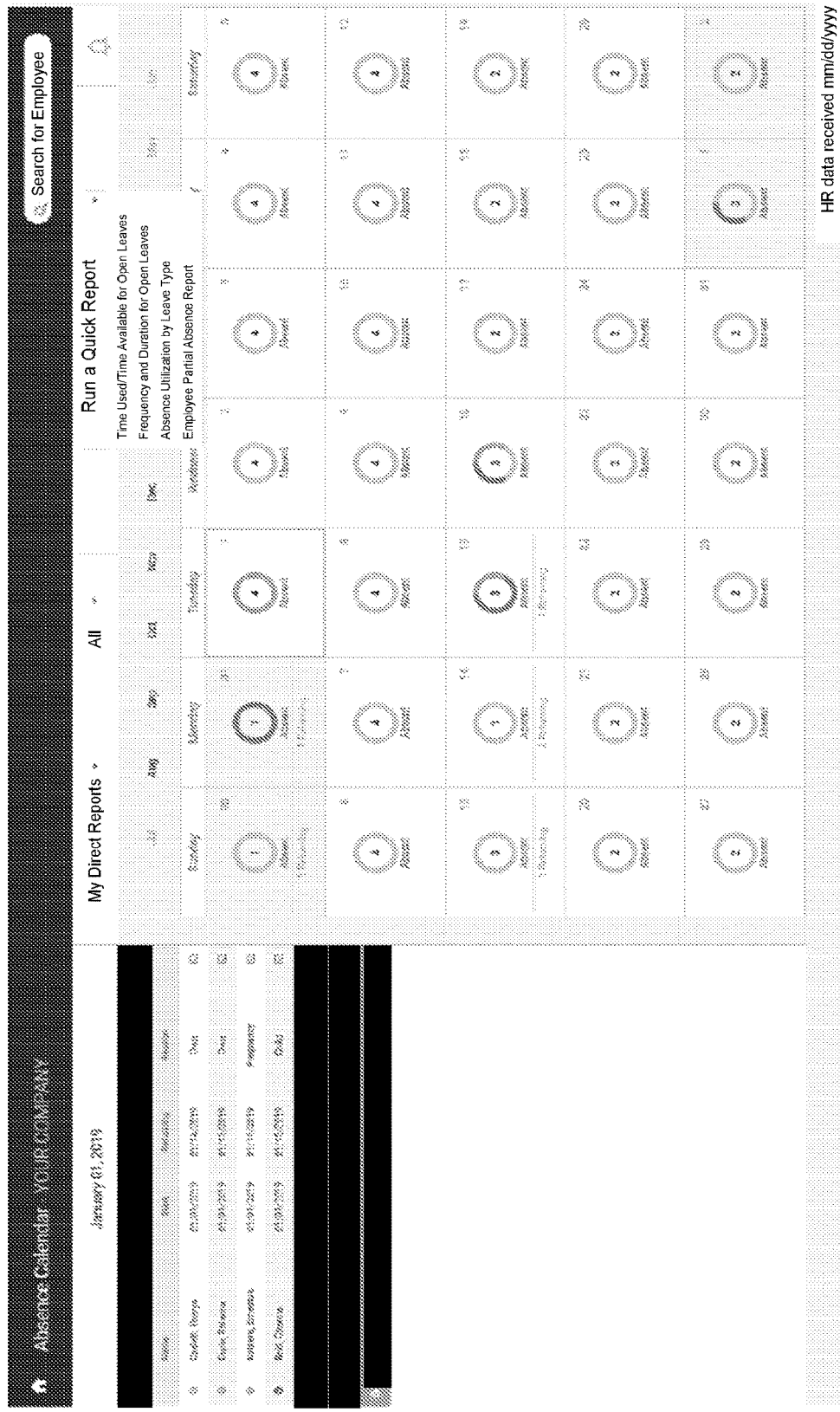
FIG. 11A is a screen image showing an aspect of an absentee calendar system in which a supervisor generates a quick report, in accordance with an embodiment of the present disclosure.
Figure 11B:
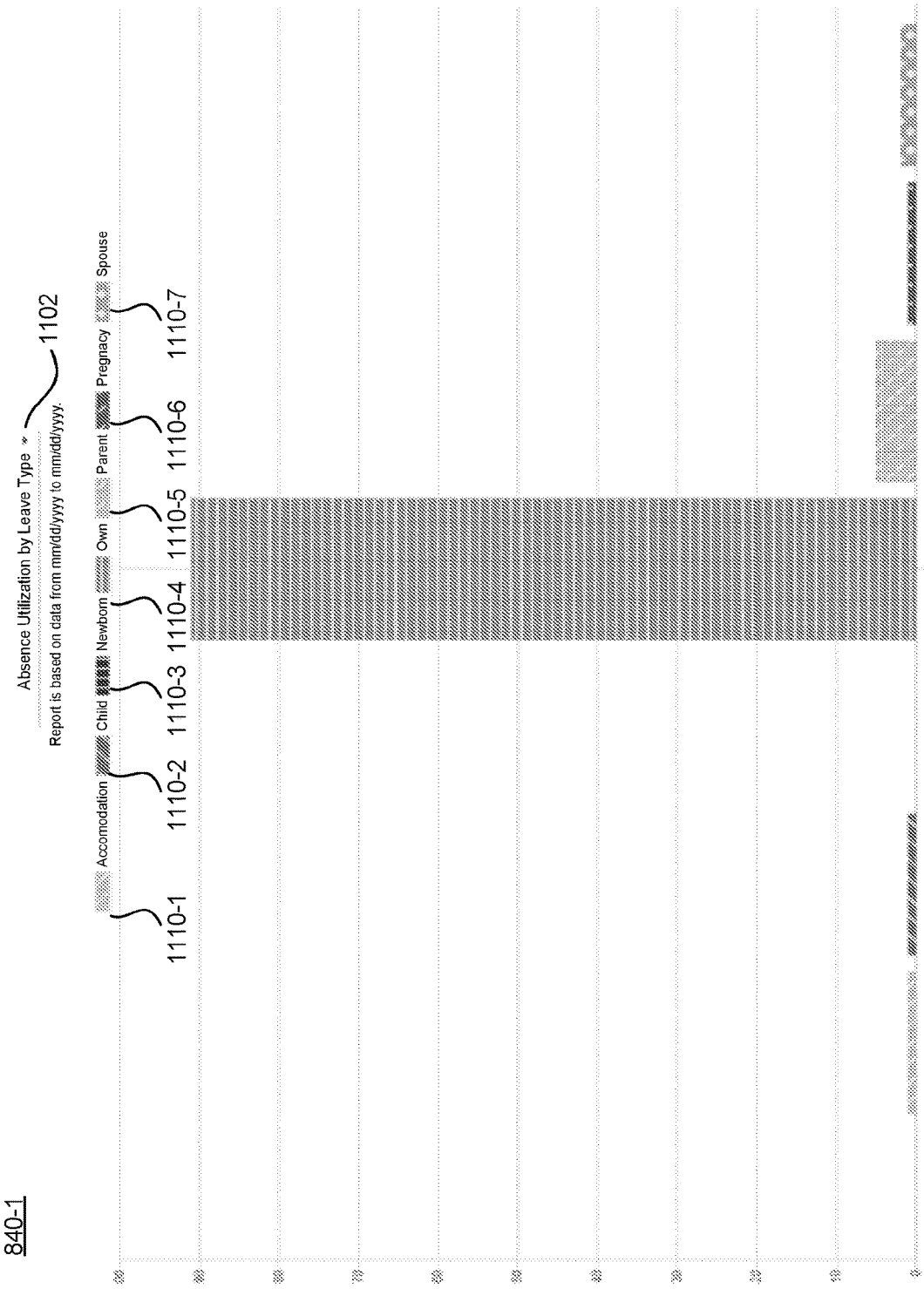
FIG. 11B is a screen image showing another aspect of an absentee calendar system in which a supervisor generates a quick report, in accordance with an embodiment of the present disclosure.

Referring to block 686 of FIG. 6F, in some embodiments, the different absentee calendar provides one or more one click report options. As used herein, a "one click report" is a report that is generated with a single command of a user (e.g., a mouse click, a keyboard stroke, a tap, etc.). In accordance with a determination that the respective supervisor selects a respective one click report from among the one or more one click reports, a corresponding report regarding absenteeism of the supervisees that directly or indirectly report to the respective supervisor is provided. For instance, referring briefly to FIG. 8C and FIG. 11B, a user is provided with one or more options 840 to generate one or more one click reports (e.g., a quick report). In some embodiments, the one or more one click reports 840 include a report that provides information related to an amount of absence time used by a respective supervisee and an amount of absence time available for the respective employee. In some embodiments, the one or more one click reports 840 include a report that provides information related to a frequency of absences and/or a duration of the absences. In some embodiments, the one or more one click reports 840 include a report that provides information related to a utilization of absences by absence status category (e.g., reason for absence) for a respective supervisee. Moreover, in some embodiments, the one or more one click reports 840 include a report that provides information related to partial absences of a respective employee. In some embodiments, the one or more one click reports 840 include a report that provides information related to a day by day assessment of partially approved absences. Furthermore, in some embodiments, the above described one click reports 840 include a time limitation option (e.g., a report for the last year). Referring to FIG. 11B, a sample report 840-1 is depicted. The sample report 840-1 of FIG. 11B illustrates a percentage of absence utilization by leave type 1102 (e.g., by absence status category). These categories include an accommodation category 1110-1, a child category 1110-2, a newborn category 1110-3 (e.g., maternity and/or paternity leave), an own category 1110-4 (e.g., a personal day absence), a parent category 1110-5 (e.g., an absence to tend to a parent of the supervisee), a pregnancy category 1110-6, a spouse category 1110-7, or a combination thereof. As previously describe, in some embodiments, the absence status categories depicted in the sample report include each absence status category available to a particular supervisee. Moreover, in some embodiments, the absence status categories depicted by the sample report are selected by the respective supervisor. This quick report enables a respective supervisor to quickly view and analyze information pertaining to particular supervisees in an easy consumable form (e.g., bar graphs, pie charts, etc.), such as repeated behavior of absences for particular supervisees.

Block 688.

Figure 12:
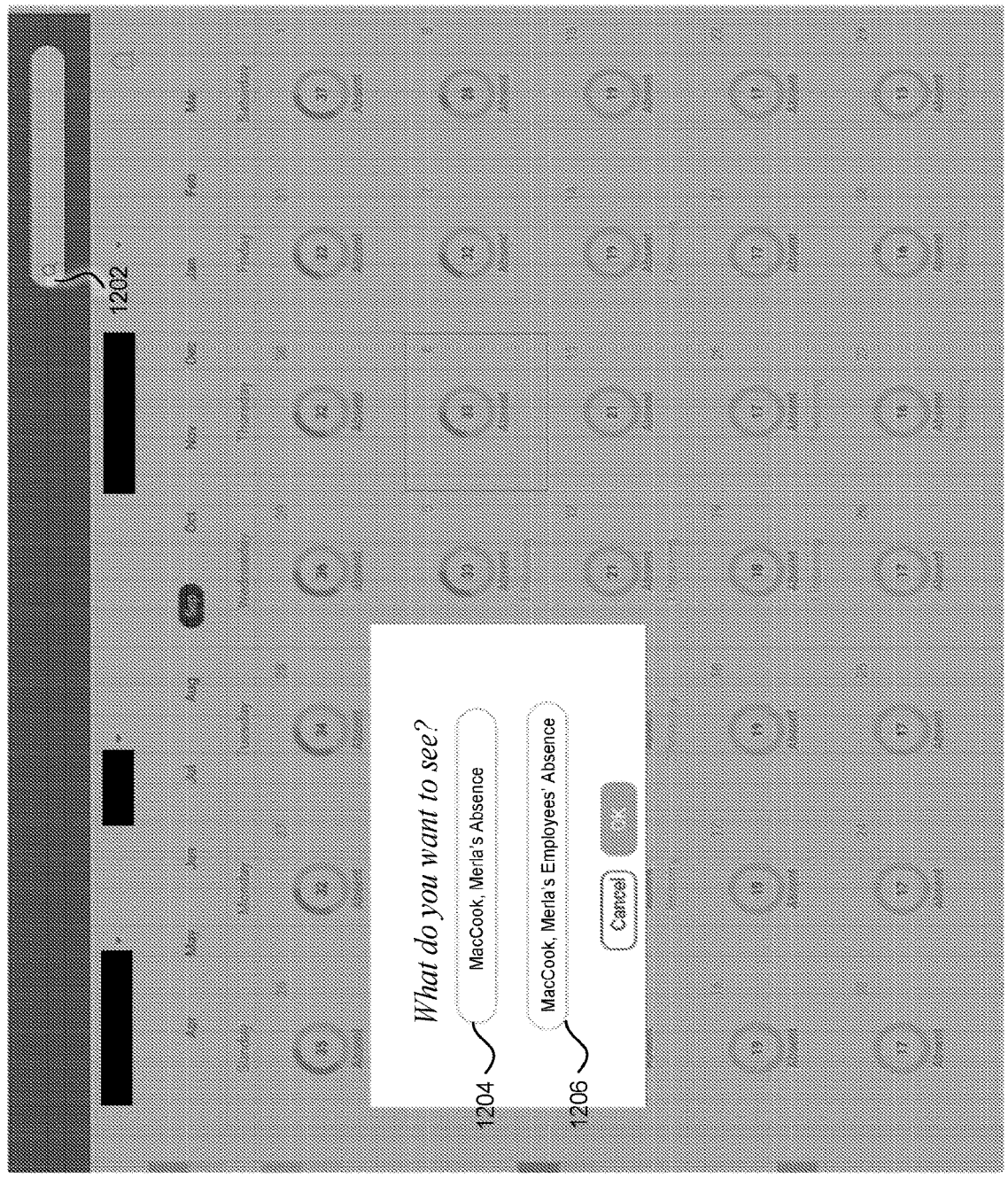
FIG. 12 is a screen image showing yet another aspect of an absentee calendar system in which a supervisor selects information to view related to another supervisor, in accordance with an embodiment of the present disclosure.

Referring to block 688 of FIG. 6F, in some embodiments, the different absentee calendar includes a search prompt that allows the different supervisor to search for an employee within the entity. For instance, referring briefly to FIG. 12, each absentee calendar includes an input mechanism 1202 that allows a respective supervisor to search for particular subject matter (e.g., a particular supervisee). In some embodiments, the respective supervisor searches for a supervisee, in which the results of the search are prompted displayed. However, the present disclosure is not limited thereto. For instance, in some embodiments, in accordance with a determination that the different supervisor runs a search for an employee within the entity and a matching employee is also a supervisor, the method provides a prompt to the different supervisor (e.g., the searching supervisor) as to whether the different supervisor wants to review an absenteeism record of the matching employee (e.g., option 1204 of FIG. 12) or an absenteeism of the supervisees of the matching employee (e.g., option 1206 of FIG. 12). Such options are useful to allow an HR representative of a respective entity 300 to view absenteeism information related to the respective supervisees of a corresponding supervisor. Moreover, in some embodiments, the method prevents a first supervisor from viewing information related to a second supervisor and/or an employee that is not included in the hierarchy of the first supervisor. In other words, a respective user of a particular calendar is enabled to view information pertaining to any employee that has a lower ranking than the respective user (e.g., enabling a mid-tier manager to view information related to a lower-tier manager), while also preventing the respective user from viewing information pertaining to any employ that has a ranking above the respective user (e.g., preventing a mid-tier manager from viewing information related to a chief financial officer).

Block 690.

Figure 14A:
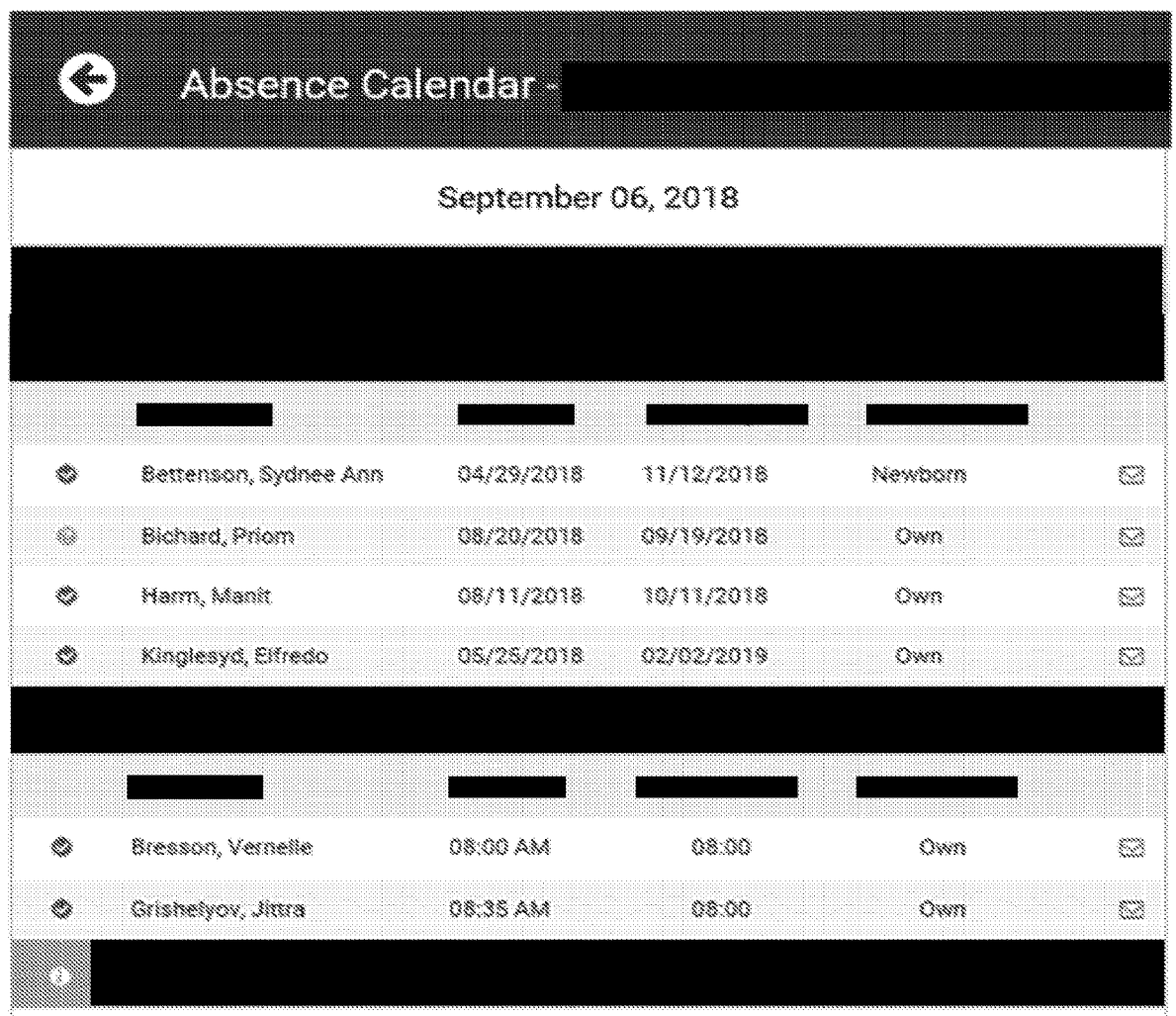
FIG. 14A is a screen image showing yet another aspect of an absentee calendar system in which a supervisor views another status notification related to another supervisor, in accordance with an embodiment of the present disclosure.
Figure 14B:
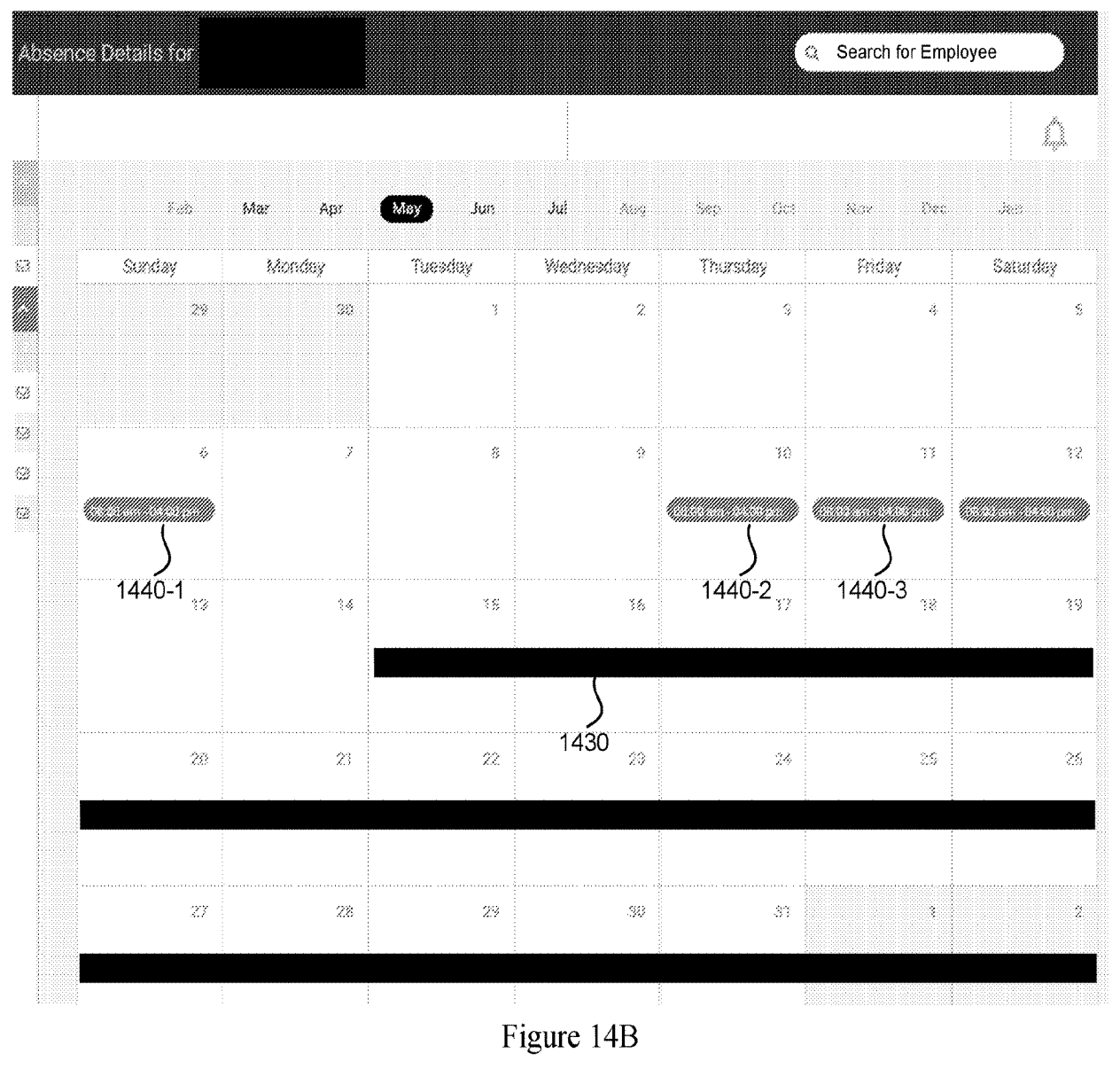
Figure 14C:
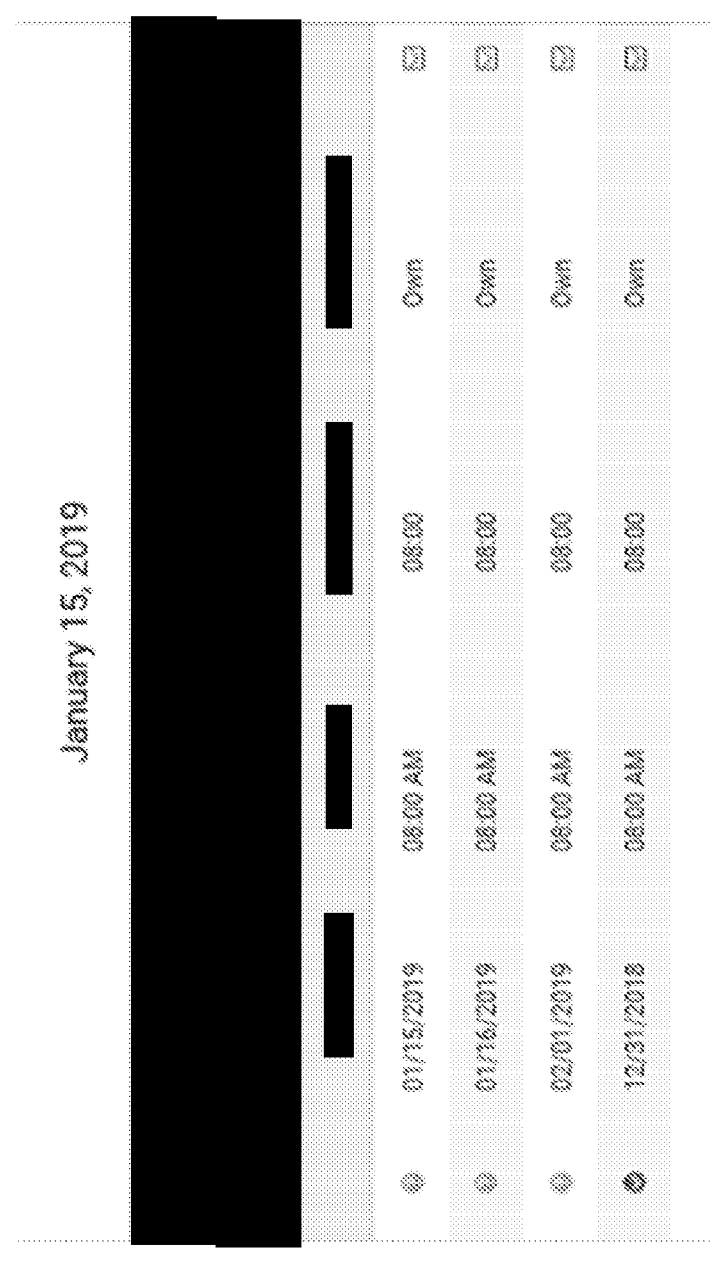

Referring to block 690 of FIG. 6F, in some embodiments, the different absentee calendar includes a search prompt that allows the different supervisor to search for an employee within the entity. Accordingly, in some embodiments, in accordance with a determination that the different supervisor runs a search for an employee within the entity, the one or more programs further comprise instructions to display an absentee calendar for the employee. Referring briefly to FIG. 14B, an absentee calendar for a particular employee (e.g., employee "Keenya McCray,") is depicted. In the exemplary absentee calendar for the particular employee, different types of absences are depicted in different manners (e.g., partial absences 1440 are depicted in purple while continuous absences 1430 are depicted in yellow).

In FIGS. 8 through 14, one or more of the above described, options, filters, and/or calendar views are selected by a respective supervisor through a drop-down menu (e.g., a table) of selections. One skilled in the art will note that the present disclosure is not limited thereto, as there exists other mechanism for selection of the above described, options, filters, and/or calendar views, such as a button mechanism and/or a slider mechanism.

REFERENCES CITED AND ALTERNATIVE EMBODIMENTS

All references cited herein are incorporated herein by reference in their entirety and for all purposes to the same extent as if each individual publication or patent or patent application was specifically and individually indicated to be incorporated by reference in its entirety for all purposes.

The present invention can be implemented as a computer program product that comprises a computer program mechanism embedded in a non-transitory computer readable storage medium. For instance, the computer program product could contain the program modules shown in any combination of FIG. 1, 2, 3, or 4 and/or described in FIGS. 6A through 16B. These program modules can be stored on a CD-ROM, DVD, magnetic disk storage product, USB key, or any other non-transitory computer readable data or program storage product.

Many modifications and variations of this invention can be made without departing from its spirit and scope, as will be apparent to those skilled in the art. The specific embodiments described herein are offered by way of example only. The embodiments were chosen and described in order to best explain the principles of the invention and its practical applications, to thereby enable others skilled in the art to best utilize the invention and various embodiments with various modifications as are suited to the particular use contemplated. The invention is to be limited only by the terms of the appended claims, along with the full scope of equivalents to which such claims are entitled.

What is claimed is:

1. A first computing system comprising:
one or more processors; and
memory coupled to the one or more processors, the memory storing one or more programs configured to be executed by the one or more processors, the one or more programs singularly or collectively comprising instructions for:
obtaining, in electronic form, on a first recurring basis from a first remote device associated with a first entity, a demographic feed comprising a first plurality of data elements associated with a plurality of employee records, each respective employee record in the plurality of employee records corresponding to an employee in a plurality of employees for the first entity, wherein each respective record in the plurality of employee records includes (i) a name of the corresponding employee and (ii) a name of a least one other employee in the plurality of employees to which the corresponding employee shares a reporting relationship;
generating, via the one or more processors, based on the demographic feed, an organizational tree of the first entity comprising a plurality of nodes, wherein each respective node in the plurality of nodes represents an employee in the plurality of employees;
obtaining, in electronic form, on a second recurring basis from a second remote device associated with a second entity other than the first entity, an absentee status feed associated with the first entity, the absentee status feed comprising a second plurality of data elements associated with a plurality of absentee statuses, wherein
each absentee status in the plurality of absentee statuses corresponds to a respective employee in a set of employees in the plurality of employees of the first entity and is vetted by a person other than the respective employee before inclusion in the absentee status feed, and
each respective absentee status is in an absentee status category that is in an enumerated list of absentee status categories;
determining, via the one or more processors, from the organization tree and the demographic feed a set of supervisors at the first entity, wherein each respective supervisor in the set of supervisors directly or indirectly supervises at least one supervisee having an absentee status category that is in the enumerated list of absentee status categories;

generating, by the one or more processors, a respective supervisor interface and displaying at a corresponding remote device for each respective supervisor in the set of supervisors at the first entity, a different supervisor status notification to each respective supervisor in the set of supervisors without further human intervention by the respective supervisor, wherein the different supervisor status notification provides an aggregated listing of each supervisee that directly or indirectly reports to the respective supervisor having an absentee status category that is in the enumerated list of absentee status categories together with a current absentee status of the supervisee and an approval status of an absence of the respective supervisee, and wherein the aggregated listing is periodically reconfigured, by the one or more processors, responsive to a continuous rolling period of time that encompasses a contiguous present portion; and communicating, in electronic form, to the respective supervisor interface of the corresponding remote device for each respective supervisor in the set of supervisors, the different supervisor status notification.

2. The computing system of claim 1, wherein the reporting relationship is either one in which the corresponding employee directly supervises the at least one other employee or is directly supervised by the at least one other employee.

3. The computing system of claim 1, wherein:
the reporting relationship is one in which the corresponding employee is directly supervised by the at least one other employee, and
each respective employee record in the plurality of employee records further includes (iii) an e-mail address of the corresponding employee and (iv) an e-mail address of the at least one other employee in the plurality of employees to which the corresponding employee shares the reporting relationship.

4. The computing system of claim 1, wherein the aggregated listing in the supervisor notification provides, for each respective supervisee of the supervisor, a name of the respective supervisee, an absence start date, an absence end date, optionally an update to the absence start date, a reason for an absence, an approval status of an absence of the respective supervisee, and the absentee status category of the respective supervisee.

5. The computing system of claim 4, wherein:
the aggregated listing is bifurcated between a first listing portion that consists of supervisees that are absent or planning to be absent for one or more days and a second listing portions that consists of supervisees that are absent or planning to be absent for less than a day,
the first listing portion further provides for each respective supervisee of the supervisor that is absent or planning to be absent for more than one day, a return to work date and optionally an update to the return to work date, and
the second listing portion further provides for each respective supervisee of the supervisor that is absent or planning to be absent for less than one day an absence start time, optionally an update to the absence start time, an absence duration, optionally an update to the absence duration, and an indication as to whether the absence have been approved, denied, is pending or has been cancelled.

6. The computing system of claim 1, wherein the absentee status feed is subsumed by the demographic feed.

7. The computing system of claim 1, the method further comprising granting each respective supervisor in the set of supervisors a corresponding account, wherein the corresponding account provides a portal for reviewing absentee information of each supervisee that directly or indirectly reports to the respective supervisor that presently has or is about to have an absentee status category that is in the enumerated list of absentee status categories.

8. The computing system of claim 1, wherein the one or more programs further comprise instructions to evaluate, at each respective instance on a third recurring basis, whether to communicate the different supervisor status notification to the respective supervisor, wherein:
when there has been a change in the aggregated listing of each supervisee that directly or indirectly reports to the respective supervisor having an absentee status category that is in the enumerated list of absentee status categories, the notification is communicated to the respective supervisor at the respective instance, and
when there has been no change in the aggregated listing of each supervisee that directly or indirectly reports to the respective supervisor having an absentee status category that is in the enumerated list of absentee status categories, the notification is not communicated to the respective supervisor at the respective instance.

9. The computing system of claim 8, wherein the change in the aggregated listing is an addition of a supervisee or a removal of a supervisee from the aggregated listing.

10. The computing system of claim 8, wherein the change in the aggregated listing comprises, for a supervisee in the aggregated listing, an update to an absence start date, a change in an approval status of an absence, a change in the absentee status category, a change in a return to work date, a change in an absence start time, a change in an absence duration, or a change in an indication as to whether an absence has been approved.

11. The computing system of claim 1, wherein:
the one or more programs singularly or collectively further comprise instructions for providing a different absentee calendar to each respective supervisor in the set of supervisors, and
the different absentee calendar provides, for each respective day depicted in the calendar, a representation of a number of supervisees that directly or indirectly report to the respective supervisor that are absent that day.

12. The computing system of claim 11, wherein the continuous rolling period of the absentee calendar that further encompasses a contiguous past portion and a contiguous future portion.

13. The computing system of claim 11, wherein the absentee calendar further provides instructions for receiving a supervisor selection of a first day depicted in the calendar and, responsive to supervisor selection of the first day, providing an accounting of the number of supervisees that directly or indirectly report to the respective supervisor that are absent on the first day, wherein the accounting provides:
the names of supervisees that are absent on the first day and an indication that it is the first day they are absent,
the names of supervisees whose absence on the first day is part of a continuation of an absence from prior days and an indication that it a continued absence, the names of the supervisees whose return to work day is on the first day, and the names of supervisees whose absence on the first day is a partial absence, and for each supervisee whose absence on the first day is a partial absence, a start time, duration, and reason for the partial absence.

14. The computing system of claim 11, wherein the different absentee calendar provides an option to allow the respective supervisor to select from among all direct reports of the respective supervisor, all employees of the first entity, or a reporting hierarchy of the respective supervisor.

15. The computing system of claim 11, wherein the different absentee calendar provides an option to allow the respective supervisor to filter the representation of the number of supervisees that directly or indirectly report to the respective supervisor that are absent that day by whether such absences are new for that day, whether such absences are partial for that day, whether the supervisee is returning to work on that day, or whether such absences are recurring for that day.

16. The computing system of claim 11, wherein the different absentee calendar provides one or more one click report options wherein, when the respective supervisor selects a respective one click report from among the one or more one click reports, a corresponding report regarding absenteeism of the supervisees that directly or indirectly report to the respective supervisor is provided.

17. The computing system of claim 11, wherein the different absentee calendar includes a search prompt that allows the different supervisor to search for an employee within the first entity, and wherein when the different supervisor runs a search for an employee within the first entity and a matching employee is also a supervisor, the one or more programs further comprise instructions to prompt the different supervisor as to whether the different supervisor wants to review an absenteeism record of the matching employee or an absenteeism of the supervisees of the matching employee.

18. The computing system of claim 1, wherein the one or more programs further comprise instructions for receiving a supervisor selection a first employee in the plurality of employees and, responsive to receiving the supervisor selection of the first employee in the plurality of employees, communicating the different supervisor status notification to the first employee in the plurality of employees selected by the respective supervisor without further intervention by either the respective supervisor or the first employee.

19. A method, comprising:
at a computer system comprising one or more processors and a memory, the memory storing one or more programs, the one or more programs singularly or collectively comprising instructions for:
obtaining, in electronic form, on a first recurring basis from a first remote device associated with a first entity, a demographic feed comprising a first plurality of data elements associated with a plurality of employee records, each respective employee record in the plurality of employee records corresponding to an employee in a plurality of employees for the first entity, wherein each respective record in the plurality of employee records includes (i) a name of the corresponding employee and (ii) a name of a least one other employee in the plurality of employees to which the corresponding employee shares a reporting relationship;
generating, via the one or more processors, based on the demographic feed, an organizational tree of the first entity comprising a plurality of nodes, wherein each respective node in the plurality of nodes represents an employee in the plurality of employees;
obtaining, in electronic form, on a second recurring basis from a second remote device associated with a second entity other than the first entity, an absentee status feed associated with the first entity, the absentee status feed comprising a second plurality of data elements associated with a plurality of absentee statuses, wherein
each absentee status in the plurality of absentee statuses corresponds to a respective employee in a set of employees in the plurality of employees of the first entity and is vetted by a person other than the respective employee before inclusion in the absentee status feed, and
each respective absentee status is in an absentee status category that is in an enumerated list of absentee status categories;
determining, via the one or more processors, from the organization tree and the demographic feed a set of supervisors at the first entity, wherein each respective supervisor in the set of supervisors directly or indirectly supervises at least one supervisee having an absentee status category that is in the enumerated list of absentee status categories;
generating, by the one or more processors, a respective supervisor interface and displaying at a corresponding remote device for each respective supervisor in the set of supervisors at the first entity, a different supervisor status notification to each respective supervisor in the set of supervisors without further human intervention by the respective supervisor, wherein the different supervisor status notification provides an aggregated listing of each supervisee that directly or indirectly reports to the respective supervisor having an absentee status category that is in the enumerated list of absentee status categories together with a current absentee status of the supervisee and an approval status of an absence of the respective supervisee, and wherein the aggregated listing is periodically reconfigured, by the one or more processors, responsive to a continuous rolling period of time that encompasses a contiguous present portion; and
communicating, in electronic form, to the respective supervisor interface of the corresponding remote device for each respective supervisor in the set of supervisors, the different supervisor status notification.

20. A non-transitory computer readable storage medium stored on a computing device, the computing device comprising, one or more processors and memory storing one or more programs for execution by the one or more processors, wherein the one or more programs singularly or collectively comprise instructions for running an application on the computing device that executes a method comprising:
obtaining, in electronic form, on a first recurring basis from a first remote device associated with a first entity, a demographic feed comprising a first plurality of data elements associated with a plurality of employee records, each respective employee record in the plurality of employee records corresponding to an employee in a plurality of employees for the first entity, wherein each respective record in the plurality of employee records includes (i) a name of the corresponding employee and (ii) a name of a least one other employee in the plurality of employees to which the corresponding employee shares a reporting relationship;
generating, via the one or more processors, based on the demographic feed, an organizational tree of the first entity comprising a plurality of nodes, wherein each respective node in the plurality of nodes represents an employee in the plurality of employees;

obtaining, in electronic form, on a second recurring basis from a second remote device associated with a second entity other than the first entity, an absentee status feed associated with the first entity, the absentee status feed comprising a second plurality of data elements associated with a plurality of absentee statuses, wherein each absentee status in the plurality of absentee statuses corresponds to a respective employee in a set of employees in the plurality of employees of the first entity and is vetted by a person other than the respective employee before inclusion in the absentee status feed, and each respective absentee status is in an absentee status category that is in an enumerated list of absentee status categories;

determining, via the one or more processors, from the organization tree and the demographic feed a set of supervisors at the first entity, wherein each respective supervisor in the set of supervisors directly or indirectly supervises at least one supervisee having an absentee status category that is in the enumerated list of absentee status categories;

generating, by the one or more processors, a respective supervisor interface and displaying at a corresponding remote device for each respective supervisor in the set of supervisors at the first entity, a different supervisor status notification to each respective supervisor in the set of supervisors without further human intervention by the respective supervisor, wherein the different supervisor status notification provides an aggregated listing of each supervisee that directly or indirectly reports to the respective supervisor having an absentee status category that is in the enumerated list of absentee status categories together with a current absentee status of the supervisee and an approval status of an absence of the respective supervisee, and wherein the aggregated listing is periodically reconfigured, by the one or more processors, responsive to a continuous rolling period of time that encompasses a contiguous present portion; and communicating, in electronic form, to the respective supervisor interface of the corresponding remote device for each respective supervisor in the set of supervisors, the different supervisor status notification.

* * * * *